United States Patent
Jang et al.

(10) Patent No.: US 12,439,407 B2
(45) Date of Patent: Oct. 7, 2025

(54) METHOD AND APPARATUS FOR DATA TRANSMISSION IN NETWORK COOPERATIVE COMMUNICATIONS

(71) Applicant: Samsung Electronics Co., Ltd., Gyeonggi-do (KR)

(72) Inventors: Youngrok Jang, Gyeonggi-do (KR); Ameha Tsegaye Abebe, Gyeonggi-do (KR); Seongmok Lim, Gyeonggi-do (KR); Hyoungju Ji, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 598 days.

(21) Appl. No.: 17/737,215

(22) Filed: May 5, 2022

(65) Prior Publication Data
US 2022/0394742 A1  Dec. 8, 2022

(30) Foreign Application Priority Data
May 6, 2021 (KR) .................. 10-2021-0058361

(51) Int. Cl.
*H04W 72/1273* (2023.01)
*H04L 1/08* (2006.01)
(Continued)

(52) U.S. Cl.
CPC ........... *H04W 72/1273* (2013.01); *H04L 1/08* (2013.01); *H04W 72/23* (2023.01)

(58) Field of Classification Search
CPC . H04W 72/1273; H04W 72/23; H04W 72/20; H04W 72/0446; H04W 72/0453;
(Continued)

(56) References Cited

U.S. PATENT DOCUMENTS

| | | |
|---|---|---|
| 2018/0316409 A1 | 11/2018 | Yoon et al. |
| 2020/0374079 A1 | 11/2020 | Chervyakov et al. |

(Continued)

FOREIGN PATENT DOCUMENTS

WO  WO 2021/230706  11/2021

OTHER PUBLICATIONS

Catt, "Enhancements for HST-SFN Deployment", R1-2102602, 3GPP TSG RAN WG1 #104b-e, Apr. 12-20, 2021, 16 pages.
(Continued)

*Primary Examiner* — Derrick W Ferris
*Assistant Examiner* — M Mostazir Rahman
(74) *Attorney, Agent, or Firm* — The Farrell Law Firm, P.C.

(57) ABSTRACT

The disclosure relates to a 5G or 6G communication system for supporting a higher data transmission rate. Provided is a method performed by a terminal that includes transmitting capability information related to a physical downlink shared channel (PDSCH) transmission scheme; receiving a radio resource control (RRC) message including configuration information related to the PDSCH transmission scheme; receiving downlink control information (DCI) on a physical downlink control channel (PDCCH), the DCI including one or more transmission configuration indication (TCI) fields indicating one or more TCI states; and in case that the configuration information includes single frequency network (SFN) PDSCH scheme related information and PDSCH repetition scheme related information and two TCI states are indicated by the DCI, performing reception of one or more SFN PDSCH repetitions using the two TCI states.

16 Claims, 42 Drawing Sheets

(51) Int. Cl.
*H04W 72/20* (2023.01)
*H04W 72/23* (2023.01)

(58) Field of Classification Search
CPC ...... H04W 72/046; H04L 1/08; H04L 5/0035; H04L 5/005; H04L 5/0053; Y02D 30/70; H04B 7/024
See application file for complete search history.

(56) References Cited

U.S. PATENT DOCUMENTS

| | | | | |
|---|---|---|---|---|
| 2023/0189262 A1* | 6/2023 | Zeineddine | ........... | H04L 5/0048 370/329 |
| 2023/0397204 A1* | 12/2023 | Yuan | ...................... | H04B 7/088 |
| 2024/0171251 A1* | 5/2024 | Lee | ...................... | H04W 72/23 |

OTHER PUBLICATIONS

NEC, "Discussion on HST-SFN Deployment", R1-2103524, 3GPP TSG RAN WG1 #104b-e, Apr. 12-20, 2021, 2 pages.
Qualcomm Incorporated, "Enhancements on HST-SFN Deployment", R1-2103154, 3GPP TSG-RAN WG1 Meeting #104bis-e, Apr. 12-20, 2021, 35 pages.
International Search Report dated Aug. 10, 2022 issued in counterpart application No. PCT/KR2022/006503, 6 pages.

* cited by examiner

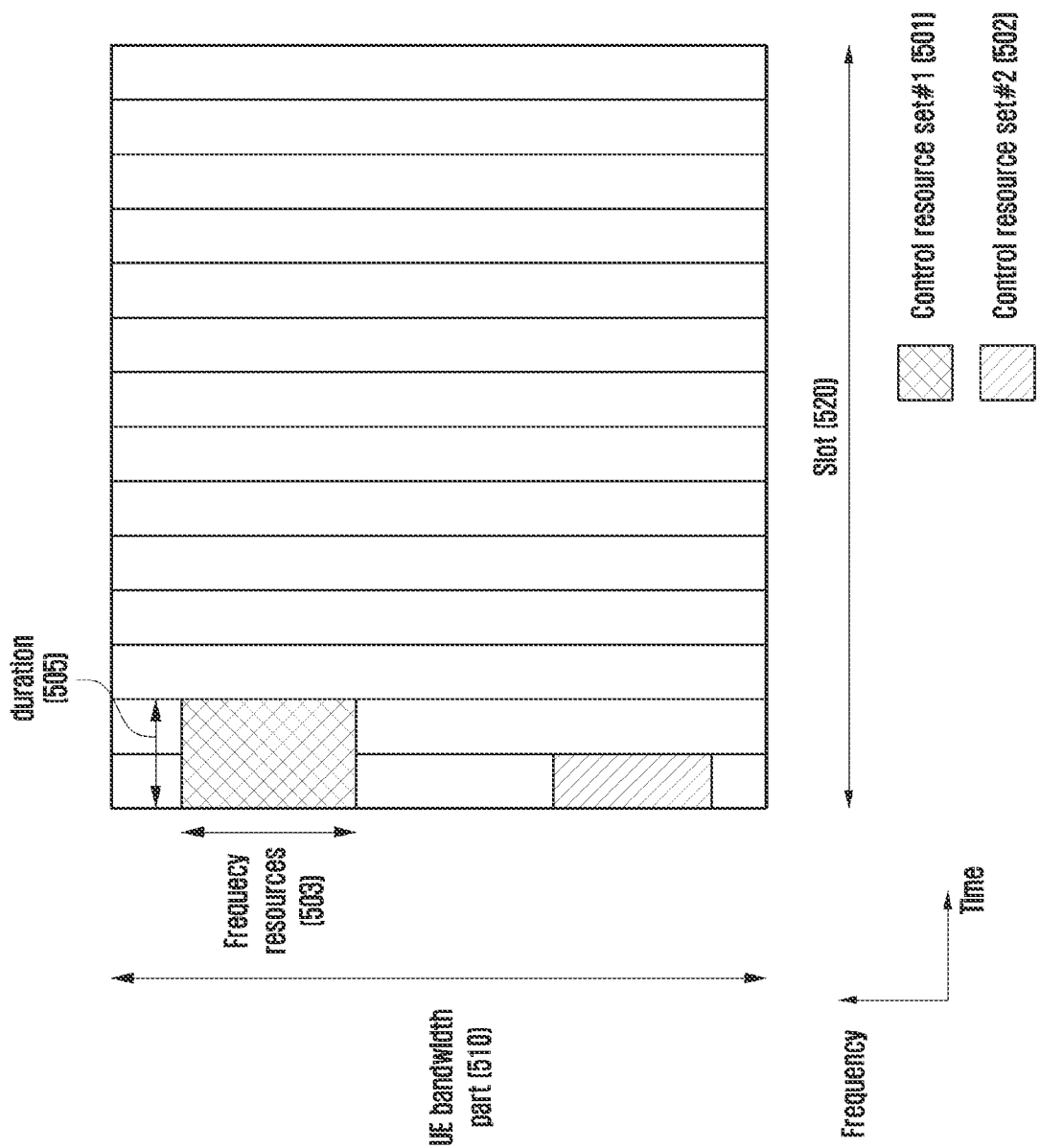

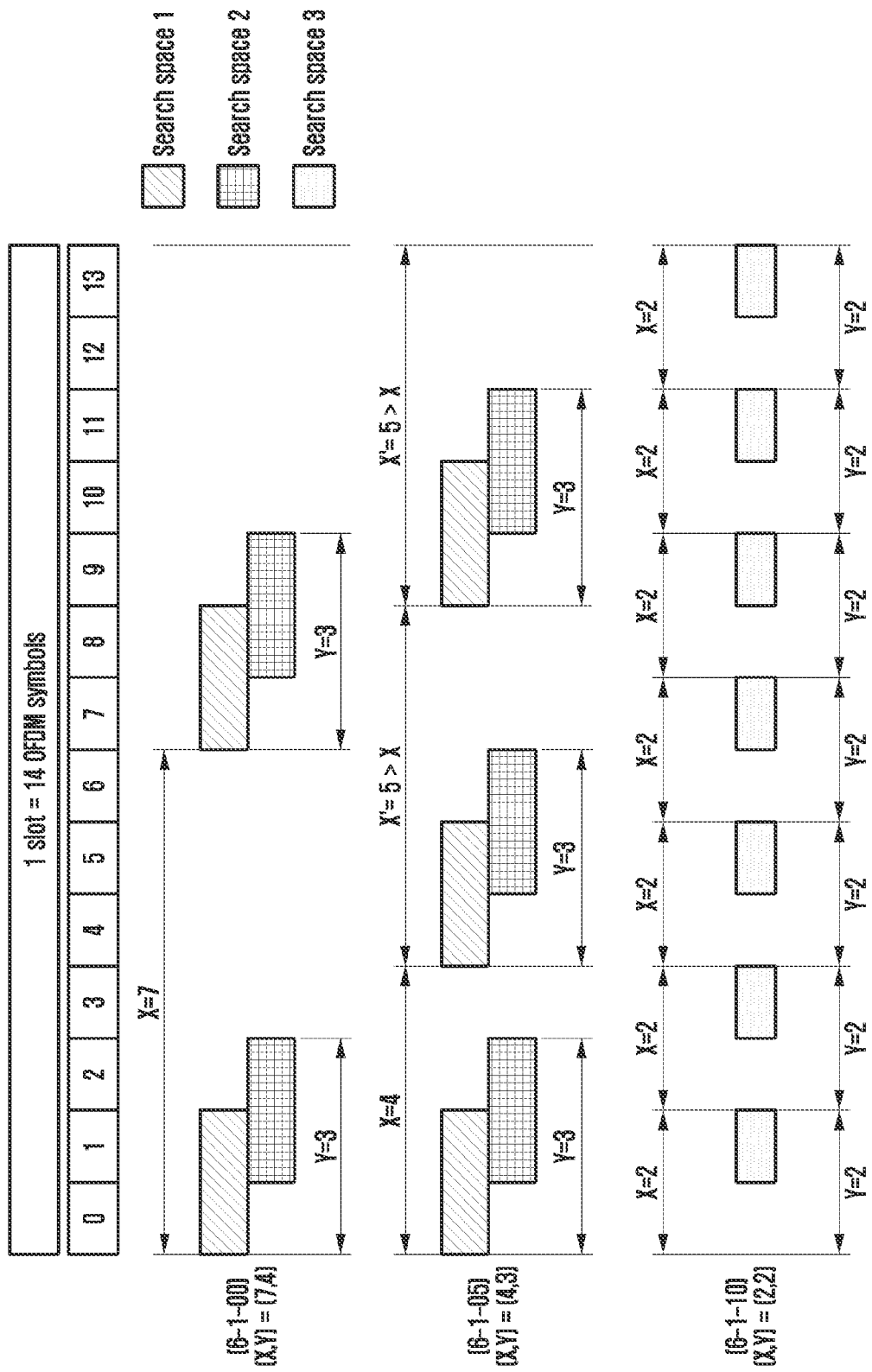

<br/>

FIG. 16
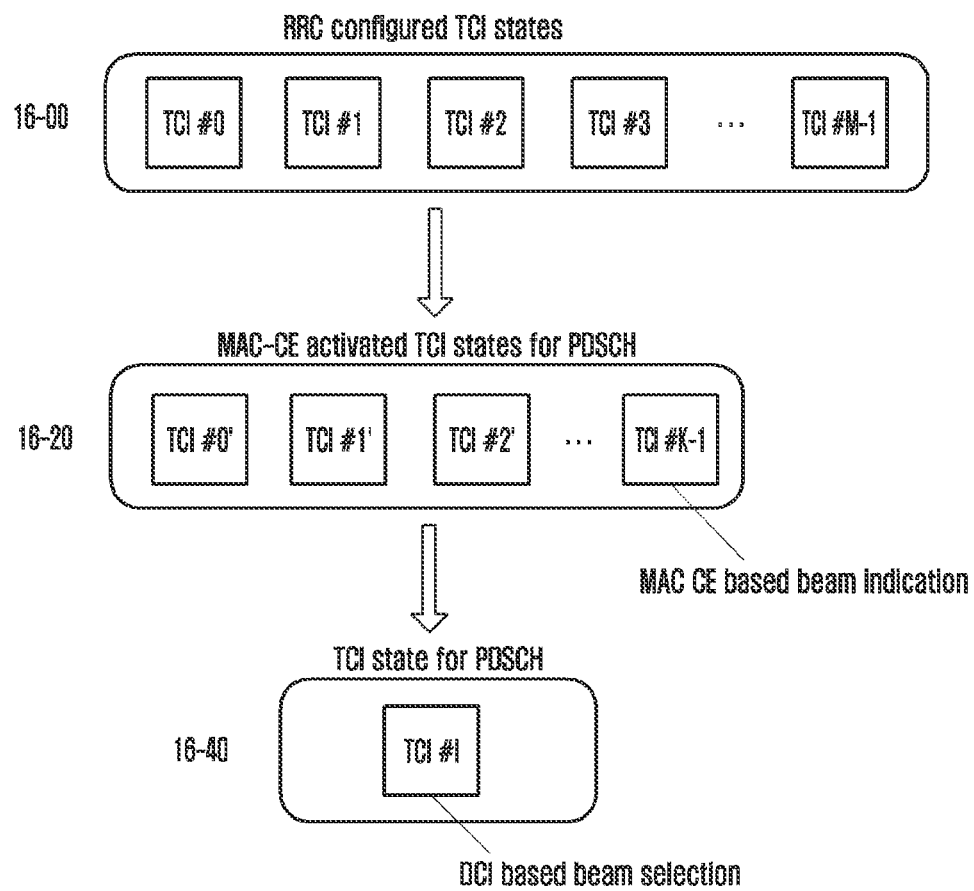
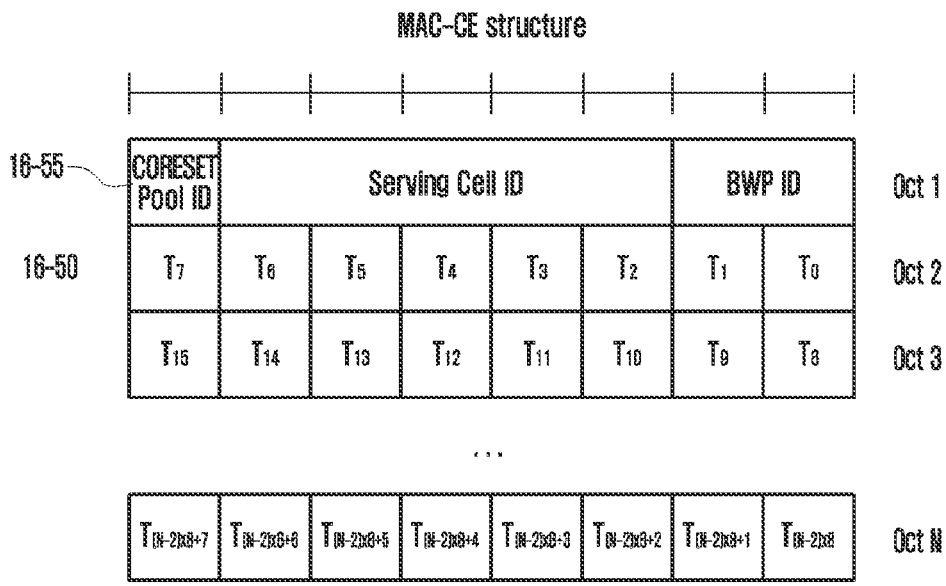

FIG. 21

| R | Serving Cell ID | BWP ID | Oct 1 |
|---|---|---|---|
| $C_0$ | TCI state $ID_{0,1}$ | | Oct 2 |
| R | TCI state $ID_{0,2}$ | | Oct 3 (Optional) |

• • • •

| $C_N$ | TCI state $ID_{N,1}$ | Oct M-1 |
|---|---|---|
| R | TCI state $ID_{N,2}$ | Oct M (Optional) |

21-05, 21-10, 21-15

FIG. 25
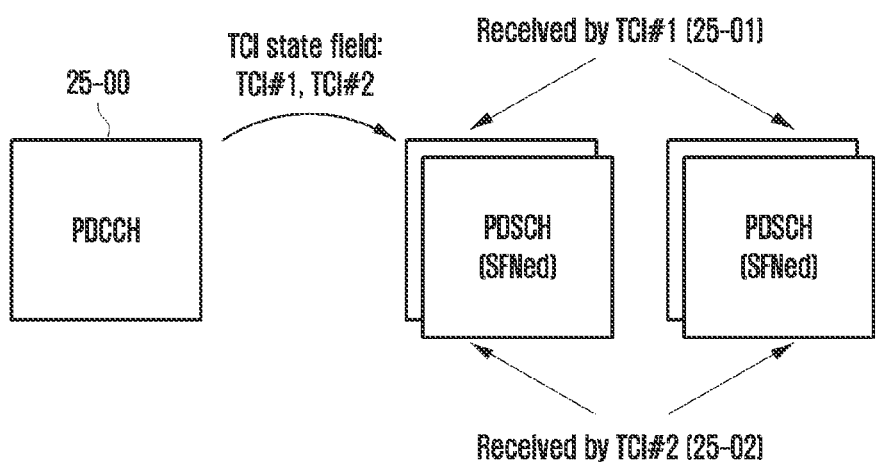
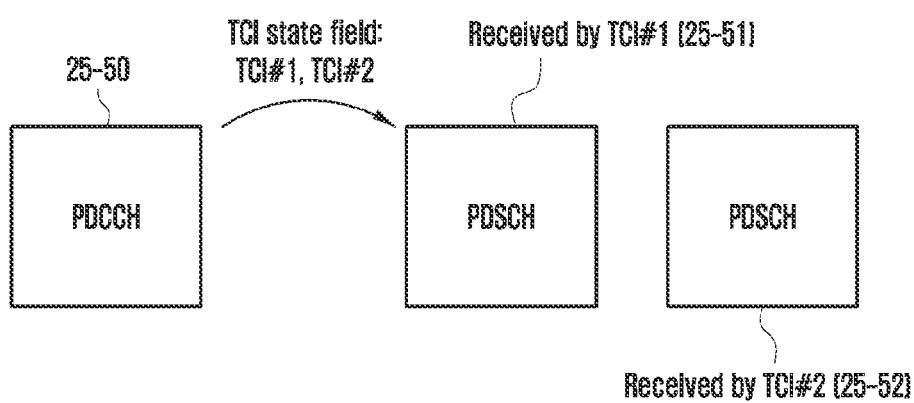

FIG. 27
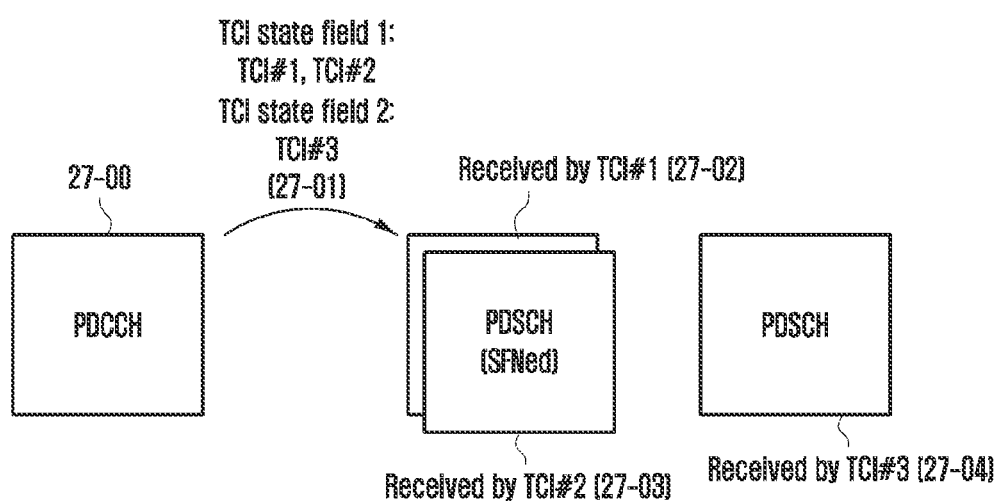
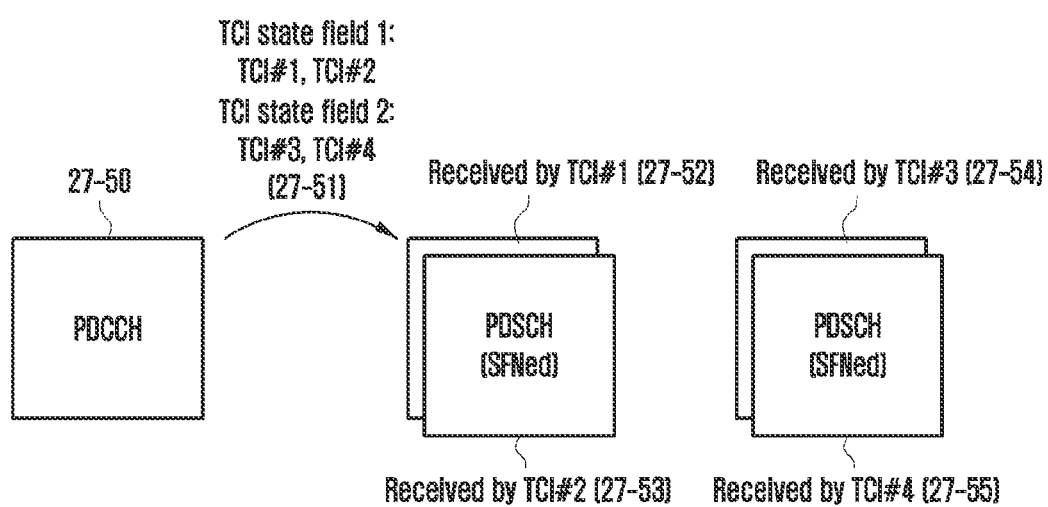

FIG. 29
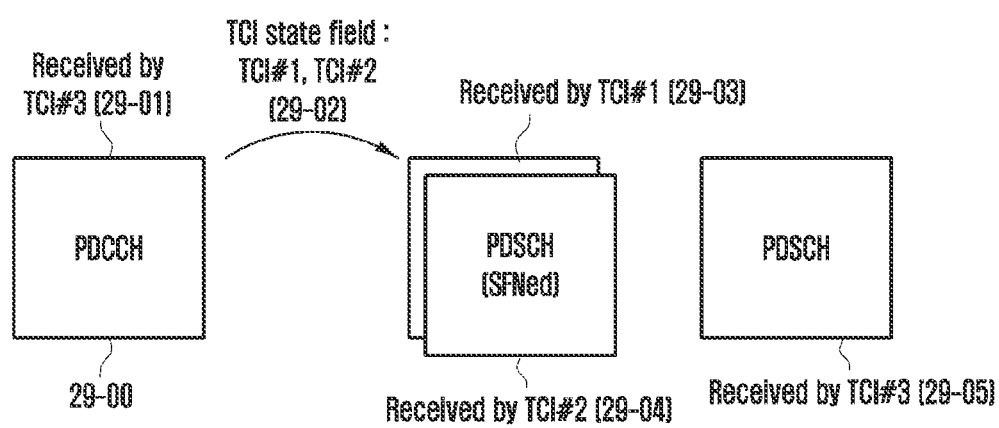
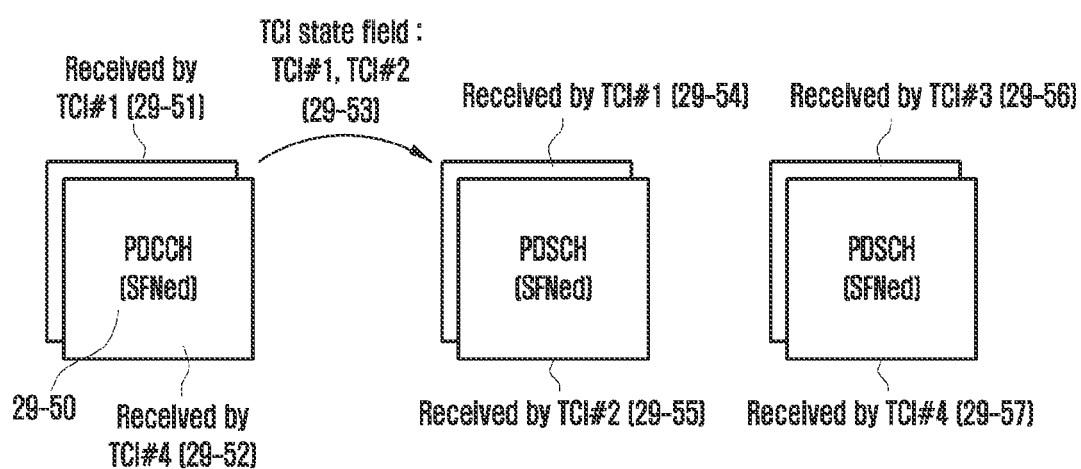

FIG. 32B

Case 2 (32-10)

| | | | |
|---|---|---|---|
| R (32-01) | Serving Cell ID | BWP ID | Oct 1 |
| $C_{1,0}$ (32-02) | TCI state $ID_{1,0,1}$ (32-03) | | Oct 2 |
| R | TCI state $ID_{1,0,2}$ | | Oct 3 (Optional) |
| $C_{1,1}$ | TCI state $ID_{1,1,1}$ | | Oct 4 |
| R | TCI state $ID_{1,1,2}$ | | Oct 5 (Optional) |

... 32-04

| | | |
|---|---|---|
| $C_{2,N-1}$ | TCI state $ID_{2,N-1,1}$ | Oct M-3 |
| R | TCI state $ID_{2,N-1,2}$ | Oct M-2 (Optional) |
| $C_{2,N}$ | TCI state $ID_{2,N,1}$ | Oct M-1 |
| R | TCI state $ID_{2,N,2}$ | Oct M (Optional) |

FIG. 32C

Case 3 (32-20)

| | | | |
|---|---|---|---|
| 32-01 — R | Serving Cell ID | BWP ID | Oct 1 |
| 32-02 — $C_{1,0}$ | TCI state $ID_{1,0,1}$ | | Oct 2 — 32-03 |
| R | TCI state $ID_{1,0,2}$ | | Oct 3 (Optional) |
| $C_{2,0}$ | TCI state $ID_{2,0,1}$ | | Oct 4 |
| R | TCI state $ID_{2,0,2}$ | | Oct 5 (Optional) |

... 32-04

| | | |
|---|---|---|
| $C_{1,N}$ | TCI state $ID_{1,N,1}$ | Oct M-3 |
| R | TCI state $ID_{1,N,2}$ | Oct M-2 (Optional) |
| $C_{2,N}$ | TCI state $ID_{2,N,1}$ | Oct M-1 |
| R | TCI state $ID_{2,N,2}$ | Oct M (Optional) |

METHOD AND APPARATUS FOR DATA TRANSMISSION IN NETWORK COOPERATIVE COMMUNICATIONS

CROSS-REFERENCE TO RELATED APPLICATION(S)

This application is based on and claims priority under 35 U.S.C. § 119 to Korean Patent Application No. 10-2021-0058361, filed on May 6, 2021, in the Korean Intellectual Property Office, the entirety of which is incorporated herein by reference.

BACKGROUND

1. Field

The disclosure relates generally to operations of a terminal and a base station in a wireless communication system, including a method for transmitting data in a duplicate and repetitive manner in network cooperative communication, and an apparatus capable of performing the same.

2. Description of Related Art $5^{th}$ generation (5G) mobile communication technologies define broad frequency bands and possible that high transmission rates and new services are possible, implemented in Sub 6 GHz bands such as 3.5 GHz and in above 6 GHz bands (referred to as mmWave) including 28 GHz and 39 GHz. In addition, it has been considered to implement $6^{th}$ generation (6G) mobile communication technologies, i.e., beyond 5G systems, in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there were ongoing standardization regarding beamforming and massive multi-input multi-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amounts of data transmission and a polar code for highly reliable transmission of control information, L2 pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) Power Saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures, i.e., 2-step random access channel (RACH) for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning), AI service support, metaverse service support, and drone communication.

Further, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

Aspects of the disclosure provide an apparatus and a method capable of effectively providing a service in a mobile communication system.

An embodiment of the disclosure provides a method performed by a terminal configured to operate in a communication system including transmitting capability information related to a physical downlink shared channel (PDSCH) transmission scheme; receiving a radio resource control (RRC) message including configuration information related to the PDSCH transmission scheme; receiving downlink control information (DCI) on a physical downlink control channel (PDCCH), the DCI including one or more transmission configuration indication (TCI) fields indicating one or more TCI states; and in case that the configuration information includes single frequency network (SFN) PDSCH scheme related information and PDSCH repetition scheme related information and two TCI states are indicated by the DCI, performing reception of one or more SFN PDSCH repetitions using the two TCI states.

An embodiment of the disclosure provides a method performed by a base station configured to operate in a communication system that includes receiving capability information related to a PDSCH transmission scheme; transmitting an RRC message including configuration information related to the PDSCH transmission scheme; transmitting DCI on a PDCCH, the DCI including one or more TCI fields indicating one or more TCI states; and in case that the configuration information includes SFN PDSCH scheme related information and PDSCH repetition scheme related information and two TCI states are indicated by the DCI, performing transmission of one or more SFN PDSCH repetitions using the two TCI states.

An embodiment of the disclosure provides a terminal configured to operate in a communication system is provided that includes a transceiver and a controller coupled with the transceiver and configured to transmit capability information related to a PDSCH transmission scheme, to receive an RRC message including configuration information related to the PDSCH transmission scheme, to receive DCI on a PDCCH, the DCI including one or more TCI fields indicating one or more TCI states, and in case that the configuration information includes SFN PDSCH scheme related information and PDSCH repetition scheme related information and two TCI states are indicated by the DCI, to perform reception of one or more SFN PDSCH repetitions using the two TCI states.

An embodiment of the disclosure provides a base station configured to operate in a communication system that includes a transceiver and a controller coupled with the transceiver and configured to receive capability information related to a PDSCH transmission scheme, to transmit an RRC message including configuration information related to the PDSCH transmission scheme, to transmit DCI on a PDCCH, the DCI including one or more TCI fields indicating one or more TCI states, and in case that the configuration information includes SFN PDSCH scheme related information and PDSCH repetition scheme related information and two TCI states are indicated by the DCI, to perform transmission of one or more SFN PDSCH repetitions using the two TCI states.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates an example of configuration of a control resource set of a downlink control channel in a wireless communication system according to an embodiment;

FIG. 6B illustrates, through a span, a case in which a UE may have multiple PDCCH monitoring occasions within a slot in a wireless communication system according to an embodiment;

FIG. 16 illustrates a procedure for beam configuration and activation of a PDSCH in a wireless communication system according to an embodiment;

FIG. 21 illustrates an enhanced PDSCH TCI state activation/deactivation MAC-CE structure according to an embodiment;

FIG. 25 illustrates a method for combining multi-TRP-based SFN PDSCH transmission and multi-TRP-based TDM scheme A transmission according to an embodiment;

FIG. 27 illustrates an intra-slot repetitive transmission method using three or more transmission beams during multi-TRP-based SFN PDSCH transmission using two TCI state fields according to an embodiment;

FIG. 29 illustrates an intra-slot repetitive transmission method using three or more transmission beams during multi-TRP-based SFN PDSCH transmission using one TCI state and a TCI state of a control resource set according to an embodiment;

FIG. 32B illustrates another structure of a MAC-CE indicating activation/deactivation with regard to each TCI state field when a plurality of TCI state fields are used and indicated according to an embodiment;

FIG. 32C illustrates another structure of a MAC-CE indicating activation/deactivation with regard to each TCI state field when a plurality of TCI state fields are used and indicated according to an embodiment;

DETAILED DESCRIPTION

Figure 1:
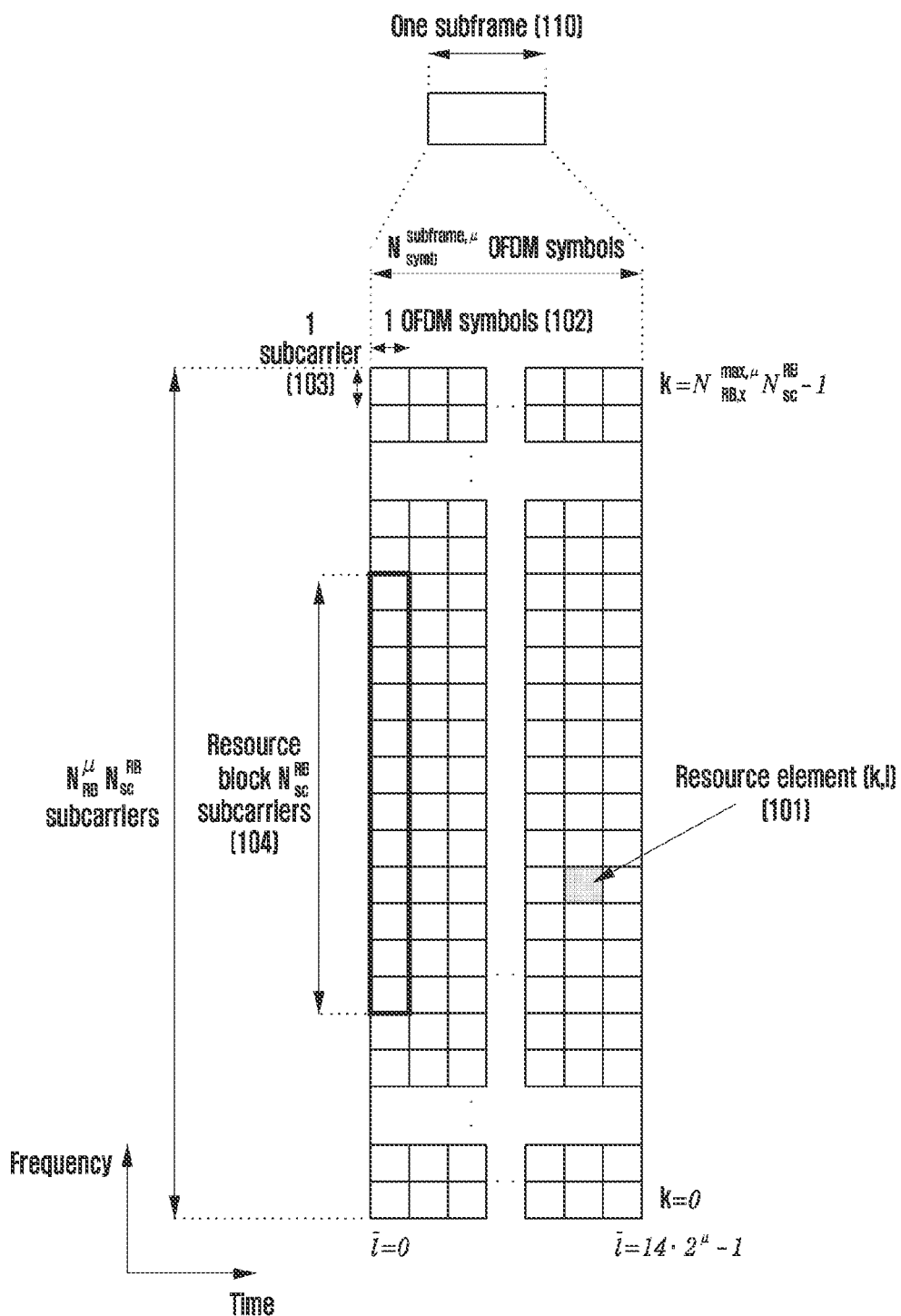
FIG. 1 illustrates a basic structure of a time-frequency domain in a wireless communication system according to an embodiment.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided to inform those skilled in the art of the scope of the disclosure, and the disclosure is defined only by the scope of the appended claims. Throughout the description herein, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the entire description herein.

In the following description, a base station is an entity that allocates resources to terminals, and may be at least one of a gNode B, an eNode B, a Node B, a base station (BS), a wireless access unit, a BS controller, and a node on a network. A terminal may include a UE, a mobile station (MS), a cellular phone, a smartphone, a computer, or a multimedia system capable of performing communication functions. A downlink (DL) refers to a radio link via which a base station transmits a signal to a terminal, and an uplink (UL) refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the 5G covers the existing LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart may include illustrations that represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term unit refers to a software element or a hardware element, such as a field programmable gate array (FPGA) or an application specific integrated circuit (ASIC), which performs a predetermined function. However, unit does not always have a meaning limited to software or hardware. Unit may be constructed either to be stored in an addressable storage medium or to execute one or more processors. Therefore, unit includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the unit may be either combined into a smaller number of elements, or a unit, or divided into a larger number of elements, or a unit. Moreover, the elements and units or may be implemented to reproduce one or more CPUs within a device or a security multimedia card. Further, the unit in the embodiments may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a DL and employs a single carrier frequency division multiple access (SC-FDMA) scheme in a UL. The uplink indicates a radio link through which a UE or an MS transmits data or control signals to a BS (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a communication system subsequent to LTE, must freely reflect various requirements of users, service providers, and the like, services satisfying various requirements must be supported. The services considered in the 5G communication system include eMBB communication, mMTC, URLLC, and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced MIMO transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of things (IoT) in the 5G communication system. mMTC has requirements, such as support of connection of a large number of UEs in a cell, enhancement coverage of UEs, improved battery time, a reduction in the cost of a UE, and the like, in order to effectively provide the IoT. Since the IoT provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

Three services in 5G, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the three services described above.

NR Time-Frequency Resource

Hereinafter, the frame structure of a 5G system will be described in more detail with reference to the drawings.

FIG. 1 illustrates the basic structure of a time-frequency domain in a wireless communication system according to an embodiment.

Referring to FIG. 1, the horizontal axis represents a time domain, and the vertical axis represents a frequency domain. A basic unit of resources in the time-frequency domain may be a resource element (RE) 101. The resource element 101 may be one OFDM symbol 102 in a time domain and 1 subcarrier 103 in a frequency domain. In the frequency domain, $N_{sc}^{RB}$ (for example, 12) consecutive REs may configure one resource block (RB) 104. In the time domain, $N_{symb}^{subframe}$ successive OFDM symbols may correspond to one subframe 110.

Figure 2:
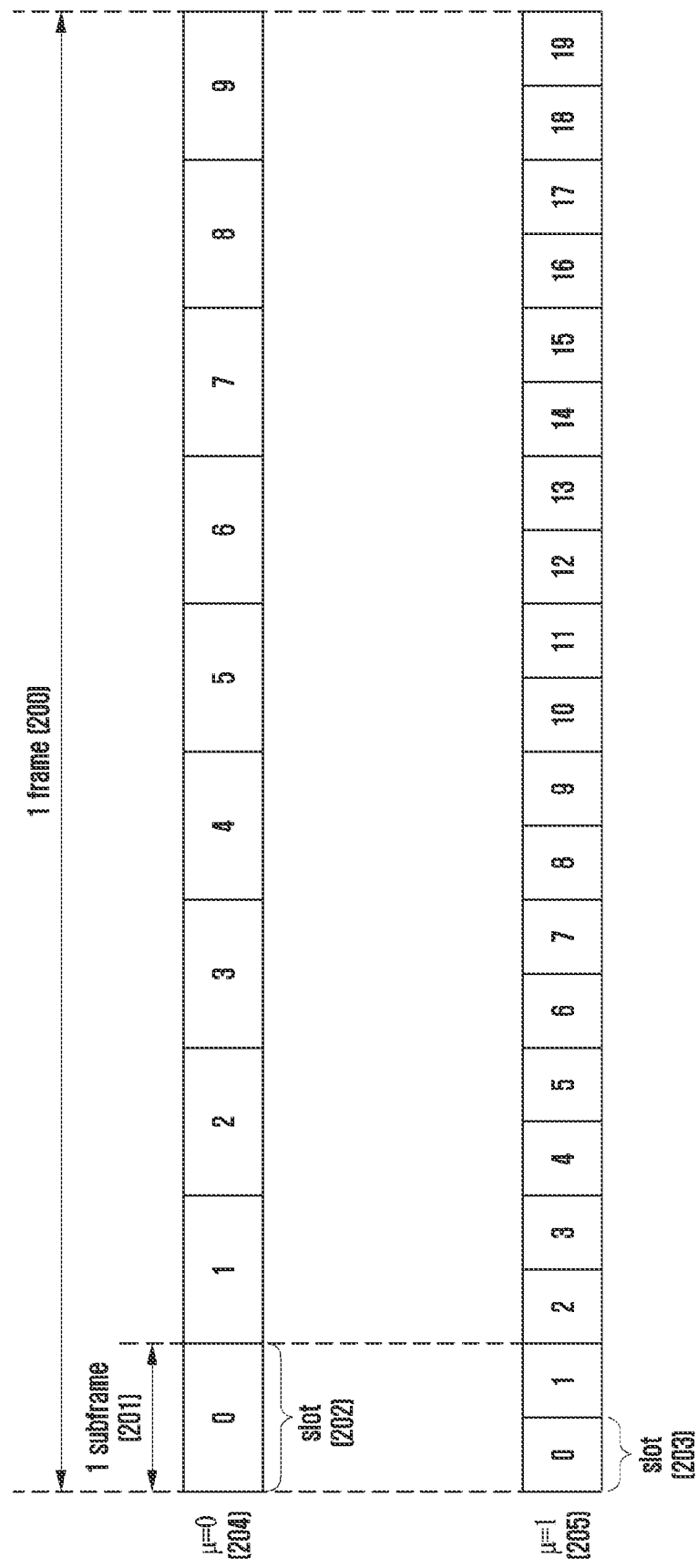
FIG. 2 illustrates a frame, a subframe, and a slot structure in a wireless communication system according to an embodiment.

FIG. 2 illustrates a frame, a subframe, and a slot structure in a wireless communication system according to an embodiment.

Referring to FIG. 2, an example of a structure of a frame 200, a subframe 201, and a slot 202 is illustrated. One frame 200 may be 10 ms. One subframe 201 may be 1 ms, and thus the one frame 200 may be configured by a total of ten subframes 201. One slot 202 or 203 may be fourteen OFDM symbols (i.e., the number of symbols for one slot ($N_{symbol}^{slot}$=14)). One subframe 201 may include one or multiple slots 202 and 203, and the number of slots 202 and 203 per one subframe 201 may differ according to configuration value p 204 or 205 for a subcarrier spacing. In the example of FIG. 2, a case in which the subcarrier spacing configuration value is μ=0 (204) and μ=1 (205) is illustrated. If μ=0 (204), one subframe 201 may include one slot 202, and if μ=1 (205), the one subframe 201 may include two slots 203. That is, the number of slots per one subframe ($N_{slot}^{subframe,\mu}$) may differ according to a subcarrier spacing configuration value p, and accordingly, the number of slots per 1 frame ($N_{slot}^{frame,\mu}$) may differ. According to each subcarrier spacing configuration μ, $N_{slot}^{subframe,\mu}$ and $N_{slot}^{frame,\mu}$ is provided in Table 1, below.

TABLE 1

| μ | $N_{symbol}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Bandwidth Part (BWP)

Next, the BWP configuration in a 5G communication system will be described in detail with reference to the drawings.

Figure 3:
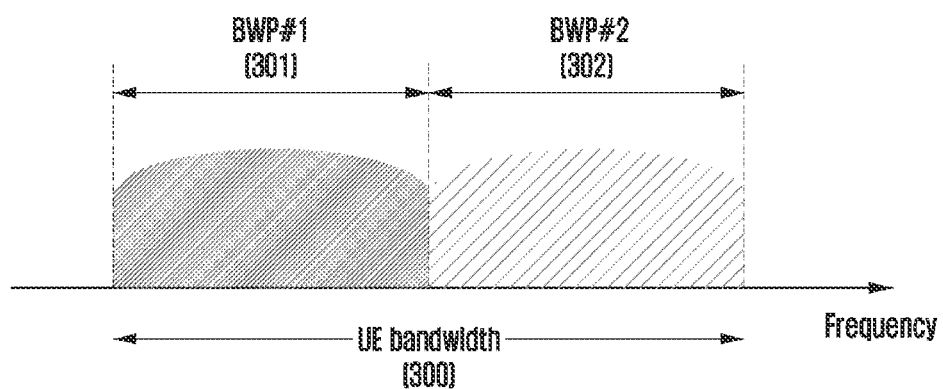
FIG. 3 illustrates a bandwidth part configuration in a wireless communication system according to an embodiment.

FIG. 3 illustrates a BWP configuration in a wireless communication system according to an embodiment.

Referring to FIG. 3, an example is provided in which a UE bandwidth 300 is configured by two BWPs, that is, BWP #1 301 and BWP #2 302. The base station may configure one or multiple BWPs for the UE, and may configure pieces of information as shown in Table 2, below for each bandwidth part.

TABLE 2

```
BWP ::=                           SEQUENCE {
    bwp-Id                            BWP-Id,
    (bandwidth part identifier)
    locationAndBandwidth              INTEGER (1..65536),
    (bandwidth part location)
    subcarrierSpacing                 ENUMERATED {n0, n1, n2, n3, n4, n5},
    (subcarrier spacing)
    cyclicPrefix                      ENUMERATED { extended }
    (cyclic prefix)
}
```

An embodiment of the disclosure is not limited to the above example, and in addition to the configuration information, various parameters related to a BWP may be configured in the UE and some pieces of information may be omitted. The pieces of information may be transmitted by the base station to the UE via higher layer signaling, for example, RRC signaling. At least one BWP among the configured one or multiple BWPs may be activated. Whether to activate the configured BWP may be semi-statically transmitted from the base station to the UE via RRC signaling or may be dynamically transmitted through DCI.

A UE before RRC connection may be configured with an initial BWP for initial access from a base station through a master information block (MIB). More specifically, the UE may receive configuration information about a search apace and a control resource set (CORESET) through which the PDCCH for reception of system information required for initial access (which may correspond to remaining system information (RMSI) or system information block 1 (SIB 1)) may be transmitted through the MIB in an initial access operation. The CORESET and search space, which are configured through the MIB, may be regarded as identity (ID) 0, respectively. The base station may notify the UE of configuration information, such as frequency allocation information, time allocation information, and corresponding numeral for the control resource set #0 through the MIB. In addition, the base station may notify the UE of configuration information regarding the monitoring periodicity and occasion for the control resource set #0, that is, configuration information regarding the search space #0, through the MIB. The UE may regard the frequency domain configured as the control resource set #0, obtained from the MIB, as an initial BWP for initial access. Here, the identifier (ID) of the initial BWP may be regarded as zero.

The configuration of the BWP supported by 5G may be used for various purposes.

A case in which a bandwidth supported by the UE is less than a system bandwidth may be supported through the BWP configuration. For example, the base station configures, in the UE, a frequency location (configuration information 2) of the BWP to enable the UE to transmit or receive data at a specific frequency location within the system bandwidth.

Further, the base station may configure multiple BWPs in the UE for the purpose of supporting different numerologies. For example, in order to support both data transmission/reception to/from a predetermined UE by using a subcarrier spacing of 15 kHz and a subcarrier spacing of 30 kHz, two BWPs may be configured to use a subcarrier spacing of 15 kHz and a subcarrier spacing of 30 kHz, respectively. Different BWPs may be frequency division multiplexed, and when attempting to transmit or receive data at a specific subcarrier spacing, the BWP configured with the corresponding subcarrier spacing may be activated.

In addition, the base station may configure, in the UE, the BWPs having bandwidths of different sizes for the purpose of reducing power consumption of the UE. For example, when the UE supports a very large bandwidth, for example, a bandwidth of 100 MHz, and always transmits or receives data at the corresponding bandwidth, the transmission or reception may cause very high power consumption in the UE. In particular, when the UE performs monitoring on an unnecessary downlink control channels of a large bandwidth of 100 MHz even when there is no traffic, the monitoring may be very inefficient in terms of power consumption. Therefore, in order to reduce power consumption of the UE, the base station may configure, for the UE, a BWP of a relatively small bandwidth, for example, a BWP of 20 MHz. In a situation without traffic, the UE may perform a monitoring operation on a BWP of 20 MHz. When data to be transmitted or received has occurred, the UE may transmit or receive data in a BWP of 100 MHz according to an indication of the base station.

In a method of configuring the BWP, the UEs before the RRC connection may receive configuration information about the initial bandwidth part through the MIB in the initial connection operation. More specifically, the UE may be configured with a CORESET for a downlink control channel through which DCI for scheduling a SIB may be transmitted from a MIB of a physical broadcast channel (PBCH). The bandwidth of the control resource set configured through the MIB may be regarded as the initial BWP. The UE may receive, through the configured initial BWP, a PDSCH through which the SIB is transmitted. The initial BWP may be used for other system information (OSI), paging, and random access as well as the reception of the SIB.

Bandwidth Part (BWP) Switch

When one or more BWPs have been configured for a UE, a base station may indicate the UE to change (or switching, transition) the BWP by using a bandwidth part indicator field in DCI. As an example, in FIG. 3, when the currently activated BWP of the UE is BWP #1 301, the base station may indicate BWP #2 302 to the UE by using the BWP indicator in DCI, and the UE may perform a BWP switch to the BWP #2 302 indicated by the BWP indicator in the received DCI.

As described above, since the DCI-based BWP change may be indicated by the DCI scheduling the PDSCH or PUSCH, when receiving a request to switch the BWP, the UE should smoothly receive or transmit the PDSCH or PUSCH, which is scheduled by the DCI, without difficulty in the switched BWP. To this end, the requirements for a delay time ($T_{BWP}$) required when switching the BWP, and is shown in Table 3, below.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |

TABLE 3-continued

| μ | NR Slot length (ms) | BWP switch delay $T_{BWP}$ (slots) | |
|---|---|---|---|
| | | Type 1[Note 1] | Type 2[Note 1] |
| 2 | 0.25 | 3 | 9 |
| 3 | 0.125 | 6 | 18 |

Note 1:
Depends on UE capability.

Note 2:
If the BWP switch involves changing of SCS, the BWP switch delay is determined by the larger one between the SCS before BWP switch and the SCS after BWP switch.

The requirements for the BWP switch delay time support type 1 or type 2 depending on UE capability. The UE may report a BWP delay time type that is supportable to the base station.

When the UE receives the DCI including the BWP switch indicator in slot n according to the requirements for the BWP switch delay time, the UE may complete a switch to a new BWP indicated by the BWP switch indicator at a time not later than slot n+$T_{BWP}$, and may perform transmission and reception with respect to a data channel scheduled by the corresponding DCI in the switched new BWP. When the base station intends to schedule the data channel to the new BWP, the base station may determine a time domain resource assignment for the data channel by considering the BWP switch delay time ($T_{BWP}$) of the UE. That is, when the base station schedules the data channel to the new BWP, the base station may schedule the corresponding data channel after the BWP switch delay time according to the method for determining time domain resource assignment for the data channel. Therefore, the UE may not expect the DCI indicating the BWP switch to indicate a slot offset (K0 or K2) value less than the BWP switch delay time ($T_{BWP}$).

If the UE receives the DCI (for example, DCI format 1_1 or 0_1) indicating the BWP switch, the UE may not perform transmission or reception during a time interval from a third symbol of the slot in which the PDCCH including the DCI is received to a start time of the slot indicated by the slot offset (K0 or K2) value indicated by the time domain resource allocation indicator field in the DCI. For example, if the UE has received the DCI indicating the BWP switch in slot n and the slot offset value indicated by the DCI is K, the UE may not perform transmission or reception from the third symbol of the slot n to the symbol prior to slot n+K (i.e., the last symbol of slot n+K−1).

SS/PBCH Block

Next, a synchronization signal (SS)/PBCH block in 5G will be described.

The SS/PBCH block may refer to a physical layer channel block including a primary SS (PSS), a secondary SS (SSS), and a PBCH. Specifically, the SS/PBCH block is as follows:

PSS: a signal serves as a reference for downlink time/frequency synchronization and provides some information of a cell ID.

SSS: a signal serves as a reference for downlink time/frequency synchronization, and provides the remaining cell ID information that is not provided by the PSS. In addition, the SSS may serve as a reference signal for demodulation of the PBCH.

PBCH: the PBCH provides essential system information required for transmission or reception of a data channel and a control channel of a UE. The essential system information may include search space related control information indicating radio resource mapping information of a control channel, scheduling control information for a separate data channel for transmission of system information, and the like.

SS/PBCH block: the SS/PBCH block includes a combination of a PSS, an SSS, and a PBCH. One or multiple SS/PBCH blocks may be transmitted within 5 ms, and each of the transmitted SS/PBCH blocks may be distinguished by indices.

The UE may detect the PSS and the SSS in the initial access operation, and may decode the PBCH. The UE may obtain the MIB from the PBCH, and may be configured with the CORESET #0 (which may correspond to the control resource set having the CORESET index of 0) therefrom. The UE may monitor the control resource set #0 under the assumption that a demodulation reference signal (DMRS) transmitted in the selected SS/PBCH block and the control resource set #0 is quasi-co-located (QCLed). The UE may receive system information based on downlink control information transmitted from the control resource set #0. The UE may obtain, from the received system information, configuration information related to a RACH required for initial access. The UE may transmit a physical RACH (PRACH) to the base station by considering the selected SS/PBCH index, and the base station having received the PRACH may obtain information about an SS/PBCH block index selected by the UE. The base station may know which block is selected among the SS/PBCH blocks by the UE, and may know that the control resource set #0 associated therewith is monitored.

Discontinuous Reception (DRX)

Figure 4:
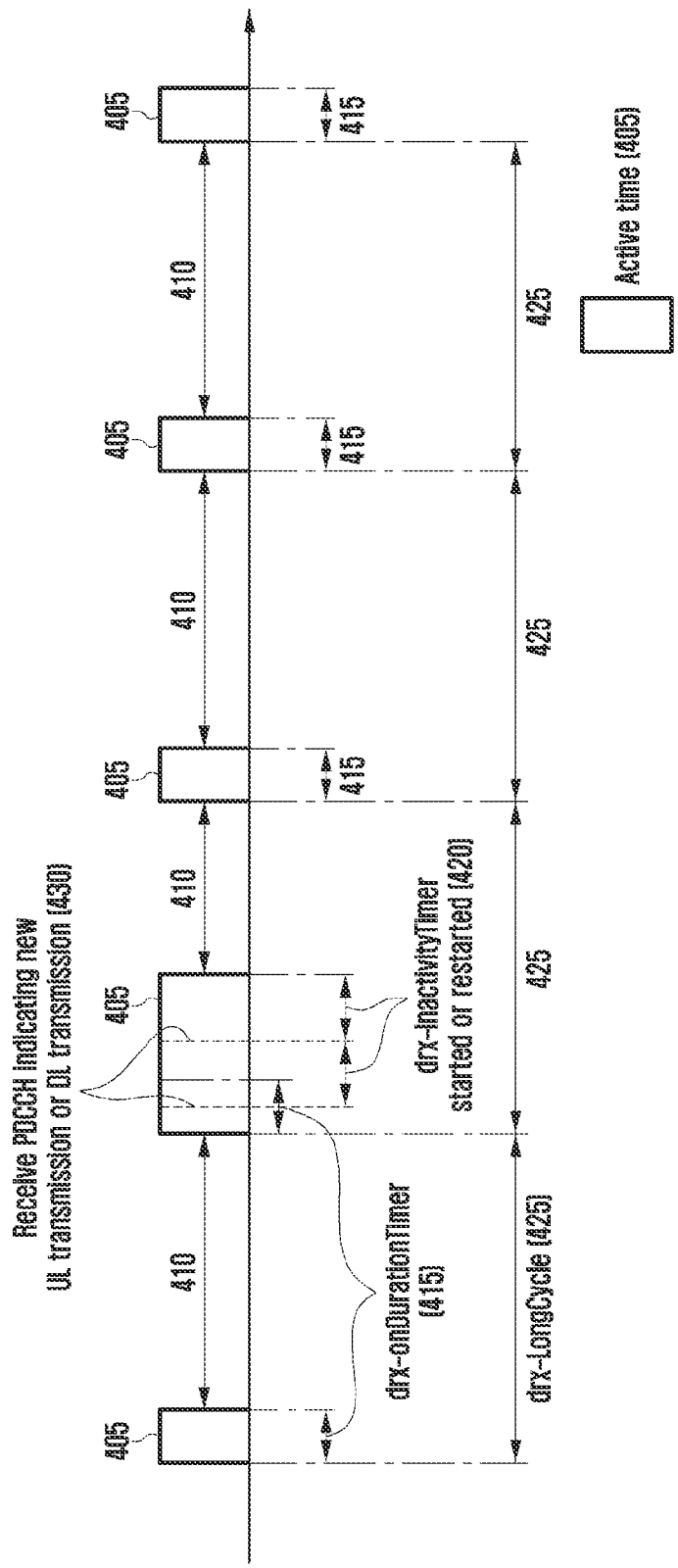
FIG. 4 illustrates discontinuous reception (DRX) in a wireless communication system according to an embodiment.

FIG. 4 illustrates DRX in a wireless communication system according to an embodiment.

DRX is an operation in which the UE that is using a service discontinuously receives data in an RRC connected state in which a radio link is established between the base station and the UE. When the DRX is applied, the UE turns on a receiver at a specific time point to monitor a control channel and turns off the receiver when no data is received during a predetermined period, and thus the power consumption of the UE may be reduced. The DRX operation may be controlled by an MAC layer device based on various parameters and a timer.

Referring to FIG. 4, an active time 405 is a time when the UE wakes up every DRX cycle and monitors the PDCCH. The active time 405 is provided, as follows.

drx-onDurationTimer, drx-InactivityTimer, drx-RetransmissionTimerDL, drx-RetransmissionTimerUL, or ra-ContentionResolutionTimer is running; or a Scheduling Request is sent on PUCCH and is pending; or a PDCCH indicating a new transmission addressed to the C-RNTI of the MAC entity has not been received after successful reception of a random access response for the random access preamble not selected by the MAC entity among the contention-based random access preamble drx-onDurationTimer, drx-Inactivity Timer, drx-RetransmissionTimerDL, drx-RetransmissionTimerUL, ra-ContentionResolutionTimer, and the like are timers, the values of which are configured by the base station, and have a function of configuring the UE to monitor the PDCCH in a situation in which a predetermined condition is satisfied.

drx-onDurationTimer 415 is a parameter for configuring a minimum time for which the UE is awake in a DRX cycle. drx-InactivityTimer 420 is a parameter for configuration of a time for which the UE is additionally awake when receiving a PDCCH indicating new UL transmission or DL transmission (430). drx-RetransmissionTimerDL is a parameter for configuring a maximum time for which the UE is awake so as to receive DL retransmission in a DL HARQ procedure. The drx-RetransmissionTimerUL is a parameter for configuring a maximum time for which the UE is awake so as to receive an UL retransmission grant in an UL HARQ procedure. drx-onDurationTimer, drx-InactivityTimer, drx-RetransmissionTimerDL, and drx-RetransmissionTimerUL may be configured as, for example, the time, the number of subframes, the number of slots, and the like. ra-ContentionResolutionTimer is a parameter for monitoring the PDCCH in a random access procedure.

inActive time 410 is a time configured not to monitor the PDCCH during the DRX operation, and/or a time configured not to receive the PDCCH, and the remaining time excluding the active time 405 from the entire time of performing the DRX operation may become the inActive time 410. When the PDCCH is not monitored for the active time 405, the UE may enter a sleep or inActive state to reduce power consumption.

The DRX cycle refers to a cycle in which the UE wakes up and monitors the PDCCH. That is, the DRX cycle refers to on duration occurrence period or a time interval until the UE monitors the PDCCH and then monitors the next PDCCH. There are two types of DRX cycles, that is, short DRX cycle and long DRX cycle. The short DRX cycle may be optionally applied.

A long DRX cycle 425 is a longer cycle between the two DRX cycles configured in the UE. The UE starts the drx-onDurationTimer 415 again at a time point at which the long DRX cycle 425 has elapsed from the start point (e.g., start symbol) of the drx-onDurationTimer 415 while operating in long DRX. When operating in the long DRX cycle 425, the UE may start the drx-onDurationTimer 415 in a slot after drx-SlotOffset in a subframe satisfying Equation (1), below. The drx-SlotOffset refers to a delay before the start of the drx-onDurationTimer 415. The drx-SlotOffset may be configured as, for example, the time, the number of slots, and the like, further to Equation (1).

$$[(SFN \times 10) + \text{subframe number}] \text{modulo}(drx\text{-Long-Cycle}) = drx\text{-StartOffset} \quad (1)$$

Here, the drx-LongCycleStartOffset may include the long DRX cycle 425 and drx-StartOffset and may be used to provide a subframe to start the long DRX cycle 425. The drx-LongCycleStartOffset may be configured as, for example, the time, the number of subframes, the number of slots, and the like.

PDCCH: DCI Related

Next, DCI in a 5G system will be described in detail.

In the 5G system, scheduling information about uplink data (or physical uplink shared channel (PUSCH) or downlink data (or PDSCH) is transmitted from a base station to a UE through the DCI. The UE may monitor a fallback DCI format and a non-fallback DCI format with regard to the PUSCH or the PDSCH. The fallback DCI format may include a fixed field predefined between the base station and the UE, and the non-fallback DCI format may include a configurable field.

The DCI may be transmitted through a PDCCH which is a physical downlink control channel after channel coding and modulation is performed thereon. A cyclic redundancy check (CRC) may be attached to a DCI message payload, and the CRC may be scrambled by a radio network temporary identifier (RNTI) corresponding to the identification information of the UE. Different RNTIs may be used according to the purpose of the DCI message, for example, a UE-specific data transmission, a power adjustment command, or a random access response. That is, the RNTI is not explicitly transmitted, but is included in a CRC calculation process and then transmitted. When receiving the DCI message transmitted through the PDCCH, the UE may check a CRC by using an assigned RNTI. When a CRC check result is correct, the UE may know that the corresponding message has been transmitted to the UE.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled by a TPC-RNTI. DCI for scheduling UE-specific PDSCH or PUSCH may be scrambled by a cell RNTI (C-RNTI).

DCI format 0_0 may be used as a fallback DCI for scheduling a PUSCH. Here, a CRC may be scrambled by a C-RNTI. The DCI format 0_0 in which the CRC is scrambled by the C-RNTI may include, for example, pieces of information such as are set forth in Table 4, below.

TABLE 4

Identifier for DCI formats - [1] bit
Frequency domain resource assignment - $\lceil \log_2(N_{RB}^{UL,\ BWP}(N_{RB}^{UL,\ BWP} + 1)/2) \rceil$ bits
Time domain resource assignment - X bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled PUSCH - [2] bits
Uplink (UL)/supplementary UL (SUL) indicator - 0 or 1 bit DCI format 0_1 may be used as anon-fallbackDCI for scheduling a PUSCH. Here, a CRC may be scrambled by a C-RNTI. The DCI format 0_1 in which the CRC is scrambled by the C-RNTI may include, for example, pieces of information as set forth in Table 5, below.

TABLE 5

- Carrier indicator-0 or 3 bits
- UL/SUL indicator-0 or 1 bit
- Identifier for DCI formats-[1] bits
- Bandwidth part indicator-0, 1 or 2 bits
- Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2) \rceil$ bits
- Time domain resource assignment-1, 2, 3, or 4 bits
- Virtual resource block (VRB)-to-physical resource block (PRB) mapping-0 or 1 bit, only for resource allocation type 1.
    0 bit if only resource allocation type 0 is configured,
    1 bit otherwise.
- Frequency hopping flag-0 or 1 bit, only for resource allocation type 1.
    0 bit if only resource allocation type 0 is configured;
    1 bit otherwise.
- Modulation and coding scheme-5 bits
- New data indicator-1 bit
- Redundancy version-2 bits
- HARQ process number-4 bits
    1st downlink assignment index-1 or 2 bits
        1 bit for semi-static HARQ-ACK codebook;
        2 bits for dynamic HARQ-ACK codebook with single HARQ-ACK codebook.
- 2nd downlink assignment index-0 or 2 bits
        2 bits for dynamic HARQ-ACK codebook with two HARQ-ACK sub-codebooks;
        0 bit otherwise.
- TPC command for scheduled PUSCH-2 bits -
    Sounding reference signal (SRS) resource indicator $\left\lceil \log_2\left(\sum_{k=1}^{L_{max}} \binom{N_{SRS}}{k}\right) \right\rceil$ or $\lceil \log_2(N_{SRS}) \rceil$ bits

• $\left\lceil \log_2\left(\sum_{k=1}^{L_{max}} \binom{N_{SRS}}{k}\right) \right\rceil$ bits for non-codebook based PUSCH transmission;

• $\lceil \log_2(N_{SRS}) \rceil$ bits for codebook based PUSCH transmission.
- Precoding information and number of layers-up to 6 bits
- Antenna ports-up to 5 bits
- SRS request-2 bits
- Channel state information (CSI) request-0, 1, 2, 3, 4,
- Code block group (CBG) transmission information-0, 2, 4, 6, or 8 bits
    Phase tracking reference signal (PTRS)-DMRS association-0 or 2 bits.
- beta_offset indicator-0 or 2 bits
- DMRS sequence initialization-0 or 1 bit DCI format 1_0 may be used as a fallback DCI for scheduling a PDSCH. Here, a CRC may be scrambled by a C-RNTI. The DCI format 1_0 in which the CRC is scrambled by the C-RNTI may include, for example, the following pieces of information below.

TABLE 6

Identifier for DCI formats - [1] bit
Frequency domain resource assignment -
$[\lceil \log_2(N_{RB}^{DL,\,BWP}(N_{RB}^{DL,\,BWP} + 1)/2 \rceil]$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits DCI format 1_1 may be used as a non-fallback DC for scheduling a PDSCH. Here, a CRC may be scrambled by a C-RNTI. The DCI format 1_1 in which the CRC is scrambled by the C-RNTI may include, for example, pieces of information below.

TABLE 7

Carrier indicator - 0 or 3 bits
Identifier for DCI formats - [1] bits
BWP indicator - 0, 1 or 2 bits
Frequency domain resource assignment
For resource allocation type 0,
$\lceil N_{RB}^{DL,\,BWP}/P \rceil$ bits
For resource allocation type 1,
$\lceil \log_2(N_{RB}^{DL,\,BWP}(N_{RB}^{DL,\,BWP} + 1)/2) \rceil$ bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
Physical resource block (PRB) bundling size indicator - 0 or 1 bit
Rate matching indicator - 0, 1, or 2 bits
Zero power (ZP) channel state information (CSI)-
reference signal (RS) trigger - 0, 1, or 2
bits
For transport block 1:
Modulation and coding scheme - 5 bits
New data indicator - 1 bit TABLE 7-continued Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
TCI - 0 or 3 bits
SRS request - 2 bits
CBG transmission information - 0, 2, 4, 6, or 8 bits
Code block group (CBG) flushing out information - 0 or 1 bit
DMRS sequence initialization - 1 bit PDCCH: CORESET, REG, CCE, Search Space A downlink control channel in a 5G communication system is now described in more detail with reference to the drawings.

FIG. 5 illustrates an example of configuration of a CORESET of a downlink control channel in a wireless communication system according to an embodiment.

Referring to FIG. 5, a UE bandwidth part (UE BWP) 510 is configured in a frequency domain and two control resource sets (control resource set #1 501 and control resource set #2 502) are configured in 1 slot 520 in a time domain. The control resource sets 501 and 502 may be configured in a specific frequency resource 503 within the entire UE BWP 510 in the frequency domain. The control resource set may be configured with one or multiple OFDM symbols in the time domain, and may be defined as a control resource set duration 505. The control resource set #1 501 is configured with the control resource set duration of two symbols, and the control resource set #2 502 is configured with the control resource set duration of one symbol.

The above described control resource set in 5G may be configured for the UE by the base station via higher layer signaling (e.g., system information, MIB, RRC signaling). Configuration of the control resource set for the UE may be understood as providing information such as control resource set identity, a frequency location of the control resource set, a symbol length of the control resource set, and the like. The configuration information may include, for example, pieces of information below.

TABLE 8

| | |
|---|---|
| ControlResourceSet ::= | SEQUENCE { |
| -- Corresponds to L1 parameter 'CORESET-ID' | |
| controlResourceSetId | ControlResourceSetId, |
| (control resource set identity) | |
| frequencyDomainResources | BIT STRING (SIZE (45)), |
| (frequency axis resource allocation information) | |
| duration | INTEGER |
| (1..maxCoReSetDuration), | |
| (time axis resource allocation information) | |
| cce-REG-MappingType | CHOICE { |
| (CCE-to-REG mapping scheme) | |
| interleaved | SEQUENCE |
| { | |
| reg-BundleSize | |
| ENUMERATED {n2, n3, n6}, | |
| (REG bundle size) | |
| precoderGranularity | |
| ENUMERATED {sameAsREG-bundle, allContiguousRBs}, | |
| interleaverSize | |
| ENUMERATED {n2, n3, n6} | |
| (interleaver size) | |
| shiftIndex | |
| INTEGER(0..maxNrofPhysicalResourceBlocks-1) | |
| | OPTIONAL |

TABLE 8-continued

```
        (interleaver shift)
    },
        nonInterleaved                          NULL
    },
    tci-StatesPDCCH                             SEQUENCE(SIZE
(1..maxNrofTCI-StatesPDCCH)) OF TCI-StateId    OPTIONAL,
    (QCL configuration information)
        tci-PresentInDCI                        ENUMERATED {enabled}
        OPTIONAL,                               -- Need S
}
```

In Table 8, tci-StatesPDCCH (simply referred to as TCI state) configuration information may include information about one or multiple synchronization signal/PBCH block (that is, synchronization signal block (SSB)) indices having a QCLed relationship with a DMRS transmitted in the corresponding control resource set or a channel state information reference signal (CSI-RS) index.

Figure 6A:
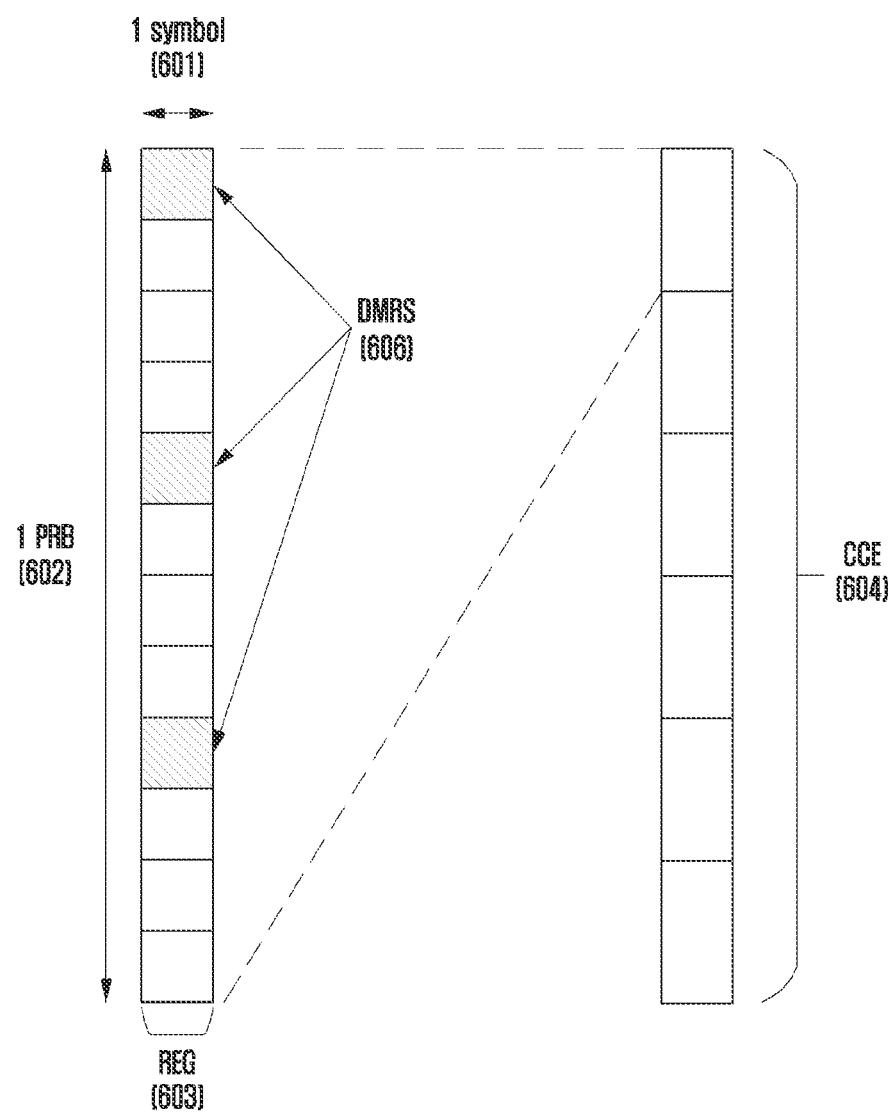
FIG. 6A illustrates a structure of a downlink control channel in a wireless communication system according to an embodiment.

FIG. 6A illustrates a structure of a downlink control channel in a wireless communication system according to an embodiment.

Referring to FIG. 6A, the basic unit of time and frequency resources configuring a control channel may be referred to as a resource element group (REG) 603. The REG 603 may be provided by one OFDM symbol 601 in a time domain and one physical resource block (PRB) 602, that is, 12 subcarriers, in a frequency domain. The base station may concatenate the REG 603 to configure a downlink control channel allocation unit.

As shown in FIG. 6A, when a basic unit to which a downlink control channel is allocated in 5G is referred to as a control channel element (CCE) 604, one CCE 604 may include multiple REGs 603. When describing the REG 603 illustrated in FIG. 6A as an example, the REG 603 may include 12 resource elements (REs), and when one CCE 604 includes six REGs 603, one CCE 604 may include 72 REs. When the downlink control resource set is configured, the corresponding region may include multiple CCEs 604. A specific downlink control channel may be transmitted after being mapped to one or more CCEs 604 according to an aggregation level (AL) in the control resource set. The CCEs 604 in the control resource set are distinguished by numbers. Here, the numbers of the CCEs 604 may be assigned according to a logical mapping scheme.

Referring to FIG. 6A, the basic unit of the downlink control channel, that is, the REG 603 may include both REs to which DCI is mapped and a region to which a DMRS 606 which is a reference signal for decoding the DCI is mapped. As illustrated in FIG. 6A, three DMRSs 606 may be transmitted in one REG 603. The number of CCEs required for transmission of the PDCCH may be 1, 2, 4, 8, or 16 according to the AL. A different number of CCEs may be used to implement link adaptation of the downlink control channel. For example, if AL=L, one downlink control channel may be transmitted through L CCEs. The UE needs to detect a signal in a state in which the UE does not know information about the downlink control channel, and a search space representing a set of CCEs has been provided for blind decoding. The search space is a set of downlink control channel candidates including CCEs that the UE has to attempt to decode at a given AL. Since there are various ALs that make one bundle of 1, 2, 4, 8, or 16 CCEs, the UE may have multiple search spaces. A search space set may be defined as a set of search spaces at all configured ALs.

The search space may be classified into a common search space and a UE-specific search space. A predetermined group of UEs or all the UEs may examine the common search space of the PDCCH so as to receive cell common control information such as dynamic scheduling of system information or a paging message. For example, PDSCH scheduling allocation information for transmission of the SIB including cell operator information and the like may be received by examining the common search space of the PDCCH. In a case of the common search space, since a predetermined group of UEs or all the UEs need to receive the PDCCH, the common search space may be provided as a set of previously appointed CCEs. Scheduling allocation information about the UE-specific PDSCH or PUSCH may be received by examining the UE-specific search space of the PDCCH. The UE-specific search space may be UE-specifically provided as a function of the UE identity and various system parameters.

In 5G, the parameter for the search space of the PDCCH may be configured for the UE by the base station via higher layer signaling (e.g., SIB, MIB, RRC signaling, etc.). For example, the base station may configure, in the UE, the number of PDCCH candidates at each aggregation level L, the monitoring periodicity for the search space, the monitoring occasion of symbol units in the slots for the search space, the search space type (common search space or UE-specific search space), the combination of RNTI and DCI format to be monitored in the search space, the control resource set index to monitor the search space, and the like. For example, the configuration information for the search space of the PDCCH may include the following pieces of information below.

TABLE 9

```
SearchSpace ::=                              SEQUENCE {
    -- Identity of the search space. SearchSpaceId = 0 identifies the SearchSpace configured
via PBCH (MIB) or ServingCellConfigCommon.
    searchSpaceId                            SearchSpaceId,
    (search space identifier)
    controlResourceSetId                     ControlResourceSetId,
    (control resource set identifier)
    monitoringSlotPeriodicityAndOffset       CHOICE {
    (monitoring slot level period)
        sl1
        NULL,
```

TABLE 9-continued

```
        sl2
    INTEGER (0..1),
        sl4
    INTEGER (0..3),
        sl5                                   INTEGER
(0..4),
        sl8
    INTEGER (0..7),
        sl10                                  INTEGER
(0..9),
        sl16                                  INTEGER
(0..15),
        sl20                                  INTEGER
(0..19)
    }
                                          OPTIONAL,
    duration (monitoring length)      INTEGER (2..2559)
        monitoringSymbolsWithinSlot           BIT STRING (SIZE
(14))
        OPTIONAL,
    (monitoring symbol within slot)
        nrofCandidates                        SEQUENCE {
    (number of PDCCH candidates at each aggregation level)
            aggregationLevel1                 ENUMERATED
{n0, n1, n2, n3, n4, n5, n6, n8},
            aggregationLevel2                 ENUMERATED
{n0, n1, n2, n3, n4, n5, n6, n8},
            aggregationLevel4                 ENUMERATED
{n0, n1, n2, n3, n4, n5, n6, n8},
            aggregationLevel8                 ENUMERATED
{n0, n1, n2, n3, n4, n5, n6, n8},
            aggregationLevel16                ENUMERATED
{n0, n1, n2, n3, n4, n5, n6, n8}
        },
        searchSpaceType                       CHOICE {
        (search space type)
            -- Configures this search space as CSS and DCI formats to monitor.
            common
        SEQUENCE {
        (common search space)
        }
            ue-Specific                       SEQUENCE
{
        (UE-specific search space)
            -- Indicates whether the UE monitors in this USS for DCI formats 0-0 and
1-0 or for formats 0-1 and 1-1.
            formats
        ENUMERATED {formats0-0-And-1-0, formats0-1-And-1-1},
        ...
    }
```

The base station may configure one or more search space sets for the UE according to configuration information. According to some embodiments, the base station may configure search space set 1 and search space set 2 in the UE. The base station may configure the search space set 1 in the UE so that DCI format A scrambled by an X-RNTI is monitored in the common search space. The base station may configure the search space set 2 in the UE so that DCI format B scrambled by a Y-RNTI is monitored in the UE-specific search space.

According to the configuration information, one or multiple search space sets may exist in the common search space or the UE-specific search space. For example, search space set #1 and search space set #2 may be configured as the common search space, and search space set #3 and search space set #4 may be configured as the UE-specific search space.

In the common search space, the following combinations of the DCI format and the RNTI may be monitored. However, the disclosure is not limited thereto.

DCI format 0_0/1_0 with CRC scrambled by C-RNTI, CS-RNTI, SP-CSI-RNTI, RA-RNTI, TC-RNTI, P-RNTI, SI-RNTI.

DCI format 2_0 with CRC scrambled by SFI-RNTI.
DCI format 2_1 with CRC scrambled by INT-RNTI.
DCI format 2_2 with CRC scrambled by TPC-PUSCH-RNTI, TPC-PUCCH-RNTI.
DCI format 2_3 with CRC scrambled by TPC-SRS-RNTI.

In the UE-specific search space, the following combinations of the DCI format and the RNTI may be monitored. However, the disclosure is not limited thereto.

DCI format 0_0/1_0 with CRC scrambled by C-RNTI, CS-RNTI, TC-RNTI.

DCI format 1_0/1_1 with CRC scrambled by C-RNTI, CS-RNTI, TC-RNTI.

The specified RNTIs may follow the definitions and usages described below.

C-RNTI (Cell RNTI): For UE-specific PDSCH scheduling.

Temporary Cell RNTI (TC-RNTI): For UE-specific PDSCH scheduling.

Configured Scheduling RNTI (CS-RNTI): For semi-statically configured UE-specific PDSCH scheduling.

Random access RNTI (RA-RNTI): For PDSCH scheduling in random access operation.

Paging RNTI (P-RNTI): For scheduling of PDSCH through which paging is transmitted.

System information RNTI (SI-RNTI): For PDSCH scheduling in which system information is transmitted.

Interruption RNTI (INT-RNTI): For notifying of whether to puncture PDSCH.

Transmit power control for PUSCH RNTI (TPC-PUSCH-RNTI): For indication of power adjustment command for PUSCH.

Transmit Power control for PUCCH RNTI (TPC-PUCCH-RNTI): For indication of power adjustment command for PUCCH.

Transmit Power control for SRS RNTI (TPC-SRS-RNTI): For indication of power adjustment command for SRS.

The above-described specified DCI formats may follow the usage in Table 10, below.

TABLE 10

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the aggregation level L in the control resource set p and the search space set s may be expressed by Equation (2), below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad (2)$$

L: Aggregation level $n_{CI}$: Carrier index $N_{CCE,p}$: Total number of CCEs existing in the control resource set p $n_{s,f}^\mu$: Slot index $M_{s,max}^{(L)}$: Number of PDCCH candidates of aggregation level L $m_{s,n_{CI}} = 0, \ldots, M_{s,max}^{(L)} - 1$: PDCCH candidate group index of aggregation level L i=0, . . . , L−1

$Y_{p,n_{s,f}^\mu} = (A_p \cdot Y_{p,n_{s,f}^\mu - 1}) \mod D$, $Y_{p,-1} = n_{RNTI} \neq 0$, $A_0=39827$, $A_1=39829$, $A_2=39839$, $D=65537$ $n_{RNTI}$: UE identifier The $Y_{p,n_{s,f}^\mu}$ value may correspond to zero in the common search space.

In a case of the UE-specific search space, the $Y_{p,n_{s,f}^\mu}$ value may correspond to a value that changes according to the UE identity (C-RNTI or ID configured by the base station for the UE) and the time index.

In 5G, multiple search space sets may be configured with different parameters (e.g., parameters in Table 9), and accordingly, the set of search space sets monitored by the UE may differ at each time point. For example, if search space set #1 is configured with the X-slot period, search space set #2 is configured with the Y-slot period, and X and Y are different, the UE may monitor both search space set #1 and space set #2 in a specific slot, and may monitor one of search space set #1 and search space set #2 in a specific slot.

PDCCH: Span

A UE may perform, for each subcarrier spacing, UE capability reporting for a case of having multiple PDCCH monitoring occasions in a slot, and in this case, the term span may be used. Span denotes consecutive symbols in which the UE can monitor a PDCCH in the slot, and each PDCCH monitoring occasion is within one span. Span may be expressed as (X,Y), where x denotes the minimum number of symbols that need to be separated between the first symbols of two consecutive spans, and Y denotes the number of consecutive symbols in which the UE can monitor the PDCCH within one span. Here, the UE may monitor the PDCCH in an interval from the first symbol of the span to the Y symbol within the span.

FIG. 6B illustrates, through a span, a case in which a UE may have multiple PDCCH monitoring occasions within a slot in a wireless communication system. Span can be expressed as (X,Y)=(7,3), (4,3), and (2,2), and these three cases are indicated by (6-1-00), (6-1-05), and (6-1-10), respectively, in FIG. 6B. As an example, (6-1-00) represents a case in which two spans that can be expressed by (7,4) exist in a slot. The interval between the first symbols of two spans is expressed as X=7, PDCCH monitoring occasions may exist within a total of Y symbols (Y=3) from the first symbol of each span, and search spaces 1 and 2 may exist within Y symbols (Y=3). As another example, (6-1-05) represents a case in which a total of three spans that can be expressed as (4,3) exist in a slot, and the interval between the second and third spans is shown to be separated by X' symbols (X'=5) greater than X=4.

PDCCH: UE Capability Report

The slot position in which the above-described common search space and UE-specific search space are located is indicated by the monitoringSlotPeriodicityAndOffset parameter in Table 11, and the symbol position in a slot is indicated by a bitmap through the monitoringSymbolsWithinSlot parameter in Table 9. On the other hand, the symbol position in a slot in which the UE can monitor the search space may be reported to the base station through the following UE capabilities.

UE capability 1 (Feature group index 3-1). This UE capability denotes, as shown in Table 11, below, if one monitoring occasion (MO) for the type 1 and type 3 common search space or UE-specific search space exists in a slot, UE capability capable of monitoring the MO when the corresponding MO occasion is located within the first 3 symbols in a slot. This UE capability is a mandatory capability that all UEs supporting NR should support, and whether this capability is supported is not explicitly reported to the base station.

TABLE 11

| Index | Feature group | Components | Field name in TS 38.331 [2] |
|---|---|---|---|
| 3-1 | Basic DL control channel | 1) One configured CORESET per BWP per cell in addition to CORESET0- CORESET resource allocation of 6RB bit-map and duration of 1-3 OFDM symbols for FR1 For type 1 CSS without dedicated RRC configuration and for | n/a |

TABLE 11-continued

| Index | Feature group | Components | Field name in TS 38.331 [2] |
|---|---|---|---|
| | | type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | |

UE capability 2 (Feature group index FG 3-2). This UE capability denotes, as shown in Table 12, below, if a monitoring occasion (MO: monitoring occasion) for a common search space or a UE-specific search space exists in a slot, UE capability capable of monitoring regardless of the location of the start symbol of the MO. This UE capability may be optionally supported by the UE, and whether this capability is supported is explicitly reported to the base station.

TABLE 12

| Index | Feature group | Components | Field name in TS 38.331 [2] |
|---|---|---|---|
| 3-2 | PDCCH monitoring on any span of up to 3 consecutive | For a given UE, all search space configurations are within the same span of 3 | pdcchMonitoringSingleOccasion |

TABLE 12-continued

| Index | Feature group | Components | Field name in TS 38.331 [2] |
|---|---|---|---|
| | OFDM symbols of a slot | consecutive OFDM symbols in the slot | |

UE capability 3 (Feature group indices FG 3-5, 3-5a, and 3-5b). As shown in Table 13, below, this UE capability indicates a pattern of a MO that the UE can monitor when multiple monitoring occasions (MOs) for a common search space or a UE-specific search space exist in a slot. The above-described pattern includes an interval X between start symbols between different MOs, and a maximum symbol length Y for one MO. The combination of (X,Y) supported by the UE may be one or multiple {(2,2), (4,3), and (7,3)}. This UE capability is optionally supported by the UE, and whether this capability is supported and a combination of (X, Y) described above are explicitly reported to the base station.

TABLE 13

| Index | Feature group | Components |
|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 |

TABLE 13-continued

| Index | Feature group | Components |
|---|---|---|
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz 4OFDM symbols for 30 kHz 7OFDM symbols for 60 kHz with NCP 11OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. |
| 3-5b | All PDCCH monitoring occasion can be any OFDM symbol(s) of a slot for Case 2 with a span gap | PDCCH monitoring occasions of FG-3-1, plus additional PDCCH monitoring occasion (s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every/slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part, of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every/ slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for FDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. |

The UE may report whether the above-described UE capability 2 and/or UE capability 3 is supported, and related parameters to the base station. The base station may perform time-domain resource allocation for the common search space and the UE-specific search space based on the reported UE capability. When performing the resource allocation, the base station may the base station may prevent the MO from being located in a non-monitoring position of the UE.

PDCCH: BD/CCE Limit

When multiple search space sets are configured for a UE, the following conditions may be considered in a method for determining a search space set configured to be monitored by the UE.

If the UE is configured with r15monitoringcapability as the value of monitoringCapabilityConfig-r16, which is higher layer signaling, the UE defines the number of PDCCH candidates that can be monitored and the maximum value of the number of CCEs configuring the entire search space (here, the entire search space refers to the entire CCE set corresponding to a union area of multiple search space sets) for each slot. Further, if the value of monitoringCapabilityConfig-r16 is configured with r16monitoringcapability, the UE defines the number of PDCCH candidates that can be monitored and the maximum value of the number of CCEs configuring the entire search space (here, the entire search space refers to the entire CCE set corresponding to the union area of multiple search space sets) for each span.

Condition 1: Limit the Maximum Number of PDCCH Candidates:

As described above, according to the configuration value of higher layer signaling, $M^\mu$, which is the maximum number of PDCCH candidate groups that the UE can monitor, may be provided by Table 14, below, if the same is defined on a slot basis in a cell configured with a subcarrier spacing of $15 \cdot 2^\mu$ kHz, and if the same is defined on a span basis, Mμ may be provided by Table 15, below.

TABLE 14

| μ | Maximum number of PDCCH candidates per slot and per serving cell ($M^\mu$) |
|---|---|
| 0 | 44 |
| 1 | 36 |
| 2 | 22 |
| 3 | 20 |

TABLE 15

Maximum number $M^\mu$ of monitored PDCCH candidates per span for combination (X, Y) and per serving cell

| μ | (2, 2) | (4, 3) | (7, 3) |
|---|---|---|---|
| 0 | 14 | 28 | 44 |
| 1 | 12 | 24 | 36 |

Condition 2: Limit the Maximum Number of CCEs

As described above, according to the configuration value of higher layer signaling, $C^\mu$, which is the maximum number of CCEs configuring the entire search space (here, the entire search space denotes the entire set of CCEs corresponding to the union region of multiple search space sets), may be provided by Table 16, below, if the same is defined on a slot basis in a cell configured with a subcarrier spacing of $15 \cdot 2^\mu$ kHz, and if the same is defined on a span basis, $C^\mu$ may be provided by Table 17, below.

TABLE 16

| μ | Maximum number of non-overlapped CCEs per slot and per serving cell ($C^\mu$) |
|---|---|
| 0 | 56 |
| 1 | 56 |
| 2 | 48 |
| 3 | 32 |

TABLE 17

Maximum number $C^\mu$ of non-overlapped CCEs per span for combination (X, Y) and per serving cell

| μ | (2, 2) | (4, 3) | (7, 3) |
|---|---|---|---|
| 0 | 18 | 36 | 56 |
| 1 | 18 | 36 | 56 |

For the convenience of description, a situation in which both conditions 1 and 2 are satisfied at a specific time point is referred to as condition A. Therefore, not satisfying condition A may refer to not satisfying at least one of the above conditions 1 and 2.

PDCCH: Overbooking

According to the configuration of the search space sets of the base station, a case in which condition A is not satisfied at a specific time point may occur. If condition A is not satisfied at a specific time point, the UE may select and monitor only some of the search space sets configured to satisfy condition A at the corresponding time point, and the base station may transmit PDCCH to the selected search space sets.

A method of selecting some search spaces in the entire configured search space set may conform to the following method.

If condition A for PDCCH is not satisfied at a specific time point (slot), the UE (or base station) may select a search space set, in which a search space type is configured to be a common search space, from among search space sets existing at a corresponding time point, preferentially over a search space set in which a search space type is configured to be a UE-specific search space.

If all search space sets configured to be common search spaces are selected (i.e., if condition A is satisfied even after all search spaces configured to be common search spaces are selected), the UE (or base station) may select the search space sets configured to have UE-specific search spaces. Here, if there are multiple search space sets configured to be UE-specific search spaces, a search space set having a low search space set index may have a higher priority. In consideration of the priority, the UE-specific search space sets may be selected within a range in which condition A is satisfied.

QCL, TCI State

In a wireless communication system, one or more different antenna ports (or different antenna ports may be replaced by one or more channels, signals, and combinations thereof, but in the description below, collectively referred to as different antenna ports for convenience of explanation) may be associated with each other by a quasi co-location (QCL) configuration as shown in Table 19. The TCI state is for announcing a QCL relationship between a PDCCH (or PDCCH DMRS) and another RS or channel, and a certain reference antenna port A (reference RS #A) and another target antenna port B (target RS #B) are QCLed denotes that the UE is allowed to apply some or all of the large-scale channel parameters estimated from the antenna port A to the channel measurement from the antenna port B. QCL is required to correlate different parameters, depending on situations, such as 1) time tracking affected by average delay and delay spread, 2) frequency tracking affected by Doppler shift and Doppler spread, 3) radio resource management (RRM) affected by average gain, and 4) beam management (BM) affected by spatial parameters. Accordingly, NR supports four types of QCL relationships as shown in Table 18, below.

TABLE 18

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may collectively refer to some or all of various parameters, such as angle of arrival (AoA), power angular spectrum (PAS) of AoA, angle of departure (AoD), PAS of AoD, transmit/receive channel correlation, transmit/receive beamforming, and spatial channel correlation.

The QCL relationship can be configured for the UE through the RRC parameters TCI-State and QCL-Info as shown in Table 19, below. Referring to Table 19, the base station configures one or more TCI states for the UE and informs the UE of up to two QCL relationships (qcl-Type1, qcl-Type2) for RS referring to the ID of the TCI state, that is, target RS. Here, pieces of QCL information (QCL-Info) included in each TCI state include the serving cell index and BWP index of the reference RS indicated by the corresponding QCL information, the type and ID of the reference RS, and the QCL type as shown in Table 18 above.

TABLE 19

```
TCI-State ::=                    SEQUENCE {
    tci-StateId                  TCI-StateId,
    (ID of corresponding TCI state)
    qcl-Type1                    QCL-Info,
    (QCL information of first reference RS of RS (target RS) referring to corresponding TCI state ID)
    qcl-Type2                    QCL-Info
        OPTIONAL, -- Need R
    (QCL information of second reference RS of RS (target RS) referring to corresponding TCI state ID)
    ...
}
QCL-Info ::=                     SEQUENCE {
    cell                         ServCellIndex
        OPTIONAL, -- Need R
    (serving cell index of reference RS indicated by corresponding QCL information)
    bwp-Id                       BWP-Id
        OPTIONAL, -- Cond CSLRS-Indicated
    (BWP index of reference RS indicated by corresponding QCL information)
    referenceSignal              CHOICE {
        csi-rs                       NZP-CSI-RS-ResourceId,
        ssb                          SSB-Index
        (one of CSI-RSI ID or SSB ID indicated by corresponding QCL information)
    },
    qcl-Type                     ENUMERATED {typeA, typeB, typeC, typeD},
    ...
}
```

Figure 7:
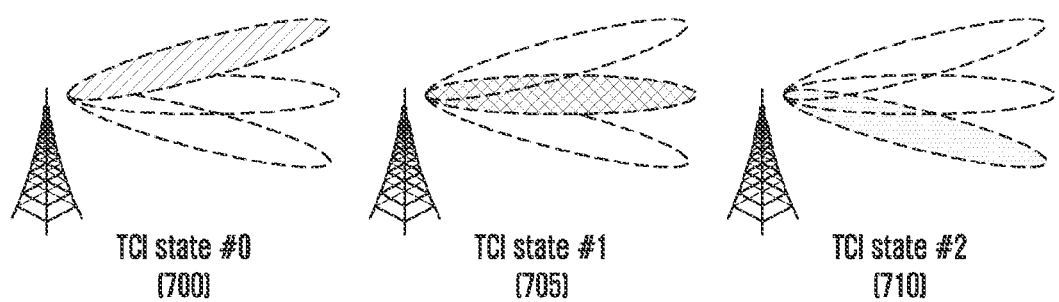
FIG. 7 illustrates an example of base station beam allocation according to a TCI state configuration in a wireless communication system according to an embodiment.

FIG. 7 illustrates an example of base station beam allocation according to TCI state configuration according to an embodiment.

Referring to FIG. 7, a base station may transmit information regarding N different beams to a UE through N different TCI states. For example, if N=3 as shown in FIG. 7, the base station may allow qcl-Type2 parameters included in three TCI states 700, 705, and 710 to be associated with CSI-RS or SSB corresponding to different beams, and to be configured with QCL type D, and thus may provide notification that antenna ports referring to the different TCI states 700, 705, and 710 are associated with different spatial Rx parameters, that is, different beams.

Tables 20 to 24 below show valid TCI state configurations according to target antenna port types.

Table 20 shows valid TCI state configuration when the target antenna port is CSI-RS for tracking (TRS). The TRS refers to an NZP CSI-RS, in which a repetition parameter is not configured and trs-Info is configured to be true, among CSI-RSs. Configuration 3 in Table 20 may be used for aperiodic TRS.

TABLE 20

| Valid TCI state Configuration | DL RS 1 | qcl-Type 1 | DL RS 2 (if configured) | qcl-Type 2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 21 shows valid TCI state configuration when the target antenna port is CSI-RS for CSI. The CSI-RS for CSI refers to an NZP CSI-RS, in which a parameter indicating repetition (e.g., a repetition parameter) is not configured and trs-Info is not configured to be true, among CSI-RSs.

TABLE 21

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS I) | QCL-TypeD |
| 4 | TRS | QCL-TypeB | | |

Table 22 shows a valid TCI state configuration when a target antenna port is CSI-RS for beam management (BM, which has the same meaning as CSI-RS for L1 RSRP reporting). The CSI-RS for BM denotes an NZP CSI-RS, in which a repetition parameter is configured and has the value of On or Off, and trs-Info is not configured to be true, among CSI-RSs.

TABLE 22

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS (same as DL RS1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 23 shows valid TCI state configuration when a target antenna port is a PDCCH DMRS.

TABLE 23

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS (same as DL RS1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 24 shows a valid TCI state configuration when the target antenna port is a PDSCH DMRS.

TABLE 24

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the representative QCL configuration method according to Tables 20 to 24, a target antenna port and a reference antenna port for each stage are configured to be SSB→TRS→CSI-RS for CSI, or CSI-RS for BM, PDCCH DMRS, or PDSCH DMRS. Accordingly, it is possible to link the statistical characteristics that can be measured from the SSB and the TRS to each of antenna ports to assist the reception operation of a UE.

PDCCH: TCI State Related

Specifically, TCI state combinations applicable to a PDCCH DMRS antenna port are shown in Table 25, below. In Table 25, the fourth row is a combination assumed by the UE before RRC configuration, and configuration after RRC is not possible.

TABLE 25

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
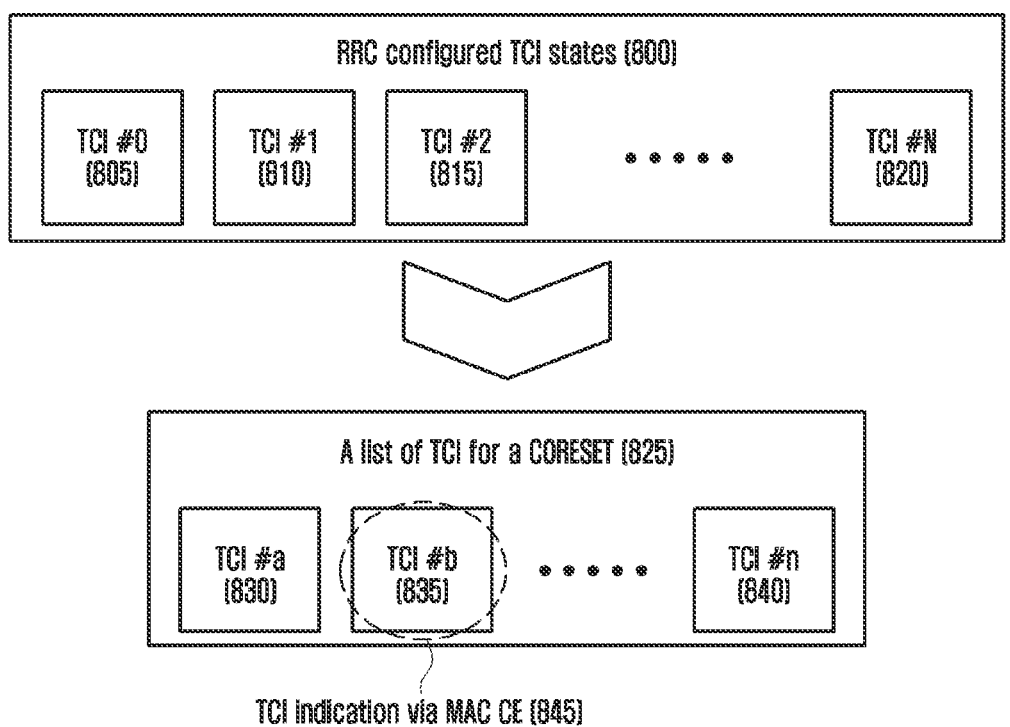
FIG. 8 illustrates an example of a TCI state allocation method for a PDCCH in a wireless communication system according to an embodiment.

In NR, for dynamic allocation of a PDCCH beam, a hierarchical signaling method as shown in FIG. 8 is supported. This will be described with reference to FIG. 8.

FIG. 8 illustrates an example of a TCI state allocation method for a PDCCH in a wireless communication system according to an embodiment.

Referring to FIG. 8, a base station may configure N TCI states 805, 810, 815, . . . , and 820 for a UE via RRC signaling 800, and may configure some of the TCI states as TCI states for a CORESET (825). Thereafter, the base station may indicate one of the TCI states 830, 835, and 840 for the CORESET to the UE via MAC CE signaling (845). Thereafter, the UE may receive a PDCCH based on beam information included in a TCI state indicated by the MAC CE signaling.

Figure 9:
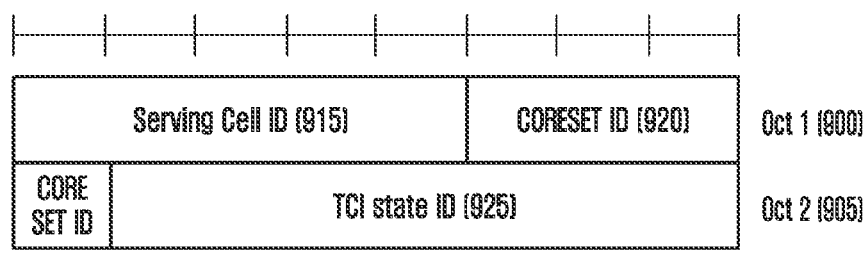
FIG. 9 illustrates a TCI indication MAC CE signaling structure for a PDCCH DMRS in a wireless communication system according to an embodiment.

FIG. 9 illustrates a TCI indication MAC CE signaling structure for a PDCCH DMRS in a wireless communication system according to an embodiment.

Referring to FIG. 9, the TCI indication MAC CE signaling for the PDCCH DMRS may be configured by 2 bytes (16 bits), and may include a serving cell ID 915 formed of 5 bits, a CORESET ID 920 formed of 4 bits, and a TCI state ID 925 formed of 7 bits.

Figure 10:
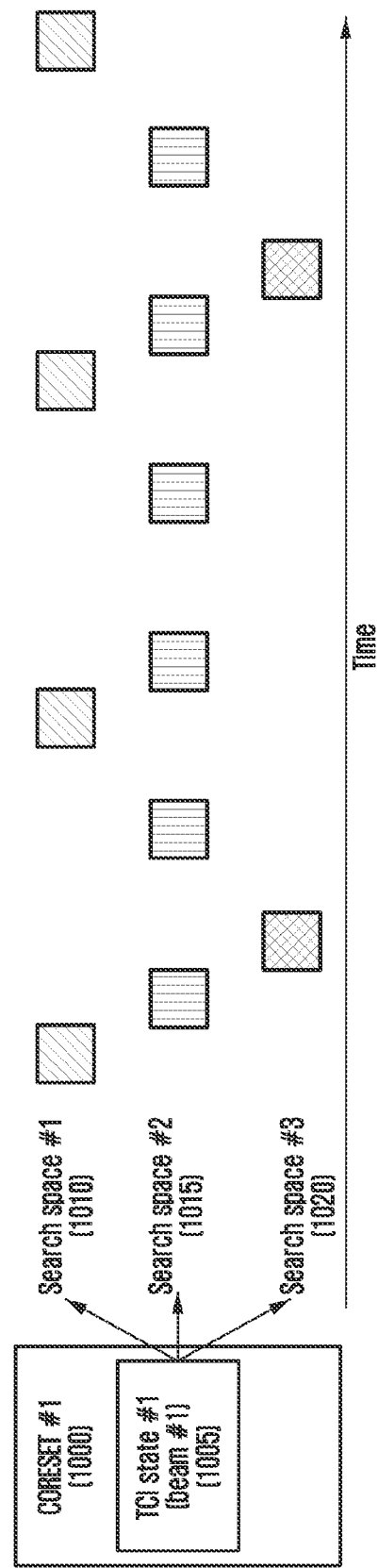
FIG. 10 illustrates an example of control resource set and search space beam configuration in a wireless communication system according to an embodiment.

FIG. 10 illustrates an example of control resource set and search space beam configuration in a wireless communication system according to an embodiment.

Referring to FIG. 10, a base station may indicate one TCI state in a list of TCI states included in a CORESET 1000 configuration through MAC CE signaling (1005). Thereafter, before another TCI state is indicated to the corresponding CORESET through another MAC CE signaling, the UE considers that the same QCL information (beam #1) 1005 is applied to one or more search spaces 1010, 1015, and 1020 connected to the CORESET. According to the above-described PDCCH beam allocation method, it is difficult to indicate a beam change faster than the MAC CE signaling delay, and there is a problem in that the same beam is collectively applied to all CORESETs regardless of search space characteristics, making flexible PDCCH beam management difficult.

Embodiments are now described that provide a more flexible PDCCH beam configuration and management method. Hereinafter, in describing an embodiment, several distinguished examples are provided for convenience of description, but these are not mutually exclusive and can be applied by appropriately combining with each other depending on the situation.

The base station may configure, in the UE, one or multiple TCI states for a specific control resource set, and may activate one of the configured TCI states through a MAC CE activation command. For example, {TCI state #0, TCI state #1, and TCI state #2} are configured as the TCI state in the control resource set #1, and the base station may transmit, to the UE, a command of activating to assume the TCI state #0 as the TCI state for the control resource set #1 through the MAC CE. Based on the activation command for the TCI state received by the MAC CE, the UE may correctly receive the DMRS of the corresponding control resource set based on QCL information in the activated TCI state.

For the control resource set (control resource set #0) in which the index is configured to be 0, if the UE does not receive the MAC CE activation command for the TCI state of the control resource set #0, the UE may assume that DMRS transmitted in the control resource set #0 is QCLed with an SS/PBCH block identified during the initial access procedure or non-contention-based random access procedure that is not triggered by a PDCCH command.

In relation to the control resource set (control resource set #X) in which the index is configured to be a value other than 0, if the UE is not configured with the TCI state for the control resource set #X, or the UE is configured with one or more TCI states but has not received the MAC CE activation command for activating one of the TCI states, the UE may assume that DMRS transmitted in the control resource set #X is QCLed with an SS/PBCH block identified during the initial access procedure.

PDCCH: QCL Prioritization Rule Related

Regarding an operation of QCL prioritization for a PDCCH, when a UE operates in a single cell or intra-band carrier aggregation, and a plurality of control resource sets existing within an activated bandwidth part of a single or multiple cells overlap in time while having the same or different QCL-TypeD characteristics in a specific PDCCH monitoring occasion, the UE may select a specific control resource set according to the QCL prioritization operation, and may monitor control resource sets having the same QCL-TypeD characteristics as the corresponding control resource set. That is, when a plurality of control resource sets overlap in time, the UE may receive only one QCL-TypeD characteristic. In this case, the criteria for determining the QCL priority may follow one or more of the following criteria.

Criterion 1. A control resource set connected to a common search section of the lowest index in a cell corresponding to the lowest index among cells including a common search section.

Criterion 2. A control resource set connected to the UE-specific search section of the lowest index in a cell corresponding to the lowest index among cells including a UE-specific search section.

As described above, each of the above criteria applies the following criteria if the corresponding criteria are not satisfied. For example, when control resource sets overlap in time in a specific PDCCH monitoring occasion, if all control resource sets are not connected to a common search section but to a UE-specific search section, that is, if criterion 1 is not satisfied, the UE may omit application of criterion 1 and apply criterion 2.

When the UE selects a control resource set according to the above-mentioned criteria, the following two matters may be additionally considered for QCL information configured in the control resource set. First, in case that control resource set 1 has CSI-RS 1 as a reference signal having a QCL-TypeD relationship, a reference signal in which the CSI-RS 1 has a QCL-TypeD relationship is SSB 1, and a reference signal in which another control resource set 2 has a QCL-TypeD relationship is SSB 1, the UE may consider that the two control resource sets 1 and 2 have different QCL-TypeD characteristics. Second, in case that control resource set 1 has CSI-RS 1 configured in cell 1 as a reference signal having a QCL-TypeD relationship, and a reference signal in which the CSI-RS 1 has a QCL-TypeD relationship is SSB 1; and the control resource set 2 has CSI-RS 2 configured in cell 2 as a reference signal having a QCL-TypeD relationship, and a reference signal in which the CSI-RS 2 has a QCL-TypeD relationship is SSB 1, the UE may consider that the two control resource sets have the same QCL-TypeD characteristic.

Figure 11A:
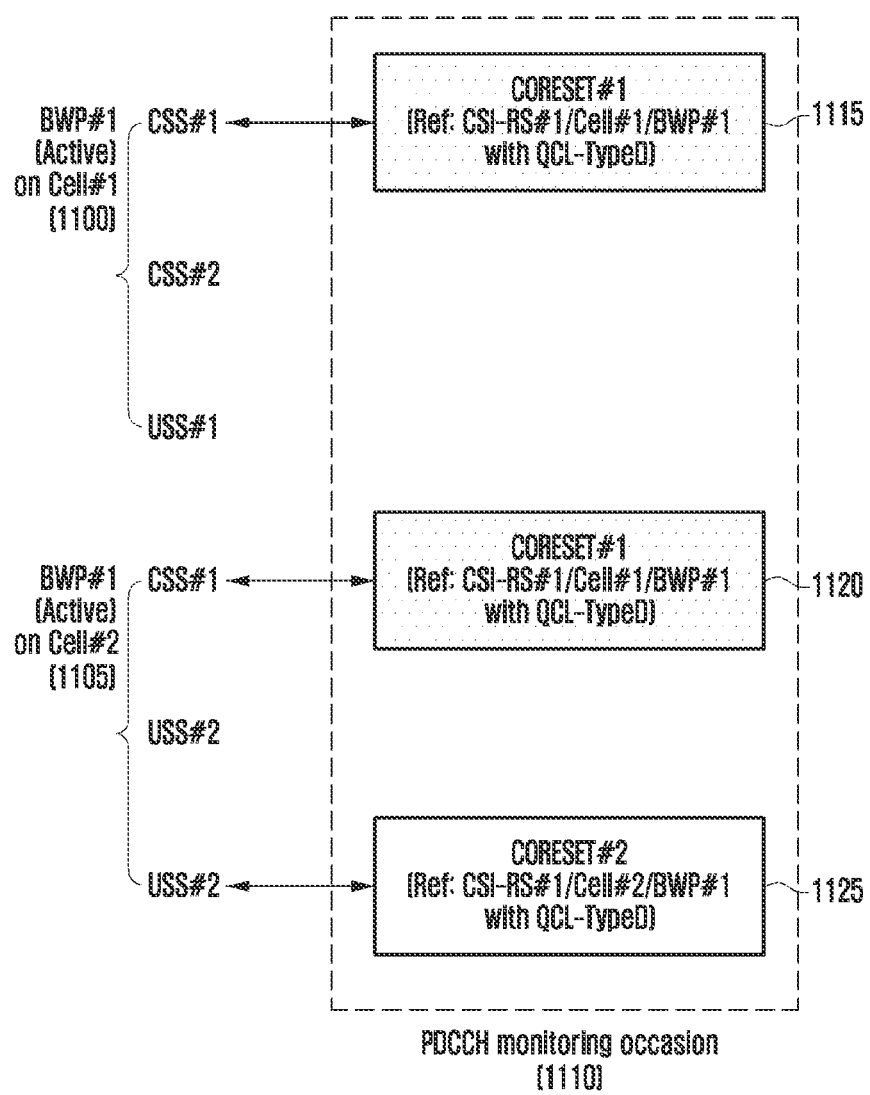
FIGS. 11A and 11B illustrate methods in which a UE selects a receivable control resource set by considering a priority when receiving a downlink control channel in a wireless communication system according to an embodiment.
Figure 11B:
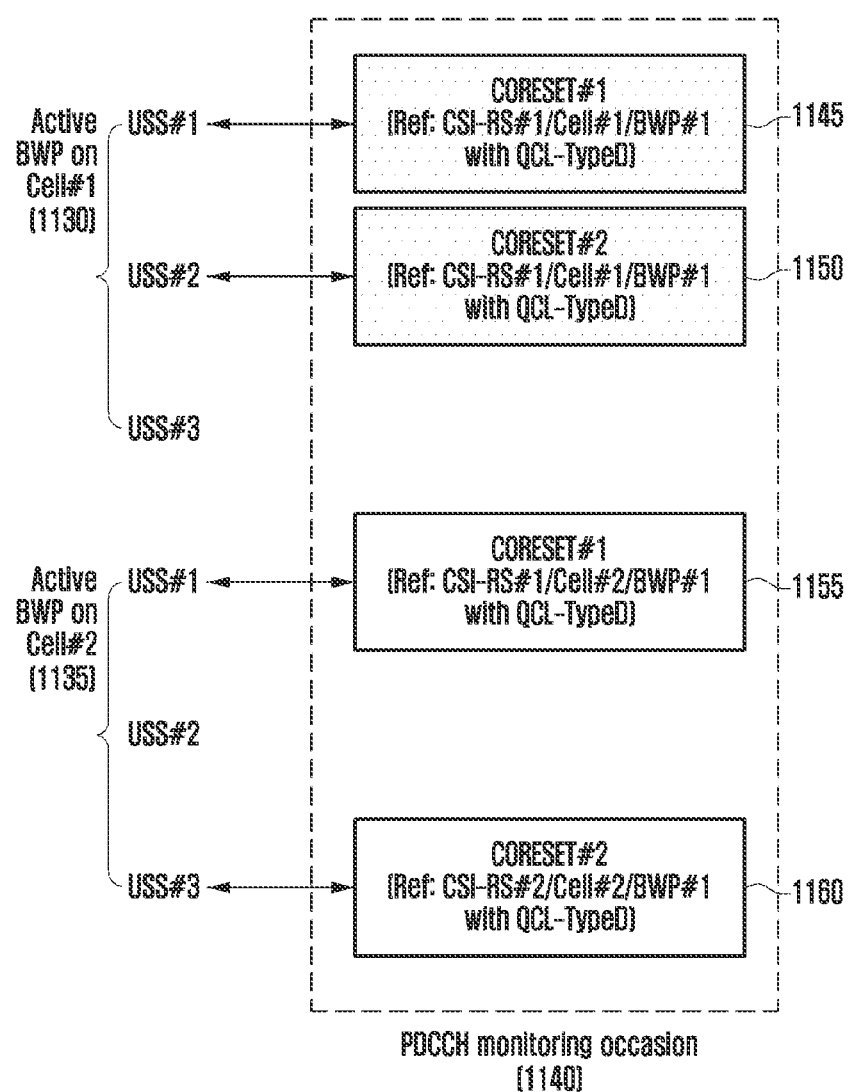

FIGS. 11A and 11B illustrate methods in which a UE selects a receivable control resource set by considering a priority when receiving a downlink control channel in a wireless communication system according to an embodiment.

As illustrated in FIG. 11A, the UE may be configured to receive a plurality of control resource sets overlapping in time in a specific PDCCH monitoring occasion 1110, and these plurality of control resource sets may be connected to a common search space or a UE-specific search space for a plurality of cells. In the corresponding PDCCH monitoring occasion, within bandwidth part #1 (BWP #1) 1100 of cell #1, control resource set #1 (CORESET #1) 1115 connected to common search section #1 may exist, and within bandwidth part #1 (BWP #1) 1105 of cell #2, control resource set #1 (CORESET #1) 1120 connected to common search section #1 and control resource set #2 (CORESET #2) 1125 connected to UE-specific search section #2 may exist. The control resource sets 1115 and 1120 have a QCL-TypeD relationship with CSI-RS resource #1 configured in BWP #1 of the cell #1, and the control resource set 1125 may have a QCL-TypeD relationship with CSI-RS resource #1 configured in BWP #1 of the cell #2. Therefore, if criterion 1 is applied to the corresponding PDCCH monitoring occasion 1110, the UE may receive all other control resource sets having the same QCL-TypeD reference signal as that of the control resource set #1 (CORESET #1) 1115. Accordingly, the UE may receive the control resource sets 1115 and 1120 in the corresponding PDCCH monitoring occasion 1110. As another example, the UE may be configured to receive a plurality of control resource sets overlapping in time in a specific PDCCH monitoring occasion 1140, and these plurality of control resource sets may be connected to a common search space or UE-specific search space for a plurality of cells.

As illustrated in FIG. 11B, in the corresponding PDCCH monitoring occasion, within BWP #1 1130 of the cell #1, control resource set #1 (CORESET #1) 1145 connected to the UE-specific search section #1 and the control resource set #2 connected to the UE-specific search section #2 1150 may exist, and within BWP #1 1135 of the cell #2, control resource set #1 (CORESET #1) 1155 connected to the UE-specific search section #1 and control resource set #2 (CORESET #2) 1160 connected to the UE-specific search section #3 may exist. The control resource sets 1145 and 1150 may have a QCL-TypeD relationship with the CSI-RS resource #1 configured in BWP #1 of the cell #1, and the control resource set 1155 may have a QCL-TypeD relationship with the CSI-RS resource #1 configured in BWP #1 of the cell #2, and the control resource set 1160 may have a QCL-TypeD relationship with the CSI-RS resource #2 configured in BWP #1 of the cell #2. However, if criterion 1 is applied to the corresponding PDCCH monitoring occasion 1140, there is no common search section, and thus criterion 2 which is the next criterion may be applied. If criterion 2 is applied to the corresponding PDCCH monitoring occasion 1140, the UE may receive all other control resource sets having the same QCL-TypeD reference signal as that of the control resource set 1145. Accordingly, the UE may receive the control resource sets 1145 and 1150 in the corresponding PDCCH monitoring occasion 1140.

Rate Matching/Puncturing Related

When time and frequency resource A for transmission of predetermined symbol sequence A overlaps predetermined time and frequency resource B, a rate matching or puncturing operation may be considered as the transmission/reception operation of channel A in consideration of resource C corresponding to a region in which the resource A and the resource B overlap. A specific operation may follow, further to the details below.

Rate Matching Operation

A base station may map the channel A to only the remaining resource regions except for resource C among the entire resource A for transmission of symbol sequence A to a UE, the resource C corresponding to a region in which the resource B overlap the resource A, and transmit the same. For example, when symbol sequence A is configured by {symbol #1, symbol #2, symbol #3, symbol 4}, the resource A is configured by {resource #1, resource #2, resource #3, resource #4}, and resource B is configured by {resource #3, resource #5}, the base station may sequentially map the symbol sequence A to {resource #1, resource #2, resource #4}, which are the remaining resources except for {resource #3} corresponding to the resource C among the resource A, and transmit the same. As a result, the base station may map the symbol sequence {symbol #1, symbol #2, symbol #3} to {resource #1, resource #2, resource #4}, respectively, and transmit the same.

The UE may determine the resource A and the resource B through scheduling information for symbol sequence A from a base station, and accordingly, the UE may determine resource C corresponding to a region where the resource A and the resource B overlap. The UE may receive the symbol sequence A based on that the symbol sequence A is mapped to the remaining regions except for the resource C among the entire resource A and transmitted. For example, when the symbol sequence A is configured by {symbol #1, symbol #2, symbol #3, symbol 4}, the resource A is configured by {resource #1, resource #2, resource #3, resource #4}, and the resource B is configured by {resource #3, resource #5}, the UE may receive the symbol sequence A based on an assumption that the symbol sequence A is sequentially mapped to the remaining resources {resource #1, resource #2, resource #4} except for {resource #3} corresponding to the resource C among the resource A. As a result, the UE assumes that the symbol sequence {symbol #1, symbol #2, symbol #3} are mapped to {resource #1, resource #2, resource #4}, respectively, and transmitted, and may perform a subsequent series of reception operations.

Puncturing Operation

When there is resource C corresponding to a region in which resource B overlaps the resource A for transmission of symbol sequence A to a UE, a base station may map the symbol sequence A to the entire resource A. However, the base station may not perform transmission in a resource region corresponding to the resource C, and may perform transmission to only the remaining resource regions except for the resource C among the entire resource A. For example, when symbol sequence A is configured by {symbol #1, symbol #2, symbol #3, symbol 4}, resource A is configured by {resource #1, resource #2, resource #3, resource #4}, and resource B is configured by {resource #3, resource #5}, the base station may map the symbol sequence A {symbol #1, symbol #2, symbol #3, symbol #4} to the resource A {resource #1, resource #2, resource #3, resource #4}, respectively. Further, the base station may transmit only the corresponding symbol sequence {symbol #1, symbol #2, symbol #4} to {resource #1, resource #2, resource #4}, which are the remaining resources except for {resource #3} corresponding to the resource C among the entire resource A, and may not transmit {symbol #3} mapped to {resource #3} corresponding to the resource C. As a result, the base station may map the symbol sequence {symbol #1, symbol #2, symbol #4} to {resource #1, resource #2, resource #4}, respectively, and transmit the same.

The UE may determine the resource A and the resource B through scheduling information for symbol sequence A from the base station, and accordingly, the UE may determine the resource C corresponding to a region where the resource A and the resource B overlap. The UE may receive the symbol sequence A based on an assumption that the symbol sequence A is mapped to the entire resource A but transmitted in the remaining regions except for the resource C among the resource A. For example, when the symbol sequence A is configured by {symbol #1, symbol #2, symbol #3, symbol 4}, the resource A is configured by {resource #1, resource #2, resource #3, resource #4}, and the resource B is configured by {resource #3, resource #5}, the UE may assume that the symbol sequence A {symbol #1, symbol #2, symbol #3, symbol 4} are mapped to {resource #1, resource #2, resource #3, resource #4}, respectively, and that {symbol #3} mapped to {resource #3} corresponding to resource C is not transmitted, and the UE may receive the symbol sequence Abased on an assumption that the corresponding symbol sequence {symbol #1, symbol #2, symbol #4} are mapped to {resource #1, resource #2, resource #4}, which are the remaining resources except for {resource #3} corresponding to resource C among resource A, and transmitted. As a result, the UE assumes that the symbol sequence {symbol #1, symbol #2, symbol #4} are mapped to {resource #1, resource #2, resource #4}, respectively, and transmitted, and may perform a subsequent series of reception operations.

Hereinafter, a method of configuring a rate matching resource to perform rate matching in a 5G communication system will be described. The rate matching refers to controlling the size of a signal by considering the amount of resources capable of transmitting the signal. For example, the rate matching of a data channel may be understood as that the size of data is adjusted without mapping and transmitting the data channel with respect to a specific time and frequency resource region.

Figure 12:
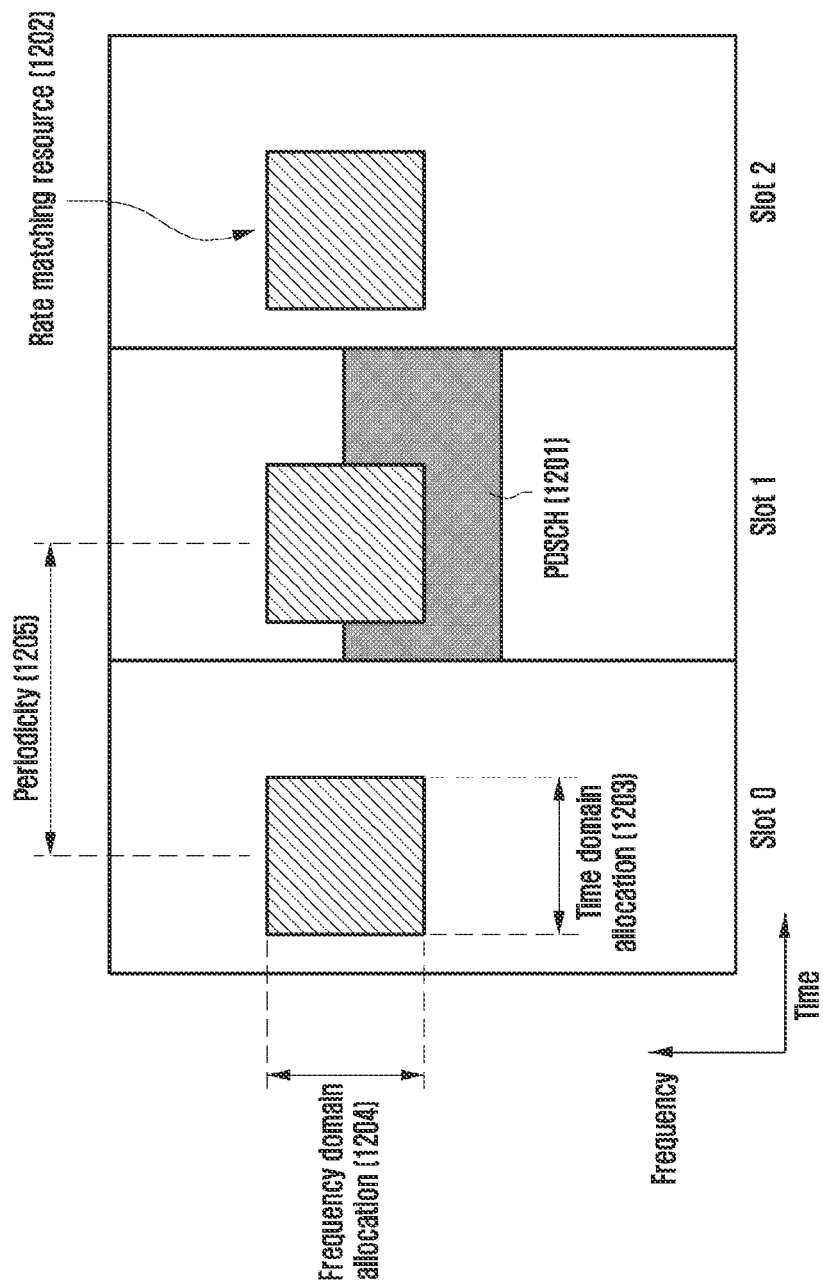
FIG. 12 illustrates a method in which a base station and a UE perform data transmission or reception by considering a downlink data channel and a rate matching resource according to an embodiment.

FIG. 12 illustrates a method in which a base station and a UE perform data transmission or reception by considering a downlink data channel and a rate matching resource according to an embodiment.

FIG. 12 shows a PDSCH 1201 and a rate matching resource 1202. The base station may configure one or more rate matching resources 1202 in the UE through higher layer signaling (e.g., RRC signaling). Configuration information of the rate matching resource 1202 may include time-domain resource allocation information 1203, frequency-domain resource allocation information 1204, and period information 1205. In the following description, a bitmap corresponding to the frequency-domain resource allocation information 1204 is called a first bitmap, a bitmap corresponding to the time-domain resource allocation information 1203 is called a second bitmap, and a bitmap corresponding to the period information 1205 is called a third bitmap. If some or all of the time and frequency resources of the scheduled data channel 1201 overlap the configured rate matching resource 1202, a base station may rate-match the data channel 1201 in the rate matching resource part 1202 and transmit the same. A UE may perform data reception and decoding after assuming that the data channel 1201 has been rate-matched in the rate matching resource part 1202.

The base station may dynamically notify the UE of whether the data channel will be rate-matched in the configured rate matching resource part through DCI through an additional configuration (corresponding to a rate matching indicator in the DCI format described above). Specifically, the base station may select some of the configured rate matching resources, may group the selected resources into a rate matching resource group, and may indicate whether the data channel has been rate-matched with each rate matching resource group through DCI using a bitmap method to the UE. For example, when four rate matching resources RMR #1, RMR #2, RMR #3 and RMR #4 have been configured, the base station may configure RMG #1={RMR #1, RMR #2} and RMG #2={RMR #3, RMR #4} as rate matching groups, and may indicate whether rate matching in each of RMG #1 and RMG #2 has been performed using 2 bits of a DCI field to the UE in the form of a bitmap. For example, the base station may indicate "1" if rate matching needs to be performed, and may indicate "0" if rate matching does not need to be performed. 5G supports the granularity of RE level and RB symbol level as a method of configuring the above-described rate matching resource in the UE, and the following configuration method may be followed.

RB Symbol Level

The UE may receive up to four RateMatchPattern for each bandwidth part via higher layer signaling, and one RateMatchPattern may include the following contents.

A reserved resource in a bandwidth part may include a resource, in which a time and frequency resource region of the corresponding reserved resource is configured as a combination of an RB-level bitmap and a symbol-level bitmap on the frequency axis. The reserved resource may span over one or two slots. The UE may be additionally configured with a time-domain pattern (periodicityAndPattern) in which the time and frequency domain including a pair of RB level and symbol level bitmaps are repeated.

A time and frequency domain resource region configured as a control resource set in a bandwidth part and a resource region corresponding to a time-domain pattern configured as a search space configuration in which the resource region is repeated may be included.

RE Level

The UE may be configured with the following information through higher layer signaling.

The number of ports (nrofCRS-Ports) and LTE-CRS-vshift(s) value (v-shift) of LTE CRS as configuration information (lte-CRS-ToMatchAround) for RE corresponding to an LTE cell-specific reference signal or common reference signal (CRS) pattern, center subcarrier location information (carrierFreqDL) of an LTE carrier from the reference frequency point (e.g., reference point A), the bandwidth size (carrierBandwidthDL) information of the LTE carrier, subframe configuration information (mbsfn-SubframConfigList) corresponding to a multicast-broadcast single-frequency network (MBSFN), and the like may be included. The UE may determine the location of the CRS in the NR slot corresponding to the LTE subframe based on the above-described information.

Configuration information for a resource set corresponding to one or multiple zero power (ZP) CSI-RSs in the bandwidth part may be included.

LTE CRS Rate Match Related

Next, the rate match process for the above-described LTE CRS will be described in detail. For the coexistence of long term evolution (LTE) and new RAT (NR) (LTE-NR coexistence), NR provides a function of configuring a cell specific reference signal pattern of LTE to an NR UE. More specifically, the CRS pattern may be provided by RRC signaling including at least one parameter in ServingCellConfig information element (IE) or ServingCellConfigCommon IE. The parameter may include lte-CRS-ToMatchAround, lte-CRS-PatternList1-r16, lte-CRS- PatternList2-r16, crs-RateMatch-PerCORESETPoolIndex-r16, and the like, for example.

Rel-15 NR provides a function in which one CRS pattern can be configured per serving cell through the lte-CRS-ToMatchAround parameter. In Rel-16 NR, the above function has been extended to enable configuration of a plurality of CRS patterns per serving cell. More specifically, one CRS pattern per one LTE carrier may be configured in a single transmission and reception point (TRP) configuration terminal, and two CRS patterns per one LTE carrier may be configured in a multi-TRP configuration terminal. For example, in the single-TRP configuration terminal, up to three CRS patterns per serving cell may be configured through the lte-CRS-PatternList1-r16 parameter. For another example, a CRS may be configured for each TRP in the multi-TRP configuration terminal. That is, a CRS pattern for TRP1 may be configured through the lte-CRS-PatternList1-r16 parameter, and a CRS pattern for TRP2 may be configured through the lte-CRS-PatternList2-r16 parameter. On the other hand, when two TRPs are configured as described above, whether to apply both the CRS patterns of TRP1 and TRP2 to a specific PDSCH or whether to apply only the CRS pattern for one TRP is determined through crs-RateMatch-PerCORESETPoolIndex-r16 parameter. When the crs-RateMatch-PerCORESETPoolIndex-r16 parameter is configured to be enabled, only one TRP CRS pattern is applied, and in other cases, both TRP CRS patterns are applied.

Table 26 shows the ServingCellConfig IE including the CRS pattern, and Table 27 shows the RateMatchPatternLTE-CRS IE including at least one parameter for the CRS pattern.

TABLE 26

```
ServingCellConfig ::=                        SEQUENCE {
  tdd-UL-DL-ConfigurationDedicated                         TDD-UL-DL-ConfigDedicated
OPTIONAL, -- Cond TDD
  initialDownlinkBWP                         BWP-DownlinkDedicated                        OPTIONAL,
-- Need M
  downlinkBWP-ToReleaseList                  SEQUENCE (SIZE (1..maxNrofBWPs)) OF BWP-Id
OPTIONAL,                                    -- Need N
  downlinkBWP-ToAddModList                   SEQUENCE (SIZE (1..maxNrofBWPs)) OF BWP-
Downlink                                     OPTIONAL, -- Need N
  firstActiveDownlinkBWP-Id                  BWP-Id                                       OPTIONAL,
-- Cond SyncAndCellAdd
  bwp-InactivityTimer                        ENUMERATED {ms2, ms3, ms4, ms5, rns6, ms8, ms10, ms20,
ms30,
                                             ms40,ms50, ms60, ms80,ms100, ms200,ms300, ms500,
                                             ms750, ms1280, ms1920, ms2560, spare10, spare9, spare8,
                                             spare7, spare6, spare5, spare4, spare3, spare2, spare1 }
OPTIONAL,                                    --Need R
  defaultDownlinkBWP-Id                      BWP-Id                                       OPTIONAL,
-- Need S
  uplinkConfig                                              OPTIONAL, -- Need M
  supplementaryUplink                        UplinkConfig                                 OPTIONAL,
-- Need M
  pdcch-ServingCellConfig                              SetupRelease { PDCCH-ServingCellConfig }
OPTIONAL, - Need M
  pdsch-ServingCellConfig                              SetupRelease { PDSCH-ServingCellConfig }
OPTIONAL, -- Need M
  csi-MeasConfig                             SetupRelease { CSI-MeasConfig }              OPTIONAL,
-- Need M
  sCellDeactivationTimer                     ENUMERATED {ms20, ms40, ms80, ms160, ms200, ms240,
                                             ms320, ms400, ms480, ms520, ms640, ms720,
                                             ms840, ms1280, spare2,spare1}                OPTIONAL, -- Cond
ServingCellWithoutPUCCH
  crossCarrierSchedulingConfig                             OPTIONAL, -- Need M
  tag-Id                                     ,
  dummy                                      ENUMERATED {enabled}                         OPTIONAL,
-- Need R
  pathlossReferenceLinking                                 ENUMERATED {spCell, sCell}
OPTIONAL,                                    -- Cond SCellOnly
  servingCellMO                              MeasObjectId                                 OPTIONAL,
-- Cond MeasObject
  ...,
  [[
  lte-CRS-ToMatchAround                                SetupRelease { RateMatchPatternLTE-CRS }
OPTIONAL, -- Need M
  rateMatchPatternToAddModList               SEQUENCE (SIZE (1..maxNrofRateMatchPatterns)) OF
RateMatchPattern                             OPTIONAL, -- Need N
  rateMatchPatternToReleaseList              SEQUENCE (SIZE (1..maxNrofRateMatchPatterns)) OF
RateMatchPatternId                           OPTIONAL, -- Need N
  downlinkChannelBW-PerSCS-List              SEQUENCE (SIZE (1..maxSCSs)) OF SCS-
SpecificCarrier                              OPTIONAL -- Need S
  ]],
  [[
  supplementaryUplinkRelease                                            ENUMERATED        {true}
OPTIONAL,                                    -- Need N
  tdd-UL-DL-ConfigurationDedicated-IAB-MT-r16                TDD-UL-DL-ConfigDedicated-IAB-MT-
r16                                          OPTIONAL, -- Cond TDD_IAB
  dormantBWP-Config-r16                                SetupRelease {    DormantBWP-Config-r16 }
OPTIONAL,                                    -- Need M
  ca-SlotOffset-r16                          CHOICE {
```

TABLE 26-continued

```
    refSCS15kHz                           INTEGER (-2..2),
    refSCS30KHz                           INTEGER (-5..5),
    refSCS60KHz                           INTEGER (-10..10),
    refSCS120KHz                          INTEGER (-20..20)
  }                                                                                    OPTIONAL, -- Cond
AsyncCA
  channelAccessConfig-r16                           SetupRelease {   ChannelAccessConfig-r16 }
OPTIONAL,                            -- Need M
  intraCellGuardBandsDL-List-r16                    SEQUENCE   (SIZE (1..maxSCSs)) OF
IntraCellGuardBandsPerSCS-r16                 OPTIONAL, -- Need S
  intraCellGuardBandsUL-List-r16                    SEQUENCE   (SIZE (1..maxSCSs)) OF
IntraCellGuardBandsPerSCS-r16                 OPTIONAL, -- Need S
  csi-RS-ValidationWith-DCI-r16                           ENUMERATED            {enabled}
OPTIONAL,                            -- Need R
  lte-CRS-PatternList1-r16                          SetupRelease {   LTE-CRS-PatternList-r16 }
OPTIONAL,                            -- Need M
  lte-CRS-PatternList2-r16                          SetupRelease {   LTE-CRS-PatternList-r16 }
OPTIONAL,                            -- Need M
  crs-RateMatch-PerCORESETPoolIndex-r16                   ENUMERATED            {enabled}
OPTIONAL,                            -- Need R
  enableTwoDefaultTCI-States-r16                          ENUMERATED            {enabled}
OPTIONAL,                            -- Need R
  enableDefaultTCI-StatePerCoresetPoolIndex-r16           ENUMERATED            {enabled}
OPTIONAL,                            -- Need R
  enableBeamSwitchTiming-r16                                 ENUMERATED         {true}
OPTIONAL,                            -- Need R
  cbg-TxDiffTBsProcessingType1-r16                        ENUMERATED            {enabled}
OPTIONAL,                            -- Need R
  cbg-TxDiffTBsProcessingType2-r16                        ENUMERATED            {enabled}
OPTIONAL                             -- Need R
  ]]
}
```

TABLE 27

- RateMatchPatternLTE-CRS
The IE RateMatchPatternLTE-CRS is used to configure a pattern to
rate match around LTE CRS. See TS 38.214 [19], clause 5.1.4.2.

RateMatchPatternLTE-CRS information element

```
-- ASN1START
-- TAG-RATEMATCHPATTERNLTE-CRS-START
RateMatchPatternLTE-CRS ::=      SEQUENCE {
  carrierFreqDL                  INTEGER (0..16383),
  carrierBandwidthDL             ENUMERATED {n6, n15, n25, n50, n75,
n100, spare2, spare1},
  mbsfn-SubframeConfigList       EUTRA-MBSFN-SubframeConfigList
OPTIONAL, -- Need M
  nrofCRS-Ports                  ENUMERATED {n1, n2, n4},
  v-Shift                        ENUMERATED {n0, n1, n2, n3, n4, n5}
}
LTE-CRS-PatternList-r16 ::=      SEQUENCE (SIZE (1..maxLTE-CRS-Patterns-r16))
OF RateMatchPatternLTE-CRS
-- TAG-RATEMATCHPATTERNLTE-CRS-STOP
-- ASN1STOP
```

RateMatchPatternLTE-CRS field descriptions carrierBandwidthDL
BW of the LTE carrier in number of PRBs (see TS 38.214 [19], clause 5.1.4.2).
carrierFreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Ports
Number of LTE CRS antenna port to rate-match around (see TS 38.214 [19], clause 5.1.4.2).
v-Shift
Shifting value v-shift in LTE to rate match around LTE CRS (see TS 38.214 [19], clause 5.1.4.2).

PDSCH: Frequency-Domain Resource Allocation Related

Figure 13:
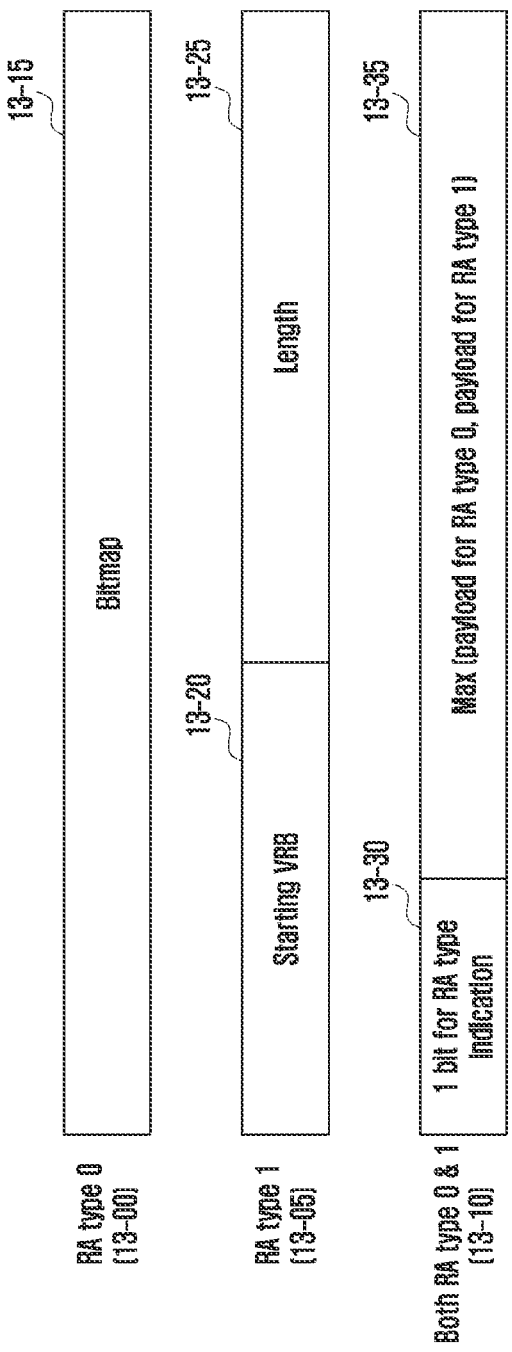
FIG. 13 illustrates an example of frequency-domain resource allocation of a PDSCH in a wireless communication system according to an embodiment.

FIG. 13 illustrates an example of frequency-domain resource allocation of a PDSCH in a wireless communication system according to an embodiment.

FIG. 13 shows three frequency-domain resource allocation methods of type 0 (13-00), type 1 (13-05), and dynamic switch (13-10) configurable through a higher layer in an NR wireless communication system.

Referring to FIG. 13, if a UE is configured to use only resource type 0 via higher layer signaling (13-00), some DCI for allocation of PDSCH to the corresponding UE includes a bitmap formed of non-deterministic random generator (NRBG) bits, with NRBG denoting the number of resource block groups (RBGs) determined further to Table 28, below, according to a BWP size allocated by a BWP indicator and a higher layer parameter rbg-Size, and data is transmitted to RBG indicated as "1" in the bitmap.

TABLE 28

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only resource type 1 via higher layer signaling (13-05), some DCI for allocation of the PDSCH to the UE includes frequency-domain resource allocation information configured by $\lceil \log_2(N_{RB}^{DL,BWP}(N_{RB}^{DL,BWP}+1)/2) \rceil$ bits. Through this information, the base station may configure a starting VRB 13-20 and the length of frequency-domain resources 13-25 continuously allocated therefrom.

If the UE is configured to use both resource type 0 and resource type 1 via higher layer signaling (13-10), some DCI for allocation of PDSCH to the UE includes frequency-domain resource allocation information configured by bits of a greater value 13-35 among a payload 13-15 for configuration of resource type 0 and payloads 13-20 and 13-25 for configuration of resource type 1, a condition for which will be described later. Here, one bit is added to the most significant bit (MSB) of the frequency-domain resource allocation information in the DCI, if the corresponding bit has a value of "0", 0 indicates that resource type 0 is used, and if the corresponding bit has a value of "1", 1 indicates that resource type 1 is used.

PDSCH/PUSCH: Time-Domain Resource Allocation Related

Hereinafter, a method of allocating time domain resources for a data channel in a next-generation mobile communication system (5G or NR system) will be described.

A base station may configure, for a UE, a table for time-domain resource allocation information for a downlink data channel (PDSCH) and an uplink data channel (PUSCH) via higher layer signaling (e.g., RRC signaling). For PDSCH, a table including maxNrofDL-Allocations=16 entries may be configured, and for PUSCH, a table including maxNrofUL-Allocations=16 entries may be configured. In an embodiment, the time-domain resource allocation information may include PDCCH-to-PDSCH slot timing (corresponding to a time interval in slot units between a time point at which a PDCCH is received and a time point at which a PDSCH scheduled by the received PDCCH is transmitted, and denoted by K0), PDCCH-to-PUSCH slot timing (corresponding to a time interval in slot units between a time point at which a PDCCH is received and a time point at which a PUSCH scheduled by the received PDCCH is transmitted, and denoted by K2), information on the position and length of a start symbol in which the PDSCH or PUSCH is scheduled within a slot, a mapping type of PDSCH or PUSCH, and the like. For example, information such as Table 29 or Table 30, below may be transmitted from the base station to the UE.

TABLE 29

PUSCH-TimeDomainResourceAllocation information element

```
PDSCH-TimeDomainResourceAllocationList ::= SEQUENCE (SIZE(1..maxNrofDL-
Allocations)) OF PDSCH-TimeDomainResourceAllocation
PDSCH-TimeDomainResourceAllocation ::= SEQUENCE {
   k0                         INTEGER(0..32)          OPTIONAL, --
Need S
   mappingType                ENUMERATED {typeA, typeB},
   startSymbolAndLength       INTEGER (0..127)
}
```

TABLE 30

PDSCH-TimeDomainResourceAllocationList information element

```
PUSCH-TimeDomainResourceAllocationList ::= SEQUENCE (SIZE(1..maxNrofUL-
Allocations)) OF PUSCH-TimeDomainResourceAllocation
PUSCH-TimeDomainResourceAllocation ::= SEQUENCE {
   k2                         INTEGER(0..32)          OPTIONAL, -- Need S
   mappingType                ENUMERATED {typeA, typeB},
   startSymbolAndLength       INTEGER (0..127)
}
```

The base station may notify one of the entries in the above-described table representing the time-domain resource allocation information to the UE via L1 signaling (e.g., DCI) (e.g., may be indicated by a time-domain resource allocation field in DCI). The UE may acquire time-domain resource allocation information for the PDSCH or PUSCH based on the DCI received from the base station.

Figure 14:
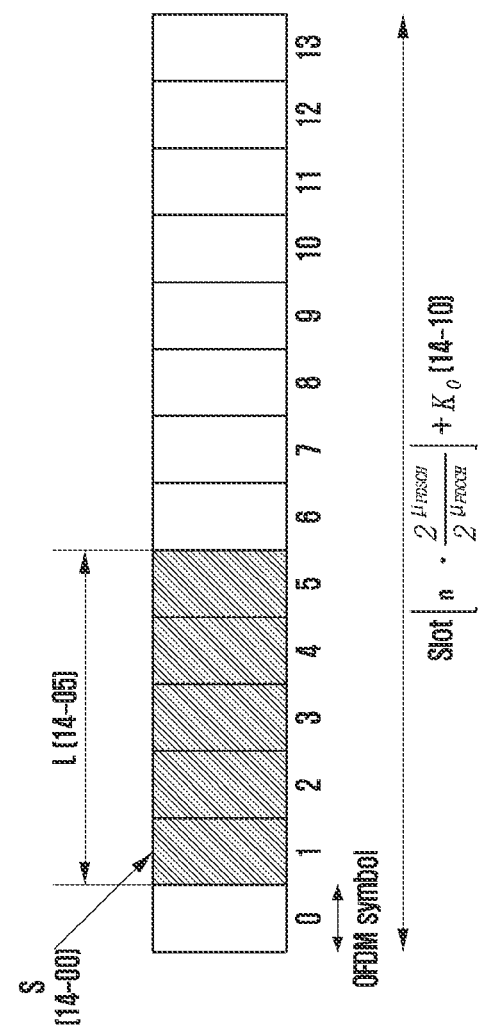
FIG. 14 illustrates an example of time-domain resource allocation of a PDSCH in a wireless communication system according to an embodiment.

FIG. 14 illustrates an example of time-domain resource allocation of a PDSCH in a wireless communication system according to an embodiment.

Referring to FIG. 14, a base station may indicate a time-domain position of a PDSCH resource according to a start position 14-00 and a length 14-05 of an OFDM symbol in one slot 14-10 dynamically indicated based on the subcarrier spacing (SCS) ($\mu_{PDSCH}$, $\mu_{PDCCH}$) of a data channel and a control channel configured using a higher layer, a scheduling offset (K0) value, and DCI.

Figure 15:
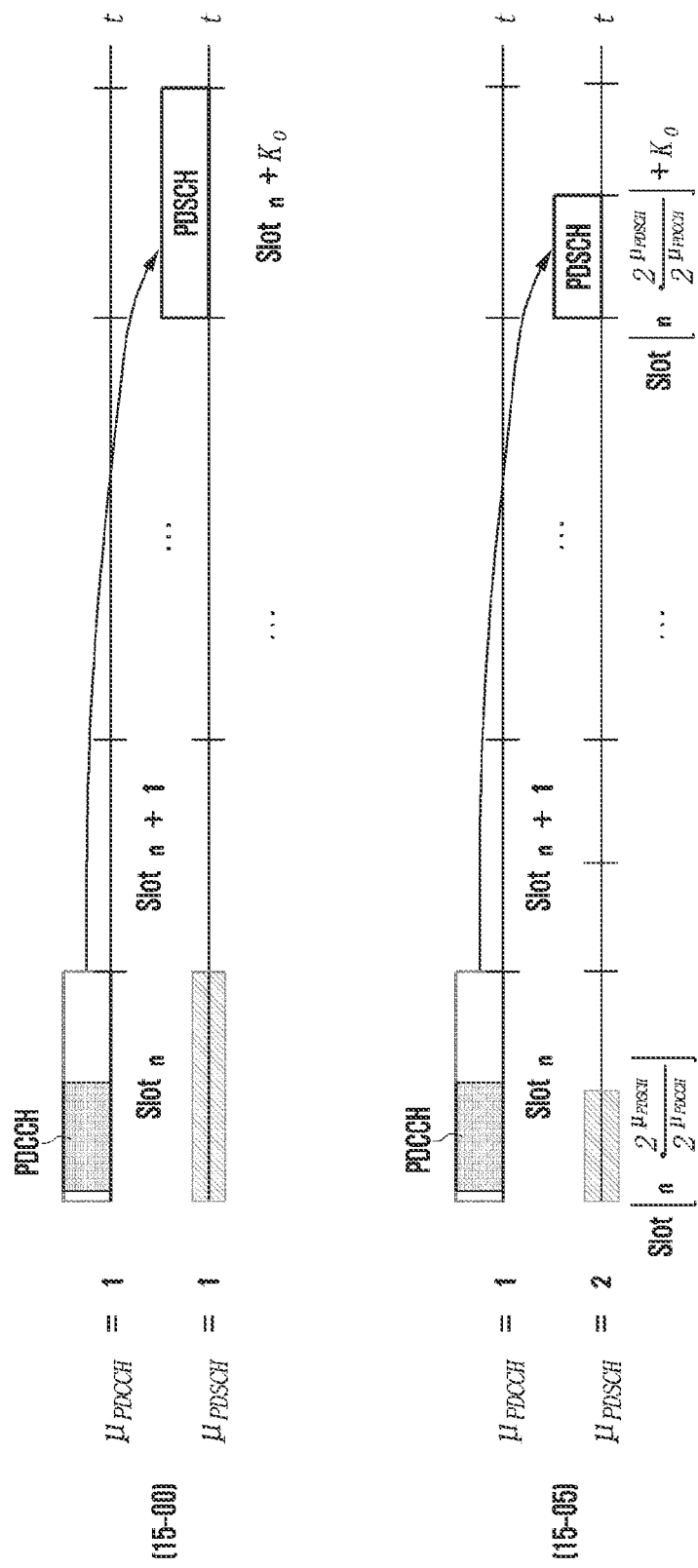
FIG. 15 illustrates an example of time-domain resource allocation according to subcarrier spacings of a data channel and a control channel in a wireless communication system according to an embodiment.

FIG. 15 illustrates an example of time-domain resource allocation according to the subcarrier spacings of a data channel and a control channel in a wireless communication system according to an embodiment.

Referring to FIG. 15, if a data channel and a control channel have the same subcarrier spacing (15-00, $\mu_{PDSCH}=\mu_{PDCCH}$), since a data slot number and a control slot number are the same, a base station and a UE may generate a scheduling offset adjusted according to predetermined slot offset K0. On the other hand, when the subcarrier spacing of the data channel and the subcarrier spacing of the control channel are different (15-05, $\mu_{PDSCH}\neq\mu_{PDCCH}$), since a data slot number and a control slot number are different, the base station and the UE may generate a scheduling offset adjusted according to the predetermined slot offset K0 based on the subcarrier spacing of the PDCCH.

PDSCH: Processing Procedure Time

Next, PDSCH processing procedure time will be described. When the base station is configured to schedule transmission of a PDSCH using DCI format 1_0, 1_1, or 1_2 to the UE, the UE may require a PDSCH processing procedure time for reception of the PDSCH by applying transmission methods indicated through DCI (modulation/demodulation and coding indication index (MCS), demodulation reference signal related information, time and frequency resource allocation information, etc.) In NR, the PDSCH processing procedure time is defined in consideration of the above methods. The PDSCH processing procedure time of UE may follow Equation (3), below.

$$T_{proc,1}=(N_1+d_{1,1}+d_2)(2048+144)\kappa 2^{-\mu}T_c+T_{ext} \quad (3)$$

Each variable in $T_{proc,1}$ described by Equation (3) may have the following meaning.

$N_1$: the number of symbols determined according to $\mu$ and UE processing capability 1 or 2 according to the UE capability. When UE processing capability 1 is reported according to UE capability report (in case of PDSCH processing capability 1), $N_1$ may have the value provided in Table 31 m and when UE processing capability 2 is reported and it is configured via higher layer signaling that UE processing capability 2 can be used (in case of PDSCH processing capability 2), $N_1$ may have the value provided in Table 32. $\mu$ may correspond to the minimum value among $\mu_{PDCCH}$, $\mu_{PDSCH}$, and $\mu_{UL}$ so as to maximize the $T_{proc,1}$ and $\mu_{PDCCH}$, $\mu_{PDSCH}$, and $\mu_{UL}$ may refer to a PDCCH for scheduling of a PDSCH, the scheduled PDSCH, and an uplink channel through which HARQ-ACK is to be transmitted, respectively.

TABLE 31

PDSCH decoding time $N_1$ [symbols]

| $\mu$ | Case in which dmrs-AdditionalPosition = pos0 within DMRS-DownlinkConfig that is higher-layer signaling in both PDSCH mapping types A and B | Case in which AdditionalPosition ≠ pos0 within DMRS-DownlinkConfig that is higher-layer signaling or a higher-layer parameter is not configured in both PDSCH mapping types A and B |
|---|---|---|
| 0 | 8 | $N_{1,0}$ |
| 1 | 10 | 13 |
| 2 | 17 | 20 |
| 3 | 20 | 24 |

TABLE 32

| μ | PDSCH decoding time $N_1$ [symbols] Case in which dmrs-AdditionalPosition = pos0 within DMRS-DownlinkConfig that is higher-layer signaling in both PDSCH mapping types A and B |
|---|---|
| 0 | 3 |
| 1 | 4.5 |
| 2 | 9 for frequency range (FR) 1 |

κ: 64

$T_{ext}$: when the UE uses a shared spectrum channel access method, the UE may calculate $T_{ext}$ and apply the calculated text to PUSCH preparation procedure time. Otherwise, $T_{ext}$ is assumed to be 0.

If $I_1$ indicating the position value of PDSCH DMRS is 12, N1,0 of Table 22 has the value of 14, otherwise $I_1$ has the value of 13.

With regard to PDSCH mapping type A, the last symbol of the PDSCH is the i-th symbol in the slot in which the PDSCH is transmitted, and if i<7, $d_{1,1}$ is 7−i, otherwise $d_{1,1}$ has the value of 0.

$d_2$: When a PUCCH having a high priority index and a PUCCH or PUSCH having a low priority index overlap in time, $d_2$ of the PUCCH having a high priority index may be configured to be a value reported by the UE. Otherwise, $d_2$ has the value of 0.

When PDSCH mapping type B is used for UE processing capability 1, the value of $d_{1,1}$ may be determined according to L, which is the number of symbols of the scheduled PDSCH, and d, which is the number of overlapping symbols between a PDCCH scheduling the PDSCH and the scheduled PDSCH, as follows.

If L≥7, then $d_{1,1}$=0.
if L≥4 and L≤6, then $d_{1,1}$=7−L.
If L=3, then $d_{1,1}$=min (d, 1).
if L=2, then $d_{1,1}$=3+d.

When PDSCH mapping type B is used for UE processing capability 2, the value of $d_{1,1}$ may be determined according to L, which is the number of symbols of the scheduled PDSCH, and d, which is the number of overlapping symbols between a PDCCH scheduling the PDSCH and the scheduled PDSCH, as follows.

If L≥7, then $d_{1,1}$=0.
if L≥4 and L≤6, then $d_{1,1}$=7−L.
if L=2,
If the scheduled PDCCH exists in a CORESET configured by three symbols, and the corresponding CORESET and the scheduled PDSCH have the same start symbol, $d_{1,1}$=3.
otherwise, $d_{1,1}$=d.

In a case of a UE supporting capability 2 in a given serving cell, the PDSCH processing time according to UE processing capability 2 may be applied when the UE is configured such that processingType2Enabled which is higher layer signaling with regard to the cell to be an enable state.

The position of the first uplink transmission symbol of the PUCCH including HARQ-ACK information (in the corresponding position, $K_1$—defined as the transmission time of HARQ-ACK, a PUCCH resource used for HARQ-ACK transmission, and timing advance effect may be considered), is not started before the first uplink transmission symbol that appears after a time equal to $T_{proc,1}$ from the last symbol of the PDSCH, the UE needs to transmit a valid HARQ-ACK message. That is, the UE needs to transmit the PUCCH including HARQ-ACK only when a PDSCH processing time is sufficient. Otherwise, the UE may not provide the base station with valid HARQ-ACK information corresponding to the scheduled PDSCH. The $T_{proc,1}$ may be used for both normal or extended CP. In case of a PDSCH configured by two PDSCH transmission occasions in one slot, $d_{1,1}$ is calculated based on the first PDSCH transmission occasion in the corresponding slot.

PDSCH: Reception Preparation Time During Cross-Carrier Scheduling

Next, in case that $\mu_{PDCCH}$, which is numerology through which a scheduling PDCCH is transmitted, and $\mu_{PDSCH}$, which is numerology through which a PDSCH scheduled through the corresponding PDCCH is transmitted, are different cross-carrier scheduling, $N_{pdsch}$, which is the PDSCH reception preparation time of the UE defined for a time interval between the PDCCH and the PDSCH, will be described.

If $\mu_{PDCCH}<\mu_{PDSCH}$, the scheduled PDSCH cannot be transmitted earlier than the first symbol of a slot appearing after the $N_{pdsch}$ symbol from the last symbol of the PDCCH for which the PDSCH is scheduled. A transmission symbol of the corresponding PDSCH may include a DM-RS.

If $\mu_{PDCCH}>\mu_{PDSCH}$, the scheduled PDSCH may be transmitted after the $N_{pdsch}$ symbol from the last symbol of the PDCCH for which the corresponding PDSCH is scheduled. A transmission symbol of the corresponding PDSCH may include a DM-RS. Table 33 shows $N_{pdsch}$ according to the scheduled PDCCH subcarrier spacing.

TABLE 33

| $\mu_{PDCCH}$ | $N_{pdsch}$ [symbols] |
|---|---|
| 0 | 4 |
| 1 | 5 |
| 2 | 10 |
| 3 | 14 |

PDSCH: TCI State Activation MAC-CE

Next, a beam configuration method for a PDSCH will be described.

FIG. 16 illustrates a procedure for beam configuration and activation of a PDSCH in a wireless communication system according to an embodiment.

A list of TCI states for a PDSCH may be indicated through a higher layer list such as RRC (16-00). The list of TCI states may be indicated by, for example, tci-StatesToAddModList and/or tci-StatesToReleaseList in PDSCH-Config IE for each BWP. Next, a part of the list of the TCI states may be activated through the MAC-CE (16-20). The maximum number of activated TCI states may be determined according to the capability reported by a UE. Reference numeral 16-40 shows an example of a MAC-CE structure for PDSCH TCI state activation/deactivation.

The meaning of each field in the MAC CE and values configurable for each field are summarized in Table 34.

TABLE 34

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5],

TABLE 34-continued this MAC CE applies to all the Serving Cells configured in the set simultaneousTCI-UpdateList1 or simultaneousTCI-UpdateList2, respectively;
BWP ID: This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells;
$T_i$: If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to Oto indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e., the first TCI State with $T_i$ field set to 1 shall be mapped to the codepoint value 0, second TCI State with Ti field set to 1 shall be mapped
to the codepoint value 1 and so on. The maximum number of activated TCI states is 8;
CORESET Pool ID: This field indicates that mapping between the activated TCI states and the codepoint of the DCI Transmission Configuration Indication set by field Ti is specific to the ControlResourceSetId configured with CORESET Pool ID as specified in TS 38.331 [5]. This field set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0. If the coresetPoolIndex is not configured for any CORESET, MAC entity shall ignore the CORESET Pool ID field in this MAC CE when receiving the MAC CE. If the Serving Cell in the MAC CE is configured in a cell list that contains more than one Serving Cell, the CORESET Pool ID field shall be ignored when receiving the MAC CE.

SRS Related

Next, a method for estimating an uplink channel by using a sounding reference signal (SRS) transmission of the UE will be described. The base station may configure at least one SRS configuration for each uplink BWP in order to transfer configuration information for SRS transmission to the UE, and may configure at least one SRS resource set for each SRS configuration. As an example, the base station and the UE may exchange higher layer signaling information as follows in order to transfer information about the SRS resource set.

srs-ResourceSetId: SRS resource set index.
    srs-ResourceIdList: a set of SRS resource indexes referenced in the SRS resource set.
    resourceType. This is the time-domain transmission configuration of the SRS resource referenced in the SRS resource set, and may be configured to be one of periodic, semi-persistent, and aperiodic. If the resourceType is configured to be periodic or semi-persistent, the associated CSI-RS information may be provided according to the usage of the SRS resource set. If the resourceType is configured to be aperiodic, an aperiodic SRS resource trigger list and slot offset information may be provided, and associated CSI-RS information may be provided according to the usage of the SRS resource set.
    usage: is a configuration for the usage of the SRS resource referenced in the SRS resource set, and may be configured to be one of beamManagement, codebook, nonCodebook, and antennaSwitching.
    alpha, p0, pathlossReferenceRS, srs-PowerControlAdjustmentStates: provides parameter configurations for adjusting the transmit power of the SRS resource referenced in the SRS resource set.

The UE may understand that the SRS resource included in the set of SRS resource indexes referenced in the SRS resource set follows the information configured in the SRS resource set.

In addition, the base station and the UE may transmit or receive higher layer signaling information in order to transfer individual configuration information for the SRS resource. As an example, the individual configuration information for the SRS resource may include time-frequency domain mapping information in a slot of the SRS resource, and this may include information about intra-slot or inter-slot frequency hopping of the SRS resource. In addition, the individual configuration information for the SRS resource may include the time-domain transmission configuration of the SRS resource, and may be configured to be one of periodic, semi-persistent, and aperiodic. The individual configuration information may be limited to have the same time-domain transmission configuration as the SRS resource set including the SRS resource. If the time-domain transmission configuration of the SRS resource is configured to be periodic or semi-persistent, the SRS resource transmission period and slot offset (e.g., periodicityAndOffset) may be additionally included in the time-domain transmission configuration.

The base station may activate, deactivate, or trigger SRS transmission to the UE via higher layer signaling including RRC signaling or MAC CE signaling, or L1 signaling (e.g., DCI). For example, the base station may activate or deactivate periodic SRS transmission to the UE via higher layer signaling. The base station may indicate the UE to activate the SRS resource set, in which the resourceType is configured as periodic, via higher layer signaling, and the UE may transmit the SRS resource referenced in the activated SRS resource set. The time-frequency domain resource mapping in a slot of the transmitted SRS resource follows the resource mapping information configured in the SRS resource, and the slot mapping including the transmission period and the slot offset follows the periodicityAndOffset configured in the SRS resource. In addition, the spatial domain transmission filter applied to the SRS resource to be transmitted may refer to spatial relation info configured in the SRS resource, or may refer to associated CSI-RS information configured in the SRS resource set including the SRS resource. The UE may transmit the SRS resource within the uplink BWP activated for the periodic SRS resource activated via higher layer signaling.

For example, the base station may activate or deactivate semi-persistent SRS transmission to the UE via higher layer signaling. The base station may indicate to activate the SRS resource set through MAC CE signaling, and the UE may transmit the SRS resource referenced in the activated SRS resource set. The SRS resource set activated through MAC CE signaling may be limited to the SRS resource set in which the resourceType is configured to be semi-persistent. The time-frequency domain resource mapping in a slot of the SRS resource to be transmitted follows the resource mapping information configured in the SRS resource, and the slot mapping including the transmission period and the slot offset follows the periodicityAndOffset configured in the SRS resource. In addition, the spatial domain transmission filter applied to the SRS resource to be transmitted may refer to spatial relation info configured in the SRS resource, or may refer to associated CSI-RS information configured in the SRS resource set including the SRS resource. If spatial relation info is configured in the SRS resource, a spatial domain transmission filter may be determined, not based on the configured spatial relation info, but by referring to configuration information for the spatial relation information transferred through MAC CE signaling that activates semi-persistent SRS transmission. The UE may transmit the SRS resource in the uplink BWP activated for the semi-persistent SRS resource activated via higher layer signaling.

For example, the base station may trigger aperiodic SRS transmission to the UE through DCI. The base station may indicate one of aperiodic SRS resource triggers (aperiodicSRS-ResourceTrigger) through an SRS request field of DCI. The UE may understand that the SRS resource set including the aperiodic SRS resource trigger indicated through DCI in the aperiodic SRS resource trigger list, among the configuration information of the SRS resource set, is triggered. The UE may transmit the SRS resource referenced in the triggered SRS resource set. The time-frequency domain resource mapping in the slot of the SRS resource to be transmitted follows the resource mapping information configured in the SRS resource. In addition, the slot mapping of the SRS resource to be transmitted may be determined through the slot offset between the PDCCH including DCI and the SRS resource, and the slot offset may refer to the value(s) included in the slot offset set configured in the SRS resource set. Specifically, the slot offset between the PDCCH including DCI and the SRS resource may be applied with a value indicated in the time domain resource assignment field of DCI among the offset value(s) included in the slot offset set configured in the SRS resource set. In addition, the spatial domain transmission filter applied to the SRS resource to be transmitted may refer to spatial relation info configured in the SRS resource, or may refer to associated CSI-RS information configured in the SRS resource set including the SRS resource. The UE may transmit the SRS resource in the uplink BWP activated for the aperiodic SRS resource triggered through DCI.

When the base station triggers aperiodic SRS transmission to the UE through DCI, in order for the UE to transmit the SRS by applying the configuration information for the SRS resource thereto, the minimum time interval between the PDCCH including the DCI for triggering the aperiodic SRS transmission and the transmitted SRS may be required. The time interval for SRS transmission of the UE may be the number of symbols between the first symbol to which the SRS resource, which is transmitted first among the transmitted SRS resource(s), is mapped, and the last symbol of the PDCCH including the DCI for triggering aperiodic SRS transmission. The minimum time interval may be determined by making reference to PUSCH preparation procedure time required for UE to prepare PUSCH transmission. In addition, the minimum time interval may have a different value depending on the usage of the SRS resource set including the transmitted SRS resource. For example, the minimum time interval may be determined as an N2 symbol in consideration of the UE processing capability according to the UE capability by making reference to the PUSCH preparation procedure time of the UE. In addition, if the usage of the SRS resource set is configured to be codebook or antennaSwitching by considering the usage of the SRS resource set including the transmitted SRS resource, the minimum time interval is configured to be N2 symbol, and if the usage of the SRS resource set is configured to be nonCodebook or beamManagement, the minimum time interval may be determined to be the N2+14 symbol. If the time interval for a periodic SRS transmission is greater than or equal to the minimum time interval, the UE may transmit the aperiodic SRS, and if the time interval for aperiodic SRS transmission is less than the minimum time interval, the UE may ignore DCI for triggering the aperiodic SRS.

TABLE 35

```
SRS-Resource ::=              SEQUENCE {
    srs-ResourceId                SRS-ResourceId,
    nrofSRS-Ports                 ENUMERATED {port1, ports2, ports4},
    ptrs-PortIndex                ENUMERATED {n0, n1 }         OPTIONAL,
    -- Need R
    transmissionComb              CHOICE {
        n2                            SEQUENCE {
            combOffset-n2                 INTEGER (0..1),
            cyclicShift-n2                INTEGER (0..7)
        },
        n4                            SEQUENCE {
            combOffset-n4                 INTEGER (0..3),
            cyclicShift-n4                INTEGER (0..11)
        }
    },
    resourceMapping               SEQUENCE {
        startPosition                 INTEGER (0..5),
        nrofSymbols                   ENUMERATED {n1, n2, n4},
        repetitionFactor              ENUMERATED {n1, n2, n4}
    }
    freqDomainPosition            INTEGER (0..67),
    freqDomainShift               INTEGER (0..268),
    freqHopping                   SEQUENCE {
        c-SRS                         INTEGER (0..63),
        b-SRS                         INTEGER (0..3),
        b-hop                         INTEGER (0..3)
    },
```

TABLE 35-continued

```
    groupOrSequenceHopping          ENUMERATED { neither, groupHopping,
sequenceHopping },
    resourceType                    CHOICE {
       aperiodic                    SEQUENCE {
          ...
       },
       semi-persistent              SEQUENCE {
          periodicityAndOffset-sp      SRS-PeriodicityAndOffset,
          ...
       },
       periodic                     SEQUENCE {
          periodicityAndOffset-p       SRS-PeriodicityAndOffset,
          ...
       }
    },
    sequenceId                      INTEGER (0..1023),
    spatialRelationInfo             SRS-SpatialRelationInfo    OPTIONAL, -
- Need R
    ...
}
```

The spatialRelationInfo configuration information in Table 35 is allowed to be applied to the beam information of the reference signal and a beam used for the corresponding SRS transmission by referring to one reference signal. For example, the configuration of spatialRelationInfo may include information as shown in Table 36, below.

TABLE 36

```
SRS-SpatialRelationInfo ::=    SEQUENCE {
    servingCellId              ServCellIndex  OPTIONAL, -- Need S
    referenceSignal            CHOICE {
       ssb-Index               ,
       csi-RS-Index              NZP-CSI-RS-ResourceId,
       srs                     SEQUENCE {
          resourceId              SRS-ResourceId,
          uplinkBWP               BWP-Id
       }
    }
}
```

Referring to the spatialRelationInfo configuration, an SS/PBCH block index, CSI-RS index, or SRS index may be configured as an index of a reference signal to be referenced in order to use beam information of a specific reference signal. The higher layer signaling referenceSignal is configuration information indicating which reference signal beam information is to be referred to for the corresponding SRS transmission, ssb-index denotes the index of the SS/PBCH block, csi-RS-Index denotes the index of the CSI-RS, and srs denotes the index of the SRS. If the value of the higher layer signaling referenceSignal is configured to be an ssb-Index, the UE may apply a reception beam used when receiving the SS/PBCH block corresponding to the ssb-Index as a transmission beam of the corresponding SRS transmission. If the value of the higher layer signaling referenceSignal is configured to be csi-RS-Index, the UE may apply a reception beam used when receiving the CSI-RS corresponding to the csi-RS-Index as a transmission beam of the corresponding SRS transmission. If the value of the higher layer signaling referenceSignal is configured to be srs, the UE may apply a transmission beam used when transmitting the SRS corresponding to srs as a transmission beam of the corresponding SRS transmission.

PUSCH: Transmission Method Related

Next, a method of scheduling PUSCH transmission will be described. PUSCH transmission may be dynamically scheduled by a UL grant in DCI or may be operated by a configured grant Type 1 or Type 2. Dynamic scheduling indication for PUSCH transmission is possible using DCI format 0_0 or 0_1.

Configured grant Type 1 PUSCH transmission does not receive a UL grant in DCI, and may be semi-statically configured through reception of configuredGrantConfig including rrc-ConfiguredUplinkGrant of Table 37 via higher layer signaling. Configured grant Type 2 PUSCH transmission may be semi-persistently scheduled by UL grant in DCI after reception of configuredGrantConfig that does not include the rrc-ConfiguredUplinkGrant of Table 37 via higher layer signaling. When PUSCH transmission is operated by a configured grant, parameters applied to PUSCH transmission are applied through configuredGrantConfig, which is higher layer signaling of Table 37, except for dataScramblingIdentityPUSCH, txConfig, codebookSubset, maxRank, and scaling of UCI-OnPUSCH, which are provided by pusch-Config of Table 38, which is higher layer signaling. If the UE is provided with transformPrecoder in configuredGrantConfig, which is higher layer signaling of Table 37, the UE applies tp-pi2BPSK in the pusch-Config of Table 38 with regards to PUSCH transmission operated by the configured grant.

TABLE 37

```
ConfiguredGrantConfig ::=            SEQUENCE {
    frequencyHopping                     ENUMERATED {intraSlot, interSlot}
OPTIONAL, -- Need S,
    cg-DMRS-Configuration            DMRS-UplinkConfig,
    mcs-Table                            ENUMERATED {qam256, qam64LowSE}
OPTIONAL, -- Need S
    mcs-TableTransformPrecoder           ENUMERATED {qam256, qam64LowSE}
OPTIONAL, -- Need S
    uci-OnPUSCH                          SetupRelease { CG-UCI-OnPUSCH }
OPTIONAL, -- Need M
```

TABLE 37-continued

```
    resourceAllocation              ENUMERATED { resourceAllocationType0,
resourceAllocationType1, dynamicSwitch },
    rbg-Size                        ENUMERATED {config2}   OPTIONAL,
-- Need S
    powerControlLoopToUse           ENUMERATED {n0, n1},
    p0-PUSCH-Alpha                  P0-PUSCH-AlphaSetId,
    transformPrecoder                                    ENUMERATED {enabled, disabled}
OPTIONAL, -- Need S
    nrofHARQ-Processes              INTEGER(1..16),
    repK                            ENUMERATED {n1, n2, n4, n8},
    repK-RV                              ENUMERATED {s1-0231, s2-0303, s3-0000}
OPTIONAL, -- Need R
    periodicity                     ENUMERATED {
                                    sym2, sym7, sym1x14, sym2x14, sym4x14, sym5x14, sym8x14,
sym10x14, sym16x14, sym20x14,
                                    sym32x14, sym40x14, sym64x14, sym80x14, sym128x14,
sym160x14, sym256x14, sym320x14, sym512x14,
                                    sym640x14, sym1024x14, sym1280x14, sym2560x14,
sym5120x14,
                                    sym6, sym1x12, sym2x12, sym4x12, sym5x12, sym8x12,
sym10x12, sym16x12, sym20x12, sym32x12,
                                    sym40x12, sym64x12, sym80x12, sym128x12, sym160x12,
sym256x12, sym320x12, sym512x12, sym640x12,
                                    sym1280x12, sym2560x12
    },
    configuredGrantTimer            INTEGER (1..64)    OPTIONAL,
-- Need R
    rrc-ConfiguredUplinkGrant       SEQUENCE {
        timeDomainOffset            INTEGER (0..5119),
        timeDomainAllocation        INTEGER (0..15),
        frequencyDomainAllocation    BIT STRING (SIZE(18)),
        antennaPort                 INTEGER (0..31),
        dmrs-SeqInitialization      INTEGER (0..1)    OPTIONAL,
-- Need R
        precodingAndNumberOfLayers       INTEGER (0..63),
        srs-ResourceIndicator       INTEGER (0..15)   OPTIONAL,
-- Need R
        mcsAndTBS                   INTEGER (0..31),
        frequencyHoppingOffset          INTEGER (1.. maxNrofPhysicalResourceBlocks-1)
OPTIONAL, -- Need R
        pathlossReferenceIndex          INTEGER (0..maxNrofPUSCH-PathlossReferenceRSs-
1),
        ...
    }                               OPTIONAL, -- Need R
    ...
}
```

Next, a PUSCH transmission method will be described. A DMRS antenna port for PUSCH transmission is the same as an antenna port for SRS transmission. PUSCH transmission may be based on a codebook-based transmission method and a non-codebook-based transmission method, respectively, depending on whether the value of txConfig in pusch-Config of Table 38, which is higher layer signaling, is codebook or nonCodebook.

As described above, PUSCH transmission may be dynamically scheduled through DCI format 0_0 or 0_1, and may be semi-statically configured by a configured grant. If the UE is indicated to schedule PUSCH transmission through DCI format 0_0, the UE performs beam configuration for PUSCH transmission by using pucch-spatialRelationInfoID corresponding to the UE-specific PUCCH resource corresponding to the minimum ID in the uplink BWP activated in the serving cell, and here, PUSCH transmission is based on a single antenna port. The UE does not expect scheduling for PUSCH transmission through DCI format 0_0 within a BWP in which the PUCCH resource including the pucch-spatialRelationInfo is not configured. If the UE is not configured with txConfig in pusch-Config of Table 38, the UE does not expect to be scheduled in DCI format 0_1.

TABLE 38

```
PUSCH-Config ::=                        SEQUENCE {
    dataScramblingIdentityPUSCH                      INTEGER (0..1023)
OPTIONAL, -- Need S
    txConfig                        ENUMERATED {codebook, nonCodebook}
OPTIONAL, -- Need S
    dmrs-UplinkForPUSCH-MappingTypeA    SetupRelease { DMRS-UplinkConfig }
OPTIONAL, -- Need M
    dmrs-UplinkForPUSCH-MappingTypeB    SetupRelease { DMRS-UplinkConfig }
OPTIONAL, -- Need M
    pusch-PowerControl                           OPTIONAL, -- Need M
    frequencyHopping                ENUMERATED {intraSlot, interSlot}
OPTIONAL, -- Need S
```

TABLE 38-continued

| | | |
|---|---|---|
| frequencyHoppingOffsetLists | SEQUENCE (SIZE (1..4)) OF INTEGER (1.. maxNrofPhysicalResourceBlocks-1) | OPTIONAL, -- Need M |
| resourceAllocation | ENUMERATED { resourceAllocationType0, resourceAllocationType1, dynamicSwitch}, | |
| pusch-TimeDomainAllocationList | SetupRelease { PUSCH-TimeDomainResourceAllocationList } | OPTIONAL, -- Need M |
| pusch-AggregationFactor | ENUMERATED { n2, n4, n8 } | OPTIONAL, -- Need S |
| mcs-Table | ENUMERATED {qam256, qam64LowSE} | OPTIONAL, -- Need S |
| mcs-TableTransformPrecoder | ENUMERATED {qam256, qam64LowSE} | OPTIONAL, -- Need S |
| transformPrecoder | ENUMERATED {enabled, disabled} | OPTIONAL, -- Need S |
| codebookSubset | ENUMERATED {fullyAndPartialAndNonCoherent, partialAndNonCoherent,nonCoherent} | OPTIONAL, -- Cond codebookBased |
| maxRank | INTEGER (1..4) | OPTIONAL, -- Cond codebookBased |
| rbg-Size | ENUMERATED { config2 } | OPTIONAL, -- Need S |
| uci-OnPUSCH | SetupRelease { UCI-OnPUSCH} | OPTIONAL, -- Need M |
| tp-pi2BPSK | ENUMERATED {enabled} | OPTIONAL, -- Need S |
| ... | | |
| } | | |

Next, codebook-based PUSCH transmission will be described. Codebook-based PUSCH transmission may be dynamically scheduled through DCI format 0_0 or 0_1, and may operate semi-statically by a configured grant. When the codebook-based PUSCH is dynamically scheduled by DCI format 0_1 or is configured semi-statically by a configured grant, the UE determines a precoder for PUSCH transmission based on an SRS resource indicator (SRI), a transmission precoding matrix indicator (TPMI), and a transmission rank (the number of PUSCH transport layers).

Here, the SRI may be given through a field SRS resource indicator in DCI or may be configured through srs-ResourceIndicator, which is higher layer signaling. The UE is configured with at least one SRS resource when transmitting a codebook-based PUSCH, and may be configured with up to two SRS resources. When the UE is provided with an SRI through DCI, the SRS resource indicated by the corresponding SRI denotes an SRS resource corresponding to the SRI among SRS resources transmitted before the PDCCH including the corresponding SRI. In addition, TPMI and transmission rank may be given through field precoding information and number of layers in DCI, or may be configured through precodingAndNumberOfLayers, which is higher layer signaling. TPMI is used to indicate a precoder applied to PUSCH transmission. If the UE is configured with one SRS resource, the TPMI is used to indicate a precoder to be applied in the configured one SRS resource. If the UE is configured with multiple SRS resources, the TPMI is used to indicate a precoder to be applied in the SRS resource indicated through the SRI.

A precoder to be used for PUSCH transmission is selected from an uplink codebook having the same number of antenna ports as the value of nrofSRS-Ports in SRS-Config, which is higher layer signaling. In codebook-based PUSCH transmission, the UE determines a codebook subset based on the TPMI and codebookSubset in pusch-Config, which is higher layer signaling. CodebookSubset in pusch-Config, which is higher layer signaling, may be configured with one of fullyAndPartialAndNonCoherent, partialAndNonCoherent, or nonCoherent based on the UE capability reported by the UE to the base station. If the UE reports partialAndNonCoherent as UE capability, the UE does not expect that the value of codebookSubset, which is higher layer signaling, is configured to be fullyAndPartialAndNonCoherent. In addition, if the UE reports nonCoherent as UE capability, the UE does not expect that the value of codebookSubset, which is higher layer signaling, is configured to be fullyAndPartialAndNonCoherent or partialAndNonCoherent. When nrofSRS-Ports in SRS-ResourceSet, which is higher layer signaling, indicates two SRS antenna ports, the UE does not expect that the value of codebookSubset, which is higher layer signaling, is configured to be partialAndNonCoherent.

The UE may be configured with one SRS resource set in which the value of usage in the SRS-ResourceSet, which is higher layer signaling, is configured to be codebook, and one SRS resource in the corresponding SRS resource set may be indicated through SRI. If multiple SRS resources are configured in the SRS resource set in which the usage value in the SRS-ResourceSet, which is higher layer signaling, is configured to be codebook, the UE expects that the values of nrofSRS-Ports in the SRS-Resource, which is higher layer signaling, are configured to be the same value with respect to all SRS resources.

The UE transmits, to the base station, one or multiple SRS resources included in the SRS resource set in which the value of usage is configured to be codebook according to higher layer signaling, and the base station indicates the UE to perform PUSCH transmission by selecting one of the SRS resources transmitted by the UE and using transmission beam information of the corresponding SRS resource. Here, in the codebook-based PUSCH transmission, the SRI is used as information for selection of the index of one SRS resource and is included in the DCI. Additionally, the base station includes, in the DCI, information indicating a rank and a TPMI to be used by the UE for PUSCH transmission. The UE performs PUSCH transmission by using the SRS resource indicated by the SRI and applying a rank indicated based on the transmission beam of the SRS resource and a precoder indicated by the TPMI.

Next, non-codebook-based PUSCH transmission will be described. Non-codebook-based PUSCH transmission may be dynamically scheduled through DCI format 0_0 or 0_1, and may be semi-statically operated by a configured grant. When at least one SRS resource is configured in the SRS resource set in which the value of usage in the SRS-ResourceSet, which is higher layer signaling, is configured to be nonCodebook, the UE may be scheduled with non-codebook-based PUSCH transmission through DCI format 0_1.

For the SRS resource set in which the value of usage in the SRS-ResourceSet, which is higher layer signaling, is configured to be nonCodebook, the UE may be configured with one connected non-zero power CSI-RS (NZP CSI-RS) resource. The UE may perform calculation of the precoder for SRS transmission by measuring the NZP CSI-RS resource connected to the SRS resource set. If the difference between the last received symbol of the aperiodic NZP CSI-RS resource connected to the SRS resource set and the first symbol of aperiodic SRS transmission in the UE is less than 42 symbols, the UE does not expect information on the precoder for SRS transmission to be updated.

When the value of resourceType in the SRS-ResourceSet, which is higher layer signaling, is configured to be aperiodic, the connected NZP CSI-RS is indicated by SRS request, which is a field in DCI format 0_1 or 1_1. Here, if the connected NZP CSI-RS resource is an aperiodic NZP CSI-RS resource, the connected NZP CSI-RS exists when the value of the SRS request field in DCI format 0_1 or 1_1 is not "00". In this case, the DCI should not indicate cross carrier or cross BWP scheduling. In addition, if the value of the SRS request indicates the existence of the NZP CSI-RS, the corresponding NZP CSI-RS is located in a slot in which a PDCCH including the SRS request field is transmitted. Here, TCI states configured via the scheduled subcarrier are not configured to be QCL-TypeD.

If a periodic or semi-persistent SRS resource set is configured, the connected NZP CSI-RS may be indicated through associated CSI-RS in the SRS-ResourceSet, which is higher layer signaling. For non-codebook-based transmission, the UE does not expect that spatialRelationInfo, which is higher layer signaling for SRS resource, and associated CSI-RS in SRS-ResourceSet, which is higher layer signaling, are configured together.

When the UE is configured with multiple SRS resources, the UE may determine a precoder to be applied to PUSCH transmission and a transmission rank, based on the SRI indicated by the base station. Here, the SRI may be indicated through a field SRS resource indicator in DCI or may be configured through srs-ResourceIndicator, which is higher layer signaling. As in the above-described codebook-based PUSCH transmission, when the UE is provided with an SRI through DCI, an SRS resource indicated by the SRI denotes an SRS resource corresponding to the SRI among SRS resources transmitted before the PDCCH including the SRI. The UE may use one or multiple SRS resources for SRS transmission, and the maximum number of SRS resources that can be simultaneously transmitted in the same symbol in one SRS resource set are determined by UE capability reported by the UE to the base station. Here, the SRS resources simultaneously transmitted by the UE occupy the same RB. The UE configures one SRS port for each SRS resource. Only one SRS resource set in which the value of usage in the SRS-ResourceSet, which is higher layer signaling, is configured to be nonCodebook can be configured, and up to four SRS resources for non-codebook-based PUSCH transmission can be configured.

The base station transmits one NZP-CSI-RS connected to the SRS resource set to the UE, and the UE performs calculation of a precoder to be used for transmission of one or multiple SRS resources in the corresponding SRS resource set based on a result of measurement at the time of reception of the NZP-CSI-RS. The UE applies, to the base station, the calculated precoder when transmitting one or multiple SRS resources in the SRS resource set in which usage is configured to be nonCodebook, and the base station selects one or multiple SRS resources among the received one or multiple SRS resources. In this case, in non-codebook-based PUSCH transmission, the SRI indicates an index capable of expressing one or a combination of multiple SRS resources, and the SRI is included in the DCI. Here, the number of SRS resources indicated by the SRI transmitted by the base station may be the number of transmission layers of the PUSCH, and the UE performs PUSCH transmission by applying a precoder applied for SRS resource transmission to each layer.

PUSCH: Preparation Procedure Time

Next, a PUSCH preparation procedure time will be described. When the base station is configured to schedule transmission of a PUSCH using DCI format 0_0, 0_1, or 0_2 to the UE, the UE may require a PUSCH preparation procedure time for transmission of a PUSCH by applying transmission methods indicated through DCI (transmission precoding method of SRS resource, number of transmission layers, or spatial domain transmission filter). In NR, the PUSCH preparation procedure time is provided in consideration of the above methods. The PUSCH preparation procedure time of UE may follow Equation (4), below.

$$T_{proc,2} = \max((N_2 + d_{2,1} + d_2)(2048 + 144)\kappa 2^{-\mu} T_c + T_{ext} + T_{switch}, d_{2,2}) \quad (4)$$

Each variable in $T_{proc,2}$ described above in Equation (4) may have the following meaning.

$N_2$: the number of symbols determined according to $\mu$ and UE processing capability 1 or 2 according to the UE capability. When UE processing capability 1 is reported according to the capability report of the UE, N2 may have the value of Table 39. Further, when UE processing capability 2 is reported and it is configured that UE processing capability 2 can be used via higher layer signaling, N2 may have the value provided in Table 40.

TABLE 39

| $\mu$ | PUSCH preparation time $N_2$ [symbols] |
|---|---|
| 0 | 10 |
| 1 | 12 |
| 2 | 23 |
| 3 | 36 |

TABLE 40

| $\mu$ | PUSCH preparation time $N_2$ [symbols] |
|---|---|
| 0 | 5 |
| 1 | 5.5 |
| 2 | 11 for frequency range 1 |

$d_{2,1}$: the number of symbols configured to be 0 when all resource elements of the first OFDM symbol of PUSCH transmission are configured to include only DM-RS, and otherwise, the number of symbols configured to be 1.

κ: 64

μ: follows $\mu_{DL}$ or $\mu_{UL}$, which makes $T_{proc,2}$ larger. $\mu_{DL}$ denotes a downlink numeral through which a PDCCH including a DCI for scheduling a PUSCH is transmitted, and $\mu_{UL}$ denotes an uplink numeral through which a PUSCH is transmitted.

$T_c$: has $1/(\Delta f_{max} \cdot N_f)$, $\Delta f_{max}=480 \cdot 10^3$ Hz, $N_f=4096$ $d_{2,2}$: follows BWP switching time when DCI for scheduling PUSCH indicates BWP switching, and otherwise $d_{2,2}$ has the value of 0.

$d_2$: when OFDM symbols of a PUCCH, a PUSCH having a high priority index, and a PUCCH having a low priority index overlap in time, the $d_2$ value of the PUSCH having a high priority index is used. Otherwise, $d_2$ has the value of 0.

$T_{ext}$: when a UE uses a shared spectrum channel access method, the UE may calculate $T_{ext}$ and apply the calculated text to PUSCH preparation procedure time. Otherwise, $T_{ext}$ is assumed to be 0.

$T_{switch}$: when the uplink switching interval is triggered, $T_{switch}$ is assumed to be the switching interval time. Otherwise, $T_{switch}$ is assumed to be 0.

The base station and the UE may determine that the PUSCH preparation procedure time is not sufficient, when considering time-domain resource mapping information of the PUSCH scheduled through DCI and timing advance effect between uplink and downlink, in case that the first symbol of the PUSCH starts earlier than the first uplink symbol where the CP starts after $T_{proc,2}$ from the last symbol of the PDCCH including the DCI for scheduling the PUSCH. If not, the base station and the UE determine that the PUSCH preparation procedure time is sufficient. The UE may transmit the PUSCH only if the PUSCH preparation procedure time is sufficient, and may ignore the DCI for scheduling the PUSCH when the PUSCH preparation procedure time is not sufficient.

PUSCH: Repetitive Transmission Related

Hereinafter, repetitive transmission of an uplink data channel in a 5G system will be described in detail. In the 5G system, two types of repetitive transmission methods of the uplink data channel are supported: PUSCH repetitive transmission type A and PUSCH repetitive transmission type B. The UE may be configured with one of PUSCH repetitive transmission types A and B via higher layer signaling.

PUSCH Repetitive Transmission Type A

As described above, the position of the start symbol and the symbol length of the uplink data channel are determined in one slot by a time-domain resource allocation method, and a base station may provide notification of a number of repetitive transmissions to a UE via higher layer signaling (e.g., RRC signaling) or L1 signaling (e.g., DCI).

The UE may perform repetitive transmission of an uplink data channel, having the same start symbol and symbol length as that of the configured uplink data channel based on the number of repetitive transmissions received from the base station, in consecutive slots. Here, if a slot configured for downlink by the base station to the UE or at least one symbol among symbols of an uplink data channel configured for the UE are configured for downlink, the UE omits uplink data channel transmission but counts the number of repetitive transmissions of the uplink data channel.

PUSCH Repetitive Transmission Type B

As described above, the start symbol and length of the uplink data channel are determined in one slot by the time-domain resource allocation method, and the base station may provide notification of the number of repetitive transmissions to the UE via higher layer signaling (e.g., RRC signaling) or L1 signaling (e.g., DCI).

Based on the first configured start symbol and length of the uplink data channel, nominal repetition of the uplink data channel is determined as follows. A slot in which the nth nominal repetition begins is given by $$K_s + \left\lfloor \frac{S + n \cdot L}{N_{symb}^{slot}} \right\rfloor,$$

and a start symbol in the slot is given by $\mathrm{mod}(S+n \cdot L, N_{symb}^{slot})$. A slot in which the nth nominal repetition ends is given by $$K_s + \left\lfloor \frac{S + (n+1) \cdot L - 1}{N_{symb}^{slot}} \right\rfloor,$$

and an end symbol in the slot is given by $\mathrm{mod}(S+(n+1) \cdot L-1, N_{symb}^{slot})$. Here, n=0, ..., number of repetitions−1, S is the start symbol of the configured uplink data channel, and L represents the symbol length of the configured uplink data channel. $K_s$ denotes a slot in which PUSCH transmission starts, and $N_{symb}^{slot}$ denotes the number of symbols for one slot.

The UE determines an invalid symbol for PUSCH repetitive transmission type B. A symbol configured for downlink by tdd-UL-DL-ConfigurationCommon or tdd-UL-DL-ConfigurationDedicated is determined as an invalid symbol for PUSCH repetitive transmission type B. Additionally, an invalid symbol may be configured using a higher layer parameter (e.g., InvalidSymbolPattern). A higher layer parameter (e.g., InvalidSymbolPattern) provides a symbol-level bitmap spanning one or two slots so that invalid symbols can be configured. In the bitmap, "1" represents an invalid symbol. Additionally, the period and pattern of the bitmap may be configured using a higher layer parameter (e.g., periodicityAndPattern). If a higher layer parameter (e.g., InvalidSymbolPattern) is configured and InvalidSymbolPatternIndicator-ForDCIFormat0_1 or InvalidSymbolPatternIndicator-ForDCIFormat0_2 parameter indicates 1, the UE applies an invalid symbol pattern, and if the parameter indicates 0, the UE does not apply the invalid symbol pattern. If a higher layer parameter (e.g., InvalidSymbolPattern) is configured and the InvalidSymbolPatternIndicator-ForDCIFormat0_1 or InvalidSymbolPatternIndicator-ForDCIFormat0_2 parameter is not configured, the UE applies an invalid symbol pattern.

After the invalid symbol is determined, the UE may consider, for each nominal repetition, symbols other than the invalid symbol as valid symbols. If one or more valid symbols are included in each nominal repetition, the nominal repetition may include one or more actual repetitions. Here, each actual repetition includes a consecutive set of valid symbols that can be used for PUSCH repetitive transmission type B in one slot.

Figure 17:
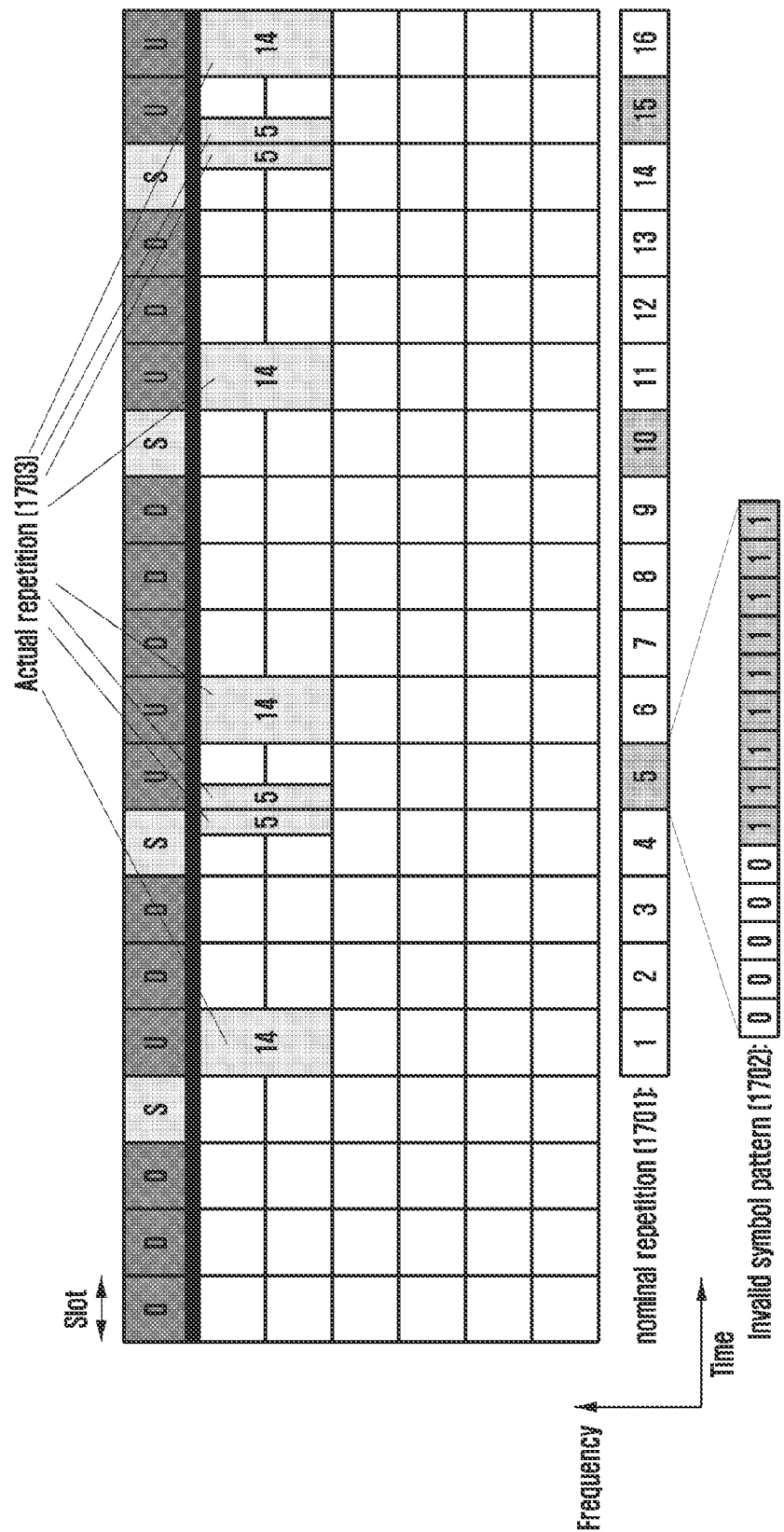
FIG. 17 illustrates an example of PUSCH repetitive transmission type B in a wireless communication system according to an embodiment.

FIG. 17 illustrates an example of PUSCH repetitive transmission type B in a wireless communication system according to an embodiment.

The UE may be configured with the uplink data channel having a start symbol S of 0, the uplink data channel length L of 14, and the number of repetitive transmissions being configured as 16. In this case, nominal repetition is indicated in 16 consecutive slots (1701). Thereafter, the UE may determine a symbol, which is configured as a downlink symbol in each nominal repetition 1701, as an invalid symbol. In addition, the UE determines symbols, which are configured to be "1" in an invalid symbol pattern 1702, as invalid symbols. In each nominal repetition, when valid symbols, which are not invalid symbols, are configured by one or more consecutive symbols in one slot, the valid symbols are configured as actual repetition and transmitted (1703).

In addition, with regard to PUSCH repetitive transmission, in NR Release 16, the following additional methods are provided for configured grant-based PUSCH transmission and UL grant-based PUSCH transmission beyond the slot boundary.

Method 1 (mini-slot level repetition): Two or more PUSCH repetitive transmissions are scheduled, through one UL grant, within one slot or beyond the boundary of consecutive slots. In addition, with regard to method 1, time-domain resource allocation information in DCI indicates a resource of the first repetitive transmission. In addition, according to time domain resource information of the first repetitive transmission and the uplink or downlink direction determined for each symbol of each slot, time domain resource information of the remaining repetitive transmissions may be determined. Each repetitive transmission occupies consecutive symbols.

Method 2 (multi-segment transmission): Two or more PUSCH repetitive transmissions are scheduled in consecutive slots through one UL grant. In this case, one transmission is designated for each slot, and different starting points or different repetition lengths may be configured for each of transmissions. In addition, in method 2, the time-domain resource allocation information in DCI indicates the start points and repetition lengths of all repetitive transmissions. In addition, in a case of performing repetitive transmission in a single slot by using method 2, if multiple bundles of consecutive uplink symbols exist in the corresponding slot, each repetitive transmission is performed for each bundle of uplink symbols. If a bundle of consecutive uplink symbols only exists in the corresponding slot, one PUSCH repetitive transmission is performed according to the method of NR Release 15.

Method 3: Two or more PUSCH repetitive transmissions are scheduled in consecutive slots through two or more UL grants. Here, one transmission is designated for each slot, and the n-th UL grant may be received before the PUSCH transmission scheduled with the (n−1)th UL grant ends.

Method 4: One or multiple PUSCH repetitive transmissions in a single slot, or two or more PUSCH repetitive transmissions spanning the boundary of consecutive slots may be supported through one UL grant or one configured grant. The number of repetitions indicated by the base station to the UE is only a nominal value, and the number of PUSCH repetitive transmissions actually performed by the UE may be greater than the nominal number of repetitions. The time-domain resource allocation information in DCI or in a configured grant denotes a resource of the first repetitive transmission indicated by the base station. Time domain resource information of the remaining repetitive transmissions may be determined by referring to at least resource information of the first repetitive transmission and the uplink or downlink direction of the symbols. If the time domain resource information of the repetitive transmission indicated by the base station spans the slot boundary or includes an uplink/downlink switching point, the repetitive transmission may be divided into multiple repetitive transmissions. In this case, one repetitive transmission may be included for each uplink period in one slot.

PUSCH: Frequency Hopping Procedure

Hereinafter, frequency hopping of an uplink data channel (PUSCH) in a 5G system will be described in detail.

In 5G, as a frequency hopping method of an uplink data channel, two methods are supported for each PUSCH repetition transmission type. First, PUSCH repetitive transmission type A supports intra-slot frequency hopping and inter-slot frequency hopping, and PUSCH repetitive transmission type B supports inter-repetition frequency hopping and inter-slot frequency hopping.

The intra-slot frequency hopping method supported by PUSCH repetitive transmission type A is a method in which the UE changes the allocated resources of the frequency domain by a configured frequency offset in two hops within one slot and transmits the same. In intra-slot frequency hopping, the start RB of each hop may be expressed by Equation (5).

$$RB_{start} = \begin{cases} RB_{start} & i = 0 \\ (RB_{start} + RB_{offset}) \bmod N_{BWP}^{size} & i = 1 \end{cases} \quad (5)$$

In Equation (5), i=0 and i=1 indicate the first hop and the second hop, respectively, and $RB_{start}$ denotes the start RB in the UL BWP and is calculated based on the frequency resource allocation method. $RB_{offset}$ indicates the frequency offset between the two hops through the higher layer parameter. The number of symbols of the first hop may be represented by $\lfloor N_{symb}^{PUSCH,s}/2 \rfloor$, and the number of symbols of the second hop may be represented by $N_{symb}^{PUSCH,s} - \lfloor N_{symb}^{PUSCH,s}/2 \rfloor$. $N_{symb}^{PUSCH,s}$ is the length of PUSCH transmission in one slot, and is represented by the number of OFDM symbols.

Next, the inter-slot frequency hopping method supported by the PUSCH repetitive transmission types A and B is a method in which the UE changes the allocated resources of the frequency domain for each slot by a configured frequency offset and transmits the same. In inter-slot frequency hopping, a start RB during $n_s^\mu$ slot may be expressed by Equation (6).

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad (6)$$

In Equation (6), $n_s^\mu$ is a current slot number in multi-slot PUSCH transmission, $RB_{start}$ indicates a start RB in the UL BWP, and is calculated based on a frequency resource allocation method. $RB_{offset}$ denotes a frequency offset between two hops via a higher layer parameter.

Next, the inter-repetition frequency hopping method supported by the PUSCH repetitive transmission type B is to perform transmission by moving a resource, which is allocated in the frequency domain for one or multiple actual repetitions within each nominal repetition, by a configured frequency offset. $RB_{start}(n)$, which is the index of the start RB in the frequency domain for one or multiple actual repetitions within the n-th nominal repetition, may be provided by Equation (7), below.

$$\begin{cases} RB_{start} & n\bmod 2 = 0 \\ (RB_{start} + RB_{offset})\bmod N_{BWP}^{size} & n\bmod 2 = 1 \end{cases} \quad (7)$$

In Equation (7), n denotes an index of nominal repetition, and $RB_{offset}$ denotes an RB offset between two hops via a higher layer parameter.

UE Capability Report Related

In LTE and NR, the UE may perform a procedure of reporting the UE-supported capability to the corresponding base station while being connected to a serving base station. In the description below, this is referred to as a UE capability report.

The base station may transmit a UE capability enquiry message requesting capability report from the UE which is in a connected state. The message may include a UE capability request for each radio access technology (RAT) type of the base station. The request for each RAT type may include supported frequency band information and the like. Further, the UE capability enquiry message may make a request for UE capability for each of multiple RAT types through one RRC message container transmitted by the base station, or the base station may transmit multiple UE capability enquiry messages including a UE capability request for each RAT type to the UE. That is, the UE capability enquiry may be repeated multiple times, and the UE may configure a UE capability information message corresponding to the repeated UE capability enquiry and make multiple reports of the UE capability information message. In the next generation telecommunication system, a UE capability request for multi-RAT dual connectivity (MR-DC) including NR, LTE, and E-UTRA-NR dual connectivity (EN-DC) may be made. Further, in general, the UE capability enquiry message is transmitted initially after the UE establishes a connection with the base station. However, the UE capability enquiry message may be requested under any condition if the base station needs.

In the above operation, the UE, which has received a request for a UE capability report from the base station, configures UE capability according to frequency band information and a RAT type, which are requested by the base station. A method for configuring a UE capability by a UE in the NR system may be summarized as follows:

1. If the UE receives lists of LTE, and/or NR frequency bands according to a UE capability request from a base station, the UE configures a band combination (BC) of EN-DC and NR stand-alone (SA). That is, the UE configures a candidate BC list for EN-DC and NR SA, based on frequency bands requested, through FreqBandList, from the base station. Further, the bands are prioritized in the order described in the FreqBandList.

2. If the base station requests the UE capability report by setting the eutra-nr-only flag or the eutra flag, the UE removes matters relating to NR SA BCs among the configured BC candidate list. This operation may occur only if the LTE base station (eNB) requests eutra capability.

3. Thereafter, the UE removes fallback BCs from the candidate BC list configured in the above operation. Here, the fallback BCs refer to BCs obtainable by removing a band corresponding to at least one SCell band from a random BC, and may be omitted because a BC before removing a band corresponding to at least one SCell may already cover the fallback BC. This operation is further applied to MR-DC, i.e., LTE bands. The BCs remaining after performing this operation are included in the final candidate BC list.

4. The UE selects BCs to be reported by selecting BCs suitable for the requested RAT type from the final candidate BC list. In this operation, the UE configures the supportedBandCombinationList in a predetermined order. That is, the UE configures BCs and a UE capability to be reported according to a predetermined order of RAT type (nr→eutra-nr→eutra). Further, the UE configures featureSetCombination for the configured supportedBandCombinationList and configures a list of candidate feature set combinations from a candidate BC list from which a list of fallback BCs (including the same or lower level capabilities) has been removed. The above candidate feature set combinations include all of feature set combinations for NR and EUTRA-NA BC, and may be obtained from feature set combinations of containers of UE-NR-Capabilities and UE-MRDC-Capabilities.

5. Further, if the requested RAT type is EUTRA-NR and makes some influence, featureSetCombinations is included in both containers of the UE-MRDC-Capabilities and UE-NR-Capabilities. However, the feature set of NR includes only UE-NR-Capabilities.

The UE capability is configured and then the UE transmits a UE capability information message including the UE capability to the base station. Thereafter, the base station performs suitable scheduling and transmission/reception management for the corresponding UE, based on the UE capability received from the UE.

CA/DC Related

Figure 18:
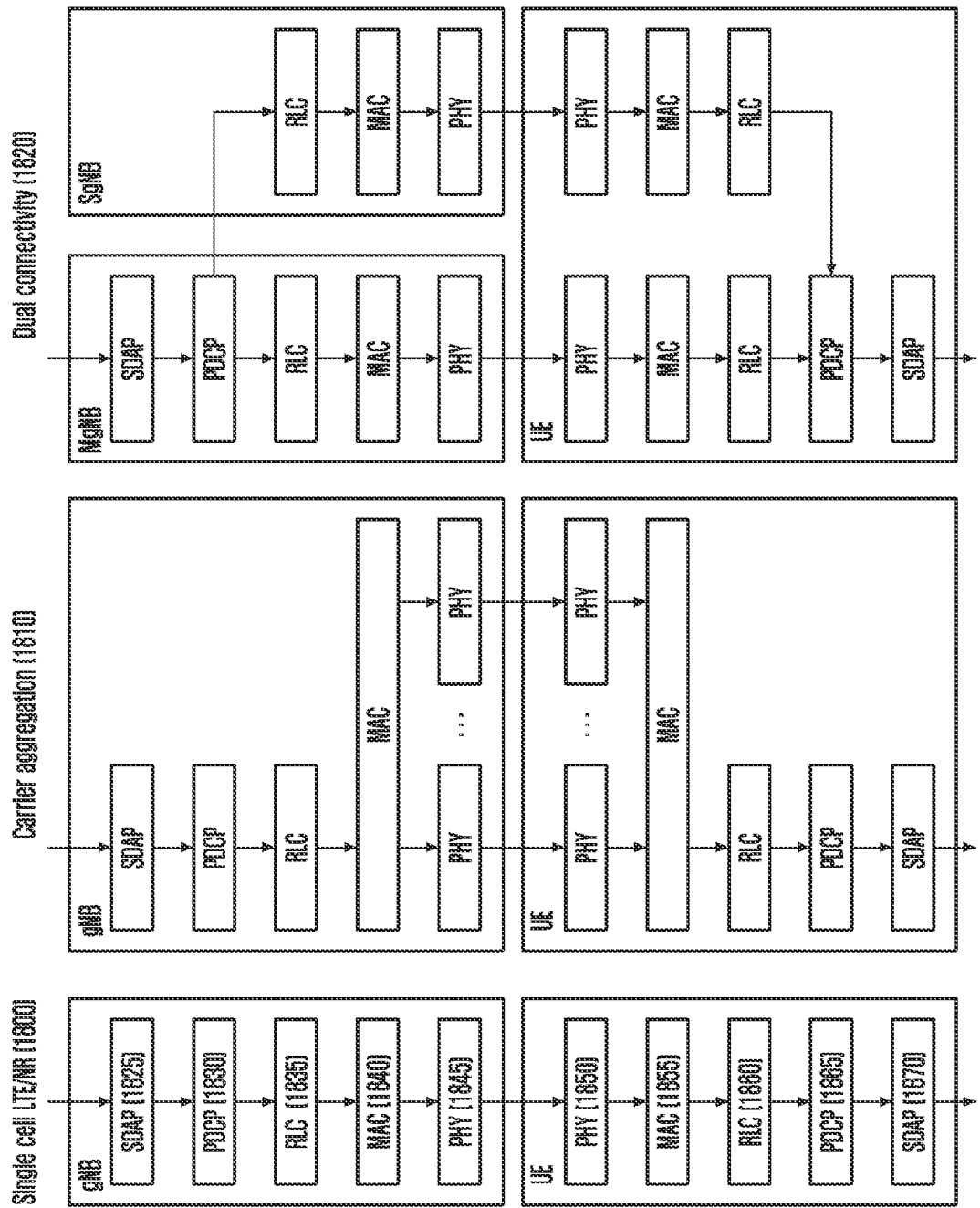
FIG. 18 illustrates a radio protocol structure of a base station and a UE in a single cell, carrier aggregation, and dual connectivity situation in a wireless communication system according to an embodiment.

FIG. 18 illustrates a radio protocol structure of a base station and a UE in a single cell, carrier aggregation, and dual connectivity situation in a wireless communication system according to an embodiment.

Referring to FIG. 18, the radio protocol of the next generation mobile communication system includes, for each of a UE and an NR base station, NR service data adaptation protocols (NR SDAPs) 1825 and 1870, NR packet data convergence protocols (NR PDCPs) 1830 and 1865, and NR radio link controls (NR RLCs) 1835 and 1860, and NR medium access control (NR MACs) 1840 and 1855.

The functions of the NR SPAPs 1825 and 1870 may include one or more of the following functions:

Transfer of user plane data.

Mapping between a quality of service (QoS) flow and a data bearer (DRB) for both DL and UL.

Marking QoS flow ID in both DL and UL packets.

Reflective QoS flow to DRB mapping for the UL SDAP PDUs.

With respect to the SDAP layer device, a UE may receive, through an RRC message, a configuration associated with whether to use a header of the SDAP layer device or whether to use a function of the SDAP layer device, according to each PDCP layer device, each bearer, and each logical channel. If the SDAP header is configured, the UE is instructed by a one-bit NAS reflective QoS indicator (NAS reflective QoS) and a one-bit AS reflective QoS indicator (AS reflective QoS) of the SDAP header to update or reconfigure mapping information between a data bearer and a QoS flow of uplink and downlink. The SDAP header may include QoS flow ID information indicating QoS. The QoS information may be used as a data processing priority for supporting smooth services, scheduling information, or the like.

The functions of the NR PDCPs 1830 and 1865 may include one or more of the following functions:
- Header compression and decompression: robust header compression (ROHC) only.
- Transfer of user data.
- In-sequence delivery of higher layer PDUs.
- Out-of-sequence delivery of higher layer PDUs.
- PDCP PDU reordering for reception.
- Duplicate detection of lower layer service data units (SDUs).
- Retransmission of PDCP SDUs.
- Ciphering and deciphering.
- Timer-based SDU discard in uplink.

In the above, a reordering function of the NR PDCP device refers to a function of sequentially reordering PDCP PDUs, received from a lower layer, based on a PDCP sequence number (SN), and may include a function of transmitting data to a higher layer in the sequence of reordering. Alternatively, the reordering function of the NR PDCP device may include a function of transmitting data without considering the sequence, a function of reordering the sequence and recording missing PDCP PDUs, a function of providing a state report on the missing PDCP PDUs to a transmission side, and a function of requesting retransmission for the missing PDCP PDUs.

The functions of the NR RLCs 1835 and 1860 may include one or more of the following functions:
- Transfer of higher layer PDUs.
- In-sequence delivery of higher layer PDUs.
- Out-of-sequence delivery of higher layer PDUs.
- Error Correction through ARQ.
- Concatenation, segmentation and reassembly of RLC SDUs.
- Re-segmentation of RLC data PDUs.
- Reordering of RLC data PDUs.
- Duplicate detection.
- Protocol error detection.
- RLC SDU discard.
- RLC re-establishment.

The in-sequence delivery function of the NR RLC device refers to a function of transmitting RLC SDUs, received from a lower layer, to a higher layer in the sequence of reception. The in-sequence delivery function of the NR RLC device may include: if one RLC SDU is originally segmented into multiple RLC SDUs and received, a function of reassembling and transmitting the multiple RLC SDUs; a function of reordering the received RLC PDUs based on an RLC SN or PDCP SN; a function of reordering the sequence and recording missing RLC PDUs; a function of providing a state report on the missing RLC PDUs to a transmission side; and a function of requesting retransmission for the missing RLC PDUs. If the missing RLC SDU occurs, the in-sequence delivery function of the NR RLC device may include a function of sequentially transmitting only the RLC SDUs prior to the missing RLC SDU to a higher layer or sequentially transmitting all the RLC SDUs received before a timer starts to a higher layer if a predetermined timer expires although there is a missing RLC SDU. Alternatively, the in-sequence delivery function of the NR RLC device may include a function of sequentially transmitting all RLC SDUs received so far to a higher layer if a predetermined timer expires although there is a missing RLC SDU. In addition, the RLC PDUs may be processed in the sequence that the RLC PDUS are received (in the sequence of arrival regardless of the sequence of serial number and sequence number), and may be transmitted to a PDCP device out of sequence delivery. In a case of segments, the in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be replaced by a multiplexing function of the NR MAC layer.

In the above, the out-of-sequence delivery function of the NR RLC device refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 1840 and 1855 may be connected to multiple NR RLC layer devices configured in one UE, and functions of the NR MAC may include one or more of the following functions:
- Mapping between logical channels and transport channels.
- Multiplexing/de-multiplexing of MAC SDUs.
- Scheduling information reporting.
- Error correction through HARQ.
- Priority handling between logical channels of one UE.
- Priority handling between UEs by means of dynamic scheduling.
- multimedia broadcast service (MBMS) identification.
- Transport format selection.
- Padding.

The NR PHY layers 1845 and 1850 may perform an operation of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer.

The detailed structure of the radio protocol structure may be variously changed according to a carrier (or cell) management method. For example, when the base station performs single carrier (or cell)-based data transmission to the UE, the base station and the UE use a protocol structure, which has a single structure for each layer, such as 1800. On the other hand, when the base station transmits data to the UE based on carrier aggregation (CA) using multiple carriers in a single TRP, the base station and the UE has a single structure up to RLC but uses a protocol structure of multiplexing a PHY layer through a MAC layer, such as 1810. As another example, when the base station transmits data to the UE based on dual connectivity (DC) using multiple carriers in multiple TRP, the base station and the UE have a single structure up to RLC, but use a protocol structure of multiplexing a PHY layer through a MAC layer, such as 1820.

Referring to the descriptions related to PDCCH and beam configuration described above, since PDCCH repetitive transmission is not currently supported in Rel-15 and Rel-16 NRs, it is difficult to achieve the required reliability in scenarios requiring high reliability, such as URLLC. The disclosure proposes a method for improving PDCCH reception reliability of a UE by providing a PDCCH repetitive transmission method through multiple transmission points (TRP). Specific methods are described in detail in the following embodiments.

The contents of the disclosure are applicable to FDD and TDD systems. Hereinafter, in the disclosure, higher signaling (or higher layer signaling) is a signal transmission method in which data is transmitted from a base station to a UE using a downlink data channel of a physical layer or transmitted from a UE to a base station using an uplink data channel of a physical layer, and may be referred to as RRC signaling, PDCP signaling, or medium access control (MAC) control element (CE) (MAC CE).

In determining whether to apply coordinated communication, a UE may use various methods such as a method in which PDCCH(s) for allocating PDSCH to which coordinated communication is applied has a specific format, a method in which the PDCCH(s) for allocating PDSCH to which coordinated communication is applied includes a specific indicator for informing whether coordinated communication is applied, a method in which the PDCCH(s) for allocating PDSCH to which coordinated communication is applied is scrambled by a specific RNTI, or a method in which it is assumed that coordinated communication is applied in a specific section indicated by a higher layer. Hereinafter, for convenience of description, a case in which a UE receives a PDSCH to which coordinated communication is applied based on conditions similar to the above will be referred to as an NC-JT case.

Determining a priority between A and B refers to selecting one having a higher priority according to a predetermined priority rile to perform an operation corresponding thereto or omitting (or dropping) an operation for the other one having a lower priority.

Examples are described through a plurality of embodiments, but the examples are not independent and one or more embodiments can be applied at the same time or in combination.

NC-JT Related

According to an embodiment, non-coherent joint transmission (NC-JT) may be used for a UE to receive a PDSCH from multiple TRPs.

Unlike the conventional communication system, 5G wireless communication system may support not only a service requiring a high transmission rate, but also a service having a very short transmission delay and a service requiring a high connection density. In a wireless communication network including multiple cells, transmission and reception points (TRPs), or beams, coordinated transmission between respective cells, TRPs, and/or beams may satisfy various service requirements by increasing the strength of a signal received by the UE or efficiently performing interference control between respective cells, TRPs, and/or beams.

Joint transmission (JT) is a representative transmission technology for the above-described coordinated communication, and which performs signal transmission to one UE through multiple different cells, TRPs, and/or beams to increase the throughput or the strength of a signal received by the UE. Here, channels between the respective cells, TRPs, and/or beams and the UE may have significantly different characteristics. In particular, NC-JT supporting non-coherent precoding between cells, TRPs, and/or beams, individual precoding may require individual precoding, MCS, resource allocation, TCI indication, and the like according to link-specific channel characteristic between each cell, TRP, and/or beams and the UE.

The above-described NC-JT transmission may be applied to at least one channel among a downlink data channel (PDSCH), a downlink control channel (e.g., PDCCH), an uplink data channel (PUSCH), and an uplink control channel (physical uplink control channel (PUCCH)). During PDSCH transmission, transmission information such as precoding, MCS, resource allocation, and TCI is indicated by DL DCI, and in order to perform NC-JT transmission, the transmission information needs to be independently indicated for each cell, TRP, and/or beam. This is a major factor that increases payload required for DL DCI transmission, which may adversely affect the reception performance of PDCCH for transmission of DCI. Therefore, it is necessary to carefully design a tradeoff between the amount of DCI information and the control information reception performance for JT support of PDSCH.

Figure 19:
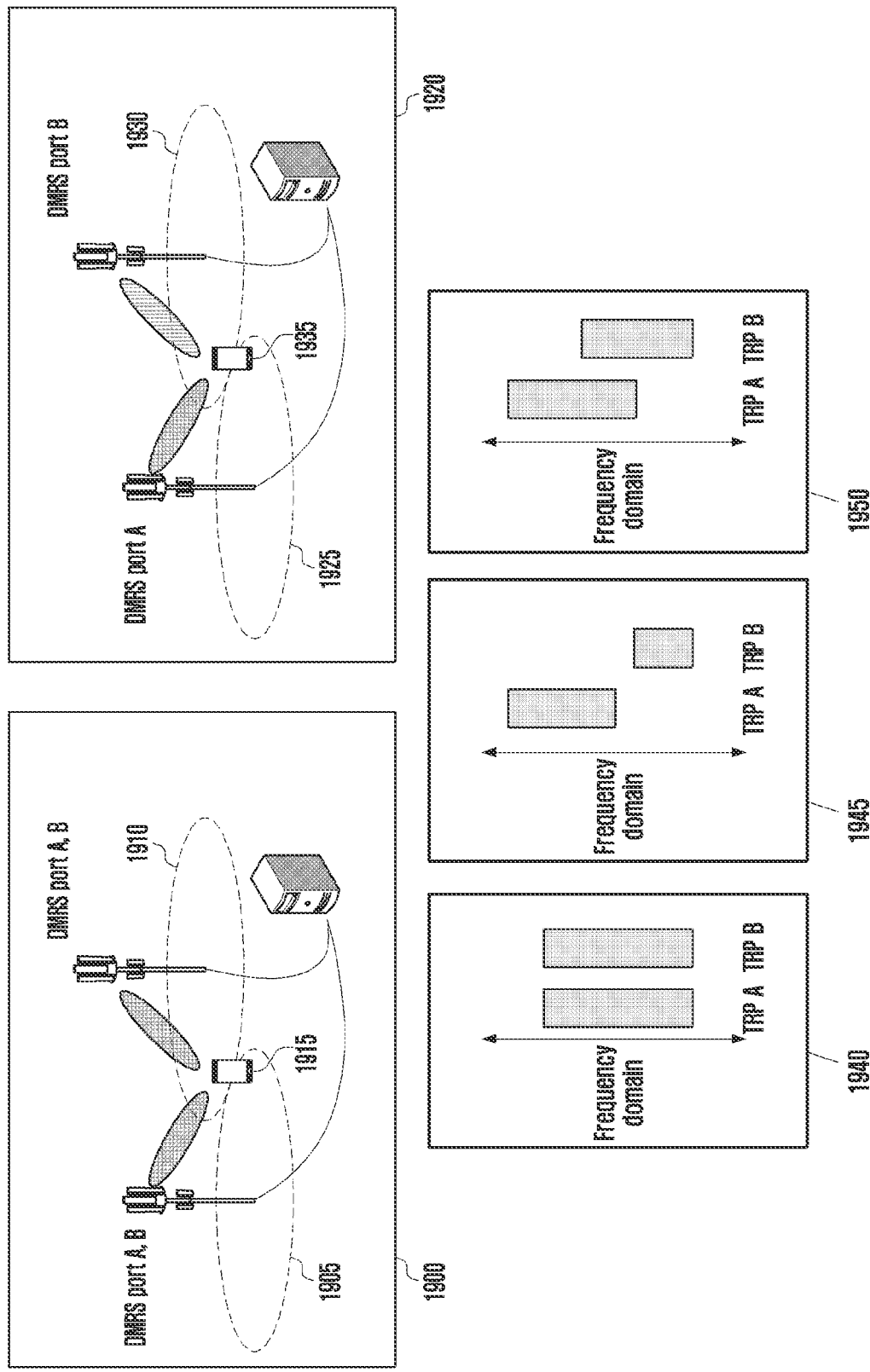
FIG. 19 illustrates an example of an antenna port configuration and resource allocation for cooperative communication in a wireless communication system according to an embodiment.

FIG. 19 illustrates an example of an antenna port configuration and resource allocation for cooperative communication in a wireless communication system according to an embodiment.

Referring to FIG. 19, an example for PDSCH transmission is illustrated according to joint transmission (JT) scheme, and examples of radio resource allocation for each TRP are illustrated.

Referring to FIG. 19, an example (1900) of coherent joint transmission (C-JT) supporting coherent precoding between cells, TRPs, and/or beams is shown.

In a case of C-JT, TRP A 1905 and TRP B 1910 may transmit single data on a PDSCH to UE 1915, and multiple TRPs may perform joint precoding. This may be understood as that the same DMRS ports are used for the same PDSCH transmission in TRP A 1905 and TRP B 1910. For example, TRP A 1905 and TRP B 1910 may transmit DMRS to the UE through DMRS port A and DMRS B, respectively. In this case, the UE may receive one DCI information for receiving one PDSCH demodulated based on the DMRS transmitted through the DMRS ports A and B.

In FIG. 19, an example (1920) of NC-JT supporting non-coherent precoding between respective cells, TRPs, and/or beams is shown.

In a case of NC-JT, a PDSCH is transmitted to UE 1935 for each cell, TRP, and/or beam, and individual precoding may be applied to each PDSCH. Each cell, TRP, and/or beam may be used for transmission of a different PDSCH or a different PDSCH layer to the UE to improve throughput compared to single cell, TRP, and/or beam transmission. In addition, each cell, TRP, and/or beam may repeatedly transmit the same PDSCH to the UE to improve reliability compared to single cell, TRP, and/or beam transmission. For convenience of explanation, a cell, a TRP, and/or a beam is hereinafter collectively referred to as a TRP.

Here, when all the frequency and time resources used for PDSCH transmission by multiple TRPs are the same (1940), when the frequency and time resources used by multiple TRPs do not overlap at all (1945), and when some of the frequency and time resources used by multiple TRPs overlap (1950), various radio resource allocations may be considered.

In order to simultaneously allocate a plurality of PDSCHs to one UE for NC-JT support, DCI of various types, structures, and relationships may be considered.

Figure 20:
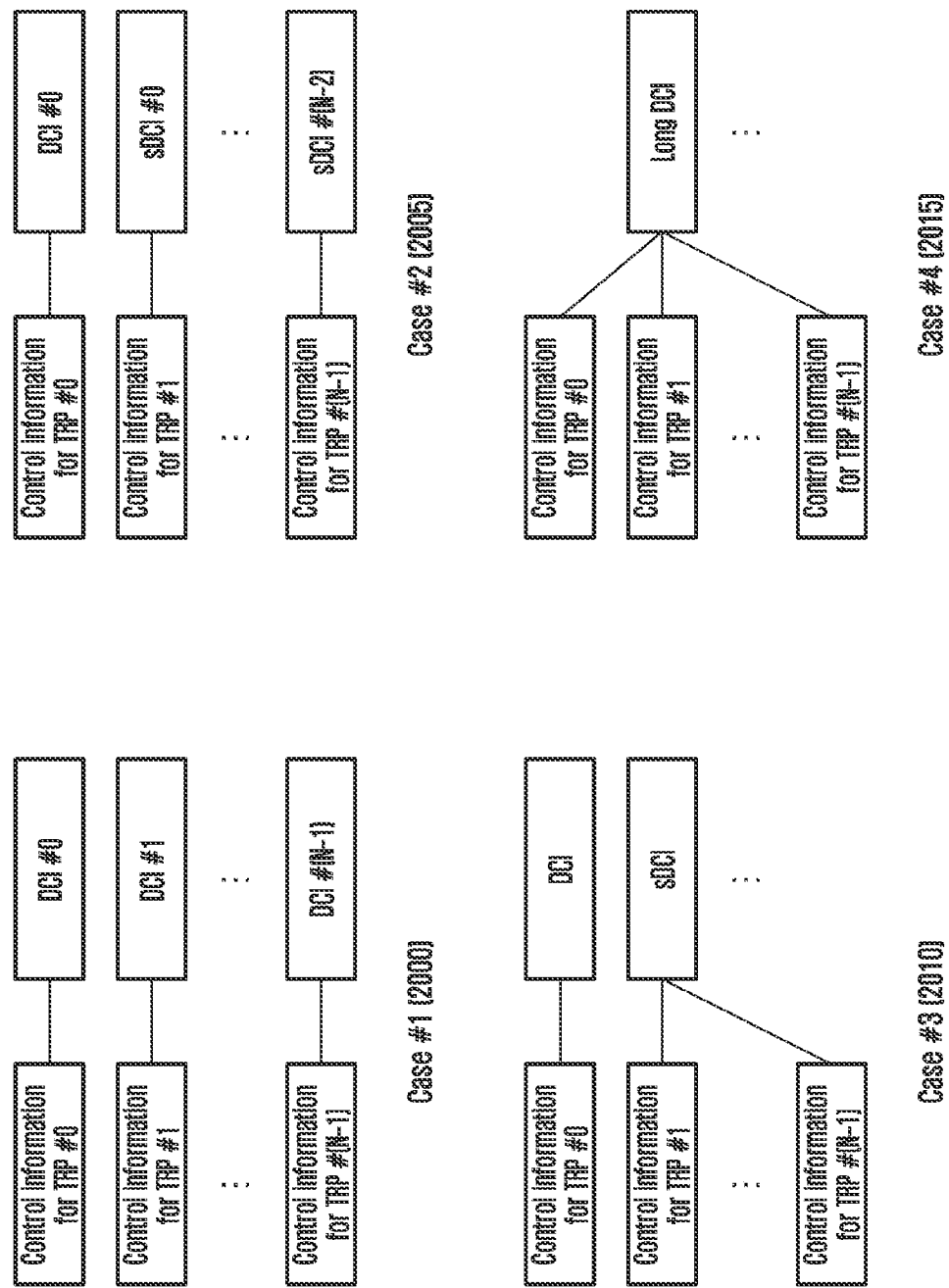
FIG. 20 illustrates an example of configuration of DCI for cooperative communication in a wireless communication system according to an embodiment.

FIG. 20 illustrates a configuration example of DCI for cooperative communication in a wireless communication system according to an embodiment.

More specifically, FIG. 20 illustrates an example of configuration of DCI for NC-JT for transmission of a different PDSCH or a different PDSCH layer to a UE by each TRP.

Referring to FIG. 20, case #1 2000 illustrates, in a situation in which different (N−1) PDSCHs are transmitted from (N−1) additional TRPs (TRP #1 to TRP #(N−1)) in addition to a serving TRP (TRP #0) used for single PDSCH transmission, an example in which control information for PDSCHs transmitted from (N−1) additional TRPs and control information for PDSCHs transmitted in the serving TRP are transmitted independently from each other. That is, the UE may acquire control information for PDSCHs transmitted from different TRPs (TRP #0 to TRP #(N−1)) through pieces of independent DCI (DCI #0 to DCI #(N−1)). The format between pieces of independent DCI may be the same or different from each other, and the payload between DCIs may also be the same or different from each other. In the above-described case #1, the degree of freedom for control or allocation of each PDSCH may be completely guaranteed, but when each piece of DCI is transmitted from a different TRP, a coverage difference for each DCI may occur, and reception performance may deteriorate.

Case #2 2005 illustrates, in a situation in which different (N−1) PDSCHs are transmitted from (N−1) additional TRPs (TRP #1 to TRP #(N−1)) in addition to a serving TRP (TRP #0) used for single PDSCH transmission, an example in which each piece of control information (i.e., DCI) for PDSCH transmitted from (N−1) additional TRPs is transmitted and each piece of DCI is dependent on control information for PDSCH transmitted from the serving TRP.

For example, in a case of DCI #0, which is control information for the PDSCH transmitted from the serving TRP (TRP #0), all information elements of DCI format 1_0, DCI format 1_1, and DCI format 1_2 are included, but shortened DCI (hereinafter, sDCI)) (sDCI #0 to sDCI #(N−2)), which is control information for PDSCHs transmitted from cooperative TRPs (TRP #1 to TRP #(N−1)) may include only some of the information elements of DCI format 1_0, DCI format 1_1, DCI format 1_2. Therefore, in a case of sDCI for transmission of control information for PDSCHs transmitted from cooperative TRPs, the payload may be small compared to normal DCI (nDCI) for transmission of control information related to PDSCH transmitted from the serving TRP and thus it is possible to include reserved bits compared to nDCI.

In case #2 described above, the degree of freedom for control or allocation of each PDSCH may be limited according to the contents of the information element included in the sDCI, or since the reception performance of sDCI is superior to that of nDCI, the probability of occurrence of a coverage difference for each DCI may be lowered.

Case #3 2010 illustrates, in a situation in which different (N−1) PDSCHs are transmitted from (N−1) additional TRPs (TRP #1 to TRP #(N−1)) other than a serving TRP (TRP #0) used when transmitting a single PDSCH, an example in which one piece of control information for PDSCHs of (N−1) additional TRPs is transmitted and this DCI is dependent on control information for PDSCHs transmitted from the serving TRP.

For example, in a case of DCI #0, which is control information for the PDSCH transmitted from the serving TRP (TRP #0), all information elements of DCI format 1_0, DCI format 1_1, and DCI format 1_2 are included, and in a case of control information for PDSCHs transmitted from cooperative TRPs (TRP #1 to TRP #(N−1)), only some of the information elements of DCI format 1_0, DCI format 1_1, and DCI format 1_2 may be included in one sDCI and transmitted. For example, the sDCI may include at least one of HARQ-related information such as frequency domain resource assignment, time domain resource assignment, and MCS of cooperative TRPs. In addition, in a case of information not included in the sDCI, such as a BWP indicator or a carrier indicator, it may follow DCI (DCI #0, normal DCI, nDCI) of the serving TRP.

In case #3 2010, the degree of freedom for control or allocation of each PDSCH may be limited according to the contents of the information element included in the sDCI. However, it is possible to adjust the reception performance of sDCI, and the complexity of DCI blind decoding of the UE may be reduced compared to case #1 2000 or case #2 2005.

Case #4 2015 illustrates, in a situation in which different (N−1) PDSCHs are transmitted from (N−1) additional TRPs (TRP #1 to TRP #(N−1)) in addition to a serving TRP (TRP #0) used for single PDSCH transmission, an example in which control information for PDSCHs transmitted from (N−1) additional TRPs is transmitted through the same DCI (long DCI (LDCI)) as control information for PDSCHs transmitted from the serving TRP. That is, the UE may obtain control information for PDSCHs transmitted from different TRPs (TRP #0 to TRP #(N−1)) through single DCI. In case #4 2015, the complexity of DCI blind decoding of the UE may not increase, but the degree of freedom of PDSCH control or allocation may be low, such that the number of cooperative TRPs is limited according to the long DCI payload limitation.

In the following descriptions and embodiments, sDCI may refer to various pieces of supplementary DCI such as shortened DCI, secondary DCI, or normal DCI (DCI format 1_0 to 1_1 described above) including PDSCH control information transmitted in the cooperative TRP. Unless special restrictions are specified, the description is similarly applicable to the various pieces of supplementary DCI.

In the following description and embodiments, case #1 N100, case #2 2005, and case #3 2010 in which at least one DCI on a PDCCH is used for NC-JT support may be classified into multiple PDCCH-based NC-JTs, and case #4 2015 in which single DCI on a PDCCH is used for NC-JT support may be classified into a single PDCCH-based NC-JT. In multiple PDCCH-based PDSCH transmission, a CORESET in which DCI of a serving TRP (TRP #0) is scheduled and a CORESET in which DCI of a cooperative TRPs (TRP #1 to TRP #(N−1)) are scheduled may be distinguished. As a method for distinguishing CORESETs, there may be a method for distinguishing through a higher layer indicator for each CORESET, a method for distinguishing through a beam configuration for each CORESET, and the like. In addition, in a single PDCCH-based NC-JT, single DCI schedules a single PDSCH having a plurality of layers instead of scheduling a plurality of PDSCHs, and the above-mentioned plurality of layers may be transmitted from a plurality of TRPs. Here, a connection relationship between a layer and a TRP for transmission of the layer may be indicated through a TCI indication for the layer.

Cooperative TRP may be replaced by various terms including a cooperative panel or a cooperative beam in practical application.

In embodiments of the disclosure, the expression that NC-JT is applied is used herein for convenience of explanation, but it may be variously interpreted to fit the context, such as the UE simultaneously receives one or more PDSCHs in one BWP, the UE simultaneously receives PDSCHs based on two or more transmission configuration indications in one BWP, a PDSCH received by the UE is associated with one or more DMRS port group, and the like.

A radio protocol architecture for NC-JT may be variously used depending on TRP development scenarios. For example, when there is no or little backhaul delay between cooperative TRPs, it is possible to use a structure based on MAC layer multiplexing similar to 1810 of FIG. 18 (CA-like method). On the other hand, when the backhaul delay between cooperative TRPs is so large that the backhaul delay cannot be ignored (e.g., when a time of 2 ms or more is required for information exchange such as CSI, scheduling, HARQ-ACK, and the like between cooperative TRPs), similar to 1820 of FIG. 18, it is possible to secure characteristics robust to delay by using an independent structure for each TRP from the RLC layer (DC-like method).

A UE supporting C-JT/NC-JT may receive a C-JT/NC-JT related parameter or setting value from a higher layer configuration, and may set an RRC parameter of the UE based on the received parameter or value. For higher layer configuration, the UE may utilize a UE capability parameter, for example, tci-StatePDSCH. Here, the UE capability parameter, for example, tci-StatePDSCH may define TCI states for the purpose of PDSCH transmission, and the number of TCI states may be configured to be 4, 8, 16, 32, 64, and 128 in FR1, may be configured to be 64 and 128 in FR2, and may be configured up to eight states, which can be indicated by 3 bits of the TCI field of DCI through a MAC CE message, among the configured numbers. The maximum value of 128 denotes a value indicated by maxNumberConfiguredTCIstatesPerCC in the tci-StatePDSCH parameter included in capability signaling of the UE. As such, a series of configuration processes from higher layer configuration to MAC CE configuration may be applied to a beamforming indication or a beamforming change command for at least one PDSCH in one TRP.

Multi-DCI Based Multi-TRP

A multi-DCI-based multi-TRP transmission method will be described. The multi-DCI-based multi-TRP transmission method may configure a downlink control channel for NC-JT transmission based on the multi-PDCCH.

In NC-JT based on multiple PDCCHs, when performing transmission of DCI for PDSCH scheduling of each TRP, there may be a CORESET or search space distinguished for each TRP. A CORSET or search space for each TRP may be configured as at least one of the following cases.

Higher layer index configuration by CORESET: The CORESET configuration information configured via a higher layer may include an index value, and a TRP for transmission of a PDCCH in the corresponding CORESET may be distinguished by the index value for each configured CORESET. That is, in the set of CORESETs having the same higher layer index value, it may be considered that the same TRP transmits a PDCCH or that a PDCCH for scheduling a PDSCH of the same TRP is transmitted. The above-described index for each CORESET may be referred to as CORESETPoolIndex, and it may be considered that the PDCCH is transmitted from the same TRP with regard to CORESETs in which the same CORESETPoolIndex value is configured. In a case of CORESET in which the CORESETPoolIndex value is not configured, it may be considered that the default value of CORESETPoolIndex has been configured, and the above-described default value may be 0.

In the disclosure, when the type of CORESETPoolIndex for each of a plurality of CORESETs included in PDCCH-Config, which is higher layer signaling, exceeds one, that is, when each CORESET has a different CORESETPoolIndex, a UE may consider that a base station may use a multi-DCI-based multi-TRP transmission method.

On the other hand, in the disclosure, if the type of CORESETPoolIndex for each of a plurality of CORESETs included in PDCCH-Config, which is higher layer signaling, is one, that is, if all CORESETs have the same CORESETPoolIndex of 0 or 1, a UE may consider that the base station perform transmission using single-TRP instead of using a multi-DCI-based multi-TRP transmission method.

Multiple PDCCH-Config configurations: Multiple PDCCH-Configs are configured in one BWP, and each PDCCH-Config may include PDCCH configuration for each TRP. That is, one PDCCH-Config may include a list of CORESETs for each TRP and/or a list of search spaces for each TRP, one or more CORESETs and one or more search spaces included in one PDCCH-Config may be considered to correspond to a specific TRP.

CORESET beam/beam group configuration: TRP corresponding to the corresponding CORESET may be distinguished through a beam or beam group configured for each CORESET. For example, when the same TCI state is configured in multiple CORESETs, the corresponding CORESETs may be considered to be transmitted through the same TRP or it may be considered that a PDCCH for scheduling a PDSCH of the same TRP is transmitted in the corresponding CORESET.

Search space beam/beam group configuration: A beam or beam group is configured for each search space, and through this, TRP for each search space may be distinguished. For example, when the same beam/beam group or TCI state is configured in multiple search spaces, it may be considered that the same TRP transmits the PDCCH in the search space, or that a PDCCH for scheduling a PDSCH of the same TRP is transmitted in the search space.

By distinguishing the CORESET or search space by TRP as described above, PDSCH and HARQ-ACK information may be classified for each TRP, and thus, an independent HARQ-ACK codebook for each TRP may be generated and independent PUCCH resources may be used.

The above configuration may be independent for each cell or for each BWP. For example, two different CORESETPoolIndex values are configured in PCell, whereas the CORESETPoolIndex value may not be configured in a specific SCell. Here, it may be considered that NC-JT transmission is configured in the PCell, whereas NC-JT transmission is not configured in SCell in which the CORESETPoolIndex value is not configured.

The PDSCH TCI state activation/deactivation MAC-CE applicable to the multi-DCI-based multi-TRP transmission method may follow FIG. 16. If the UE is not configured with CORESETPoolIndex for each of all CORESETs in the higher layer signaling PDCCH-Config, the UE may ignore a CORESET Pool ID field 16-55 in the corresponding MAC-CE 16-50. If the UE can support the multi-DCI-based multi-TRP transmission method, that is, when the UE has a different CORESETPoolIndex for each CORESET in the higher layer signaling PDCCH-Config, the UE may activate a TCI state in DCI included in a PDCCH transmitted from CORESETs, which have the same CORESETPoolIndex value as the CORESET Pool ID field 16-55 in the corresponding MAC-CE 16-50. For example, if the CORESET Pool ID field 16-55 in the corresponding MAC-CE 16-50 has the value of 0, the TCI state in the DCI included in the PDCCH transmitted from CORESETs having the CORESETPoolIndex of 0 may follow the activation information of the corresponding MAC-CE.

When the UE is configured to use the multi-DCI-based multi-TRP transmission method from the base station, that is, when the type of CORESETPoolIndex for each of a plurality of CORESETs included in PDCCH-Config, which is higher layer signaling, exceeds one, or when CORESETs have different CORESETPoolIndexes, the UE may know that the following restrictions exist for PDSCHs scheduled from PDCCHs in each of CORESETs having two different CORESETPoolIndexes.

1) When PDSCHs, which are indicated by the PDCCH in each CORESET having two different CORESETPoolIndexes, fully or partially overlap, the UE may apply the TCI states indicated by each PDCCH to different CDM groups, respectively. That is, two or more TCI states may not be applied to one CDM group.

2) When PDSCHs, which are indicated by the PDCCH in each CORESET having two different CORESETPoolIndexes, fully or partially overlap, the UE may expect that the number of actual front-loaded DMRS symbols, the number of additional DMRS symbols, the position of the actual DMRS symbols, and DMRS types of respective PDSCHs not to be different from one another.

3) The UE may expect that the same bandwidth part and the same subcarrier spacing are indicated from the PDCCH in each CORESET having two different CORESETPoolIndexes.

4) The UE may expect that information about a PDSCH scheduled from the PDCCH in each CORESET having two different CORESETPoolIndexes is completely included in each PDCCH.

Single DCI-Based Multi-TRP

According to another embodiment, a single DCI-based multi-TRP transmission method will be described. The single DCI-based multi-TRP transmission method may configure a downlink control channel for NC-JT transmission based on single PDCCH.

In single DCI-based multi-TRP transmission method, a PDSCH transmitted by multiple TRPs may be scheduled by one DCI. Here, the number of TCI states may be used as a method of indicating the number of TRPs for transmission of the corresponding PDSCH. That is, if the number of TCI states indicated in the DCI for scheduling the PDSCH is two, it may be considered as single PDCCH-based NC-JT transmission, and if the number of TCI states is one, it may be considered as single-TRP transmission. The TCI states indicated through the DCI may correspond to one or two TCI states among TCI states activated by MAC-CE. When the TCI states of DCI correspond to the two TCI states activated by MAC-CE, a correspondence relationship between a TCI codepoint indicated through DCI and TCI states activated by MAC-CE is established, and two TCI states may be activated by MAC-CE corresponding to the TCI codepoint.

As another example, if at least one codepoint among all codepoints of the TCI state field in DCI indicates two TCI states, the UE may consider that the base station may perform transmission based on the single-DCI-based multi-TRP method. Here, at least one codepoint indicating two TCI states in the TCI state field may be activated through enhanced PDSCH TCI state activation/deactivation MAC-CE.

FIG. 21 illustrates an enhanced PDSCH TCI state activation/deactivation MAC-CE structure according to an embodiment. The meaning of each field in the MAC CE and values configurable for each field are shown in Table 41, below.

TABLE 41

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;

BWP ID: This field indicates a DL BWP for which the MAC CE applies as the codepoint of the DCI bandwidth part indicator field as specified in TS 38.212 [9]. The length of the BWP ID field is 2 bits;

$C_i$: This field indicates whether the octet containing TCI state $ID_{i,\,2}$ is present. If this field is set to "1", the octet containing TCI state $ID_{i,\,2}$ is present. If this field is set to "0", the octet containing TCI state $ID_{i,\,2}$ is not present;

TCI state $ID_{i,\,j}$: This field indicates the TCI state identified by TCI-StateId as specified in TS 38.331 [5], where i is the index of the codepoint of the DCI Transmission configuration indication field as specified in TS 38.212 [9] and TCI state $ID_{i,\,j}$ denotes the j-th TCI state indicated for the i-th codepoint in the DCI Transmission Configuration Indication field. The TCI codepoint to which the TCI States are mapped is determined by its ordinal position among all the TCI codepoints with sets of TCI state $ID_{i,\,j}$ fields, i.e., the first TCI codepoint with TCI state $ID_{0,\,1}$ and TCI state $ID_{0,\,2}$ shall be mapped to the codepoint value 0, the second TCI codepoint with TCI state $ID_{1,\,1}$ and TCI state $ID_{1,\,2}$ shall be mapped to the codepoint value 1 and so on. The TCI state $ID_{i,\,2}$ is optional based on the indication of the Ci field. The maximum number of activated TCI codepoint is 8 and the maximum number of TCI states mapped to a TCI codepoint is 2.

R: Reserved bit, set to "0".

In FIG. 21, if the $C_0$ field 21-05 has the value of 1, the corresponding MAC-CE may include the TCI state $ID_{0,2}$ field 21-15 in addition to the TCI state $ID_{0,1}$ field 21-10. This may refer that TCI state $ID_{0,1}$ and TCI state $ID_{0,2}$ are activated for the 0th codepoint of the TCI state field included in DCI. If the base station indicates the corresponding codepoint to the UE, the UE may receive an indication of two TCI states. If the $C_0$ field 21-05 has the value of 0, the corresponding MAC-CE may not include the TCI state $ID_{0,2}$ field 21-15, and this may be understood as that one TCI state corresponding to TCI state $ID_{0,1}$ is activated for the 0th codepoint of the TCI state field included in DCI.

The above configuration may be independent for each cell or for each BWP. For example, a PCell may include up to two activated TI states corresponding to one TCI codepoint, whereas a specific SCell (may include up to one activated to state corresponding to one TCI codepoint. Here, it may be considered that NC-JT transmission is configured in the PCell, whereas NC-JT transmission is not configured in the above-described SCell.

Single-DCI-Based Multi-TRP PDSCH Repetitive Transmission Scheme (TDM/FDM/SDM) Distinguishing Method Next, a method for distinguishing between single-DCI-based multi-TRP PDSCH repetitive transmission schemes will be described. The UE may be indicated with different single-DCI-based multi-TRP PDSCH repetitive transmission schemes (e.g., TDM, FDM, SDM) according to the value indicated by a DCI field and a higher layer signaling configuration from the base station. Table 42, below, shows a method of distinguishing between single- or multi-TRP-based schemes indicated to the UE according to the value of a specific DCI field and the higher layer signaling configuration.

TABLE 42

| Combination | The number of TCI state(s) | The number of CDM: group(s) | repetition Number configuration and indication condition | repetitionScheme configuration | Transmission scheme indicated to the terminal |
|---|---|---|---|---|---|
| 1 | 1 | ≥1 | Condition 2 | Not configured | Single-TRP |
| 2 | 1 | ≥1 | Condition 2 | Configured | Single-TRP |
| 3 | 1 | ≥1 | Condition 3 | Configured | Single-TRP |
| 4 | 1 | 1 | Condition 1 | Configured or not configured | Single-TRP TDM scheme B |
| 5 | 2 | 2 | Condition 2 | Not configured | Multi-TRP SDM |
| 6 | 2 | 2 | Condition 3 | Not configured | Multi-TRP SDM |
| 7 | 2 | 2 | Condition 3 | Configured | Multi-TRP SDM |
| 8 | 2 | 2 | Condition 3 | Configured | Multi-TRP FDM scheme A/FDM scheme B/TDM scheme A |
| 9 | 2 | 2 | Condition 1 | Not configured | Multi-TRP TDM scheme B |

In Table 42, above, each column may be described as follows.
- Number of TCI states (column 2): refers to the number of TCI states indicated by the TC state field in DCI, and may be one or two.
- Number of CDM groups (column 3): refers to the number of different CDM groups of DMRS ports indicated by the antenna port field in DCI. The number of CDM groups may be 1, 2, or 3.
- repetitionNumber configuration and indication condition (column 4): three conditions may exist according to whether repetitionNumber is configured for all TDRA entries that can be indicated by a time-domain resource allocation field in DCI and whether the actually indicated TDRA entry has repetitionNumber configuration.

Condition 1: At least one of all TDRA entries that can be indicated by the time-domain resource allocation field includes the configuration for repetitionNumber, and the TDRA entry indicated by the time-domain resource allocation field in DCI includes configuration for repetition Number greater than 1.

Condition 2: At least one of all TDRA entries that can be indicated by the time-domain resource allocation field includes the configuration for repetitionNumber, and the TDRA entry indicated by the time-domain resource allocation field in DCI does not include the configuration for repetitionNumber.

Condition 3: When all TDRA entries that can be indicated by the time-domain resource allocation field do not include configuration for repetitionNumber.

Relating to repetitionScheme configuration (column 5): refers to whether repetitionScheme, which is a higher layer signaling, is configured. The repetitionScheme, which is higher layer signaling, may be configured with one of 'tdmSchemeA', 'fdmSchemeA', and 'fdmSchemeB'. Transmission scheme indicated to the UE (column 6): refers to single or multiple TRP schemes indicated according to each combination (column 1) shown in Table 42, above.

Single-TRP: refers to single TRP-based PDSCH transmission. If the UE is configured with the pdsch-AggregationFactor in the higher layer signaling PDSCH-config, the UE may receive scheduling for single TRP-based PDSCH repetitive transmission by the configured number of times. Otherwise, the UE may receive scheduling for single TRP-based PDSCH single transmission.

Single-TRP TDM scheme B: refers to single TRP-based inter-slot time resource division-based PDSCH repetitive transmission. According to the above-described repetitionNumber-related Condition 1, the UE repeatedly transmits the PDSCH in the time dimension as many times as the number of slots, having the repetitionNumber having the value greater than 1, configured in the TDRA entry indicated by the time-domain resource allocation field. Here, the same start symbol and symbol length of the PDSCH indicated by the TDRA entry are applied to each slot equal to the number of repetitionNumber, and the same TCI state is applied to each PDSCH repetitive transmission. This scheme is similar to a slot aggregation method in that an inter-slot PDSCH repetitive transmission is performed on time resources, but is different from slot aggregation in that it is possible to dynamically determine whether to indicate repetitive transmission based on the time-domain resource allocation field in DCI.

Multi-TRP SDM: refers to a multi-TRP-based spatial resource division PDSCH transmission method. This is a method of performing reception from each TRP by dividing layers. Although the multi-RP SDM is not a repetitive transmission method, it is possible to increase the number of layers and lower the coding rate to transmit, so as to increase the reliability of the PDSCH transmission. The UE may receive the PDSCH by applying the two TCI states indicated through the TCI state field in DCI to two CDM groups indicated by the base station, respectively.

Multi-TRP FDM scheme A refers to a multi-TRP-based frequency resource division PDSCH transmission scheme, and has one PDSCH transmission occasion, so that it is not possible to perform repetitive transmission like multi-TRP SDM, but to perform transmission with high reliability by increasing the frequency resource amount and lowering the coding rate. The multi-TRP FDM scheme A may apply two TCI states, indicated through the TCI state field in DCI, to frequency resources that do not overlap each other. If the PRB bundling size is determined to be wideband, the UE performs reception by applying the first TCI state to the first ceil (N/2) RBs and applying the second TCI state to the remaining floor (N/2) RBs, when the number of RBs indicated by the frequency domain resource allocation field is N. Here, the ceil and the floor are operators for rounding up and rounding down the first digit after decimal point. If the PRB bundling size is determined to be 2 or 4, the UE performs reception by applying the first TCI state to even-numbered PRGs and applying the second TCI state to odd-numbered PRGs.

Multi-TRP FDM scheme B refers to a multi-TRP-based frequency resource division PDSCH repetitive transmission scheme, and has two PDSCH transmission occasions, so that the PDSCH can be repeatedly transmitted to each occasion. Multi-TRP FDM scheme B may also apply two TCI states, indicated through the TCI state field in DCI, to frequency resources that do not overlap each other, in the same manner as the multi-TRP FDM scheme A. If the PRB bundling size is determined to be wideband, the UE performs reception by applying the first TCI state to the first ceil (N/2) RBs and applying the second TCI state to the remaining floor (N/2) RBs, when the number of RBs indicated by the frequency domain resource allocation field is N. Here, ceil and floor are operators for rounding up and rounding down the first digit after decimal point. If the PRB bundling size is determined to be 2 or 4, the UE performs reception by applying the first TCI state to even-numbered PRGs and applying the second TCI state to odd-numbered PRGs.

Multi-TRP TDM scheme A refers to a multi-TRP-based time resource division intra-slot PDSCH repetitive transmission scheme. The UE includes two PDSCH transmission occasions in one slot, and the first reception location may be determined based on the start symbol and symbol length of a PDSCH indicated through the time-domain resource allocation field in DCI. The start symbol of the second reception occasion of the PDSCH may be an occasion to which as many symbol offsets as StartingSymbolOffsetK, which is higher layer signaling, are applied from the last symbol of the first transmission occasion, and the transmission occasion may be determined by the indicated symbol length therefrom. If StartingSymbolOffsetK, which is higher layer signaling, is not configured, the symbol offset may be regarded as 0.

Multi-TRP TDM scheme B refers to a multi-TRP-based time resource division inter-slot PDSCH repetitive transmission scheme. The UE includes one PDSCH transmission occasion in one slot, and may receive repetitive transmission based on the start symbol and symbol length of the same PDSCH during a slot equal to the number of repetitionNumber indicated through the time domain resource allocation field in DCI. If repetitionNumber is 2, the UE may receive PDSCH repetitive transmissions in the first and second slots by applying the first and second TCI states, respectively. If repetitionNumber is greater than 2, the UE may use different TCI state application methods according to which higher layer signaling tciMapping is configured. If tciMapping is configured as cyclicMapping, the first and second TCI states are applied to the first and second PDSCH transmission occasions, respectively, and this TCI state application method is equally applied to the remaining PDSCH transmission occasions. If tciMapping is configured as sequentialMapping, the first TCI state is applied to the first and second PDSCH transmission occasions, the second TCI state is applied to the third and fourth PDSCH transmission occasions, and this TCI state application method is equally applied to the remaining PDSCH transmission occasions.

Referring to the descriptions related to the PDCCH transmission/reception configuration and transmission beam configuration described above, since PDCCH repetitive transmission is not currently supported in Rel-15/16 NR, it may be difficult to achieve the required reliability in a scenario requiring high reliability such as URLLC. Meanwhile, in Rel-17 further enhanced MIMO (FeMIMO), standardization of a method of improving PDCCH reception reliability through repetitive transmission for PDCCH is in progress. The PDCCH repetitive transmission method typically includes a non-SFN scheme, in which with regard to control resource sets connected to each of a plurality of search spaces explicitly connected by higher layer signaling, time or frequency resources are separated and repeatedly transmitted through different TRPs, and a SFN scheme in which a plurality of TCI states are configured in one control resource set and repeatedly transmitted. Among these, with regard to the non-SFN scheme, different control resource sets may be connected to a plurality of search spaces explicitly connected by higher layer signaling, respectively, and the same control resource set may be connected to all search spaces. In this case, a method in which different control resource sets are respectively connected is considered such that transmission from different TRPs is performed for each control resource set, and may be considered as a multi-TRP-based PDCCH repetitive transmission method. In addition, here, a method in which the same control resource set is connected to all search spaces is considered such that transmission in the same TRP is performed, and may be considered as a single TRP-based PDCCH repetitive transmission method.

Meanwhile, similar to the PDCCH repetitive transmission of the SFN scheme described above, the multi-TRP-based SFN transmission scheme with regard to the PDSCH may be configured or indicated by a combination of higher layer signaling and L1 signaling (e.g., DCI). Here, in order to distinguish the SFN transmission scheme with regard to the PDSCH from the above-described multi-TRP-based PDSCH transmission scheme and repetitive transmission scheme (e.g., multi-TRP TDM, FDM, and SDM), conditions using a combination of L1 signaling and higher layer signaling may be required. In addition, when the multi-TRP-based SFN PDSCH transmission scheme and the existing multi-TRP-based PDSCH transmission scheme and the repetitive transmission scheme are combined, there may be a difference in UE operation compared to the existing multi-TRP-based PDSCH transmission scheme and the repetitive transmission scheme. In addition, in case that the UE receives data using three or more TRPs, when only reception of up to two transmission beams is possible at a specific reception time (when there is a limit on the number of panels of the UE or a limit on the number of QCL information or transmission beams that can be processed), the base station may instruct the UE to perform repetitive transmission of the SFN scheme while changing a transmission beam for each transmission time point. Hereinafter, the above-mentioned contents will be described in detail.

Hereinafter, for convenience of explanation in the disclosure, cells, transmission points, panels, beams and/or transmission directions, which can be distinguished through higher layer/L1 parameters such as TCI state or spatial relation information, or indicators such as cell ID, TRP ID, panel ID, etc., are unified and described as a transmission reception point (TRP). Therefore, in actual application, it is possible to appropriately replace TRP with one of the above terms.

Hereinafter, when the UE determines whether cooperative communication is applied, it is possible to use various methods, such as, in which PDCCH(s) for allocation of PDSCH to which the cooperative communication is applied has a specific format, PDCCH(s) for allocation of PDSCH to which the cooperative communication is applied include a specific indicator indicating whether cooperative communication is applied, PDCCH(s) for allocation of PDSCH to which cooperative communication is applied is scrambled by a specific RNTI, or cooperative communication is assumed to be applied in a specific interval indicated by a higher layer. Hereinafter, for convenience of description, a case in which a UE receives a PDSCH to which cooperative communication is applied based on conditions similar to the above will be referred to as an NC-JT case.

Hereinafter, embodiments will be described in detail with reference to the accompanying drawings. Hereinafter, the base station, as a subject performing resource allocation of a terminal, may be at least one of gNode B, gNB, eNode B, Node B, BS, radio access unit, base station controller, or node on a network. The terminal may include a UE, an MS, a cellular phone, a smartphone, a computer, or a multimedia system capable of performing a communication function. Hereinafter, an embodiment will be described using a 5G system as an example, but the embodiment may be applied to other communication systems having a similar technical background or channel type. For example, LTE or LTE-A mobile communication and mobile communication technology developed after 5G may be included therein. Accordingly, the embodiments may be applied to other communication systems through some modifications within a range that does not significantly depart from the scope of the disclosure as determined by those of ordinary skilled in the art. The contents of the disclosure are applicable to FDD and TDD systems.

In addition, in the description of the disclosure, if it is determined that a detailed description of a related function or configuration may unnecessarily obscure the subject matter of the disclosure, the detailed description thereof will be omitted. In addition, the terms to be described later are terms defined considering functions in the disclosure, which may vary according to intentions or customs of users and operators. Therefore, the definition should be made based on the entire description herein.

Hereinafter, higher layer signaling may be signaling corresponding to at least one or a combination of one or more of the following signaling.

Master information block (MIB).
System information block (SIB) or SIB X (X=1, 2, . . . ).
Radio resource control (RRC).
Medium access control (MAC) control element (CE).

In addition, L1 signaling may be signaling corresponding to at least one or a combination of one or more of signaling methods using the following physical layer channel or signaling.

Physical downlink control channel (PDCCH).
Downlink control information (DCI).
UE-specific DCI.
Group common DCI.
Common DCI.
Scheduling DCI (for example, DCI used for scheduling downlink or uplink data).

Non-scheduling DCI (for example, DCI not for the purpose of scheduling downlink or uplink data).
Physical uplink control channel (PUCCH).
Uplink control information (UCI).

Hereinafter, in the disclosure, determining a priority between A and B refers to selecting one having a higher priority according to a predetermined priority rule to perform an operation corresponding thereto or omitting (or dropping) an operation for the other one having a lower priority.

In the following description, the above-examples will be described through a plurality of embodiments, but the examples are not independent and one or more embodiments can be applied at the same time or in combination.

First Embodiment: Multi-TRP-Based PDCCH Repetitive Transmission Method

As an embodiment of the disclosure, a PDCCH repetitive transmission method considering multi-TRP will be described. The PDCCH repetitive transmission considering multi-TRP may include various methods according to application of each TCI state, which is to be applied when PDCCH transmission occurs in each TRP, to the above-mentioned various parameters used for PDCCH transmission. For example, various parameters used for PDCCH transmission to which different TCI states are to be applied may include a CCE, a PDCCH candidate group, a control resource set, a search space, and the like. In a case of PDCCH repetitive transmission considering multi-TRP, a soft combining method, a selection method, and the like may be considered as a reception method of the UE.

The PDCCH repetitive transmission through multi-TRP may include five methods as follows, and the base station may configure at least one of the five methods for a UE through higher layer signaling, may indicate the same through L1 signaling, or may configure or indicate the same by combining higher layer signaling and L1 signaling. Meanwhile, the following methods are provided as examples and the disclosure is not limited thereto.

Method 1-1—Method of Repeatedly Transmitting Multiple PDCCHs Having the Same Payload Method 1-1 is a method of repeatedly transmitting multiple pieces of control information having the same DCI format and payload. In each of the above-described control information, information for scheduling repeatedly transmitted PDSCHs, for example, {PDSCH #1, PDSCH #2, . . . , PDSCH #Y}, which are repeatedly transmitted over multiple slots may be indicated. The fact that each piece of repeatedly transmitted control information has the same payload may be expressed as that PDSCH scheduling information of each piece of control information, for example, the number of PDSCH repetitive transmissions, PDSCH resource allocation information of the time domain, that is, the number of PDSCH symbols and slot offset (K_0) between control information and PDSCH #1, PDSCH resource allocation information of the frequency domain, DMRS port allocation information, PDSCH-to-HARQ-ACK timing, PUCCH resource indicator, etc. are identical for the each piece of control information. The UE can improve the reception reliability of control information by soft combining pieces of repetitive transmission control information having the same payload.

For the soft combining, the UE needs to know in advance the resource position of control information to be repeatedly transmitted, the number of repetitive transmissions, and the like. To this end, the base station may indicate in advance at least one of a time domain, a frequency domain, and a spatial domain resource configuration of the above-described repetitive transmission control information. When control information is repeatedly transmitted on the time domain, control information may be repeatedly transmitted over different CORESETs, repeatedly transmitted over different search space set in one CORESET, or repeatedly transmitted over different PDCCH monitoring occasions in one CORESET and one search space set. A unit of repeatedly transmitted resource on the time domain (CORESET unit, search space set unit, PDCCH monitoring occasion unit) and a location of a repetitive transmission resource (PDCCH candidate index, etc.) may be indicated through higher layer configuration of the base station, and the like. Here, the number of repetitive transmissions of the PDCCH and/or the list and transmission pattern of TRPs participating in repetitive transmission may be explicitly indicated, and higher layer indication, MAC-CE/L1 signaling, and the like may be used as an explicit indication method. Here, the list of TRPs may be indicated in the form of the TCI state or QCL assumption described above.

When control information is repeatedly transmitted on the frequency domain, control information may be repeatedly transmitted over different CORESETs, repeatedly transmitted over different PDCCH candidates in one CORESET, or repeatedly transmitted for each CCE. The unit of a resource repeatedly transmitted on the frequency domain and the location of the repetitive transmission resource may be indicated through higher layer configuration of the base station, and the like. In addition, the number of repetitive transmissions and/or the list and transmission pattern of TRPs participating in repetitive transmission may be explicitly indicated, and a higher layer indication or MAC-CE/L1 signaling may be used as an explicit indication method. Here, the list of TRPs may be indicated in the form of the TCI state or the aforementioned QCL assumption.

When control information is repeatedly transmitted in the spatial domain, control information may be repeatedly transmitted over different CORESETs, or two or more TCI states may be configured in one CORESET and thus repetitive transmission may occur.

A method in which a base station repeatedly transmits a PDCCH will be described. In a wireless communication system, DCI including scheduling information for PUSCH or PDSCH may be transmitted from the base station to the UE through the PDCCH.

Figure 22:
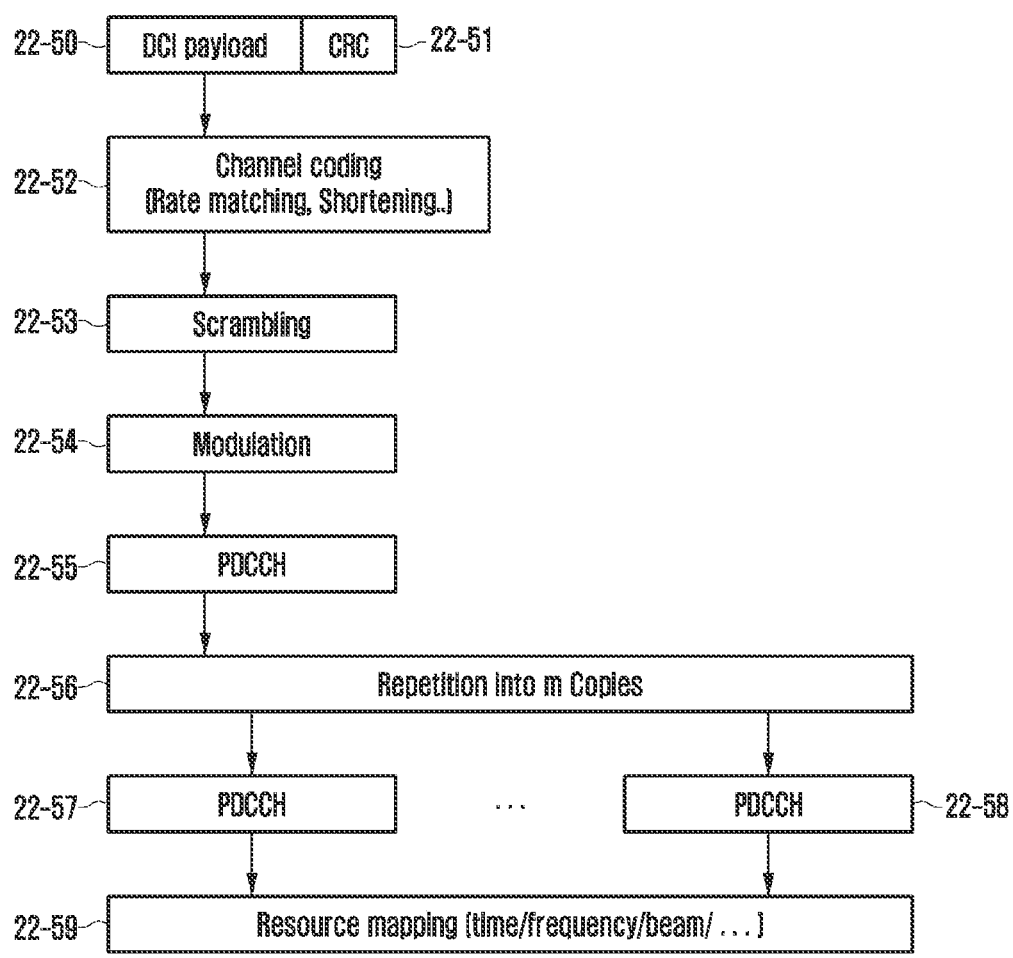
FIG. 22 illustrates a process of generating a PDCCH repeatedly transmitted through two TRPs according to an embodiment.

FIG. 22 illustrates a process of generating a PDCCH repeatedly transmitted through two TRPs according to an embodiment. In FIG. 22, two TRPs are exemplified, but the disclosure is not limited thereto. Even in a case of two or more TRPs, this embodiment may be applied.

Referring to FIG. 22, the base station may generate DCI (22-50), a CRC is attached to a DCI payload (22-51), the DCI may be subjected to a channel coding process (22-52), and a scrambling process (22-53), and a modulation process (22-54), so as to generate a PDCCH (22-55). Thereafter, the base station may copy the generated PDCCH multiple times (22-56), and may transmit PDCCHs 22-57 and 22-58 by using a specific resource (e.g., time, frequency, transmission beam, etc.) (22-59). That is, the coded bits used for the PDCCH repeatedly transmitted in each TRP may be the same. As such, in order for the coded bits to be the same, information value for each DCI field in the PDCCH may also be configured to be the same. For example, all fields (TDRA, FDRA, TCI, antenna ports, . . . ) included in DCI information may be configured to have the same value. Here, the same value may be generally interpreted as one value, but when the above-described multiple (for example, two) values are implied or corresponded by a special configuration, it may be interpreted as having multiple values. A detailed description related thereto will be described below.

For example, as shown in FIG. 22, when the base station repeatedly transmits the PDCCH twice (e.g., m=2), the base station may map the PDCCHs to TRP A and TRP B respectively, and thus may repeatedly transmit the PDCCH in a spatial domain aspect based on the same or different beams. Here, the base station may perform PDCCH repetitive transmission based on CORESETs respectively connected to two search spaces explicitly connected to each other by higher layer signaling. Further, when the IDs of CORESETs connected to the search spaces are the same, or the TCI states of CORESETs are the same, the base station may perform single TRP-based PDCCH repetitive transmission, and when all IDs of CORESETs connected to the search space are different or the TCI states of CORESETs are all different, the base station may perform multi-TRP-based PDCCH repetitive transmission. If the base station performs the PDCCH repetitive transmission four times, the base station may map two PDCCHs to each of TRP A and TRP B, and here, two PDCCHs of each TRP may be divided and transmitted in the time domain. The PDCCH repetitive transmission divided in the time domain may be repeated in time units of slot based, subslot based, or mini-slot based.

However, the above-described method is merely an example and the disclosure is not limited thereto. In the disclosure, the UE and the base station may consider the following method for the above-described PDCCH repetition operation.

- PDCCH repetition in the time/frequency/spatial domain aspect within the same CORESET, and within the same slot.
- PDCCH repetition in the time/frequency/spatial domain aspect within the same CORESET, and between different slots.
- PDCCH repetition in the time/frequency/spatial domain aspect between different CORESETs, and within the same slot.
- PDCCH repetition in the time/frequency/spatial domain aspect between different CORESETs, and between different slots.

In addition, when CORESETPoolindex is configured, PDCCH repetition may be considered for each CORESET-Poolindex in addition to CORESET described above. In addition, the number of repetitions of the PDCCH may increase independently, and accordingly, the above-described methods may be considered in combination at the same time.

The base station may preconfigure, in the UE, information regarding a domain through which the PDCCH is repeatedly transmitted, through an RRC message. For example, in a case of PDCCH repetitive transmission in the time domain aspect, the base station may preconfigure, in the UE, information regarding whether PDCCH repetitive transmission is performed according to one of the aforementioned slot-based, sub-slot-based, or mini-slot-based time units. In a case of PDCCH repetitive transmission in the frequency domain aspect, the base station may preconfigure, in the UE, information regarding whether PDCCH repetitive transmission is performed based on one of CORESET, BWP, or component carrier (CC). In a case of PDCCH repetitive transmission in the spatial domain aspect, the base station may preconfigure, in the UE, information related to a beam for PDCCH repetitive transmission through configuration for each QCL type. Alternatively, the base station may combine the information listed above and transmit the combined information to the UE through an RRC message. The base station may repeatedly transmit the PDCCH according to preconfigured information through the RRC message, and the UE may repeatedly receive the PDCCH according to the preconfigured information through the RRC message.

Method 1-2: Method of Repeatedly Transmitting Multiple Pieces of Control Information that May have Different DCI Formats and/or Payloads Method 1-2 is a method of repeatedly transmitting multiple pieces of control information that may have different DCI formats and/or payloads. The control information schedules the repetitive transmission PDSCH, and the number of PDSCH repetitions indicated by each piece of control information may be different from each other. For example, PDCCH #1 may indicate information for scheduling {PDSCH #1, PDSCH #2, . . . , PDSCH #Y}, whereas PDCCH #2 indicates information for scheduling {PDSCH #2, . . . , PDSCH #Y}, . . . , and PDCCH #X may indicate information for scheduling {PDSCH Y}. The above control information repetitive transmission method has an advantage in that a total delay time required for repetitive transmission of control information and PDSCH can be reduced compared to Method 1-1. On the other hand, according to this method, since a payload of repeatedly transmitted control information may be different from each other, soft combining of the repeatedly transmitted control information is impossible, and thus reliability may be lower than that of Method 1-1.

In the above-described method 1-2, the UE may not need to know in advance the resource position of the control information to be repeatedly transmitted and the number of repetitive transmissions, and the UE may independently decode and process each of the repeatedly transmitted control information. If the UE decodes multiple repetitive transmission control information for scheduling the same PDSCH, only the first repetitive transmission control information may be processed and the second and subsequent repetitive transmission control information may be ignored. Alternatively, the resource position of control information to be repeatedly transmitted and the number of repetitive transmissions may be indicated in advance, and the instruction method may be the same as Method 1-1.

Method 1-3: Method of Repeatedly Transmitting Multiple Pieces of Control Information that May have Different DCI Formats and/or Payloads, Respectively Method 1-3 is a method for repeatedly transmitting multiple pieces of control information that may have different DCI formats and/or payloads, respectively. Here, each piece of control information repeatedly transmitted may have the same DCI format and the same payload. Since it is impossible to soft combine multiple pieces of control information in Method 1-2, reliability may be lower than that of Method 1-1. In Method 1-1, a total delay time required for control information and PDSCH repetitive transmission may be long. Method 1-3 uses the advantages of Method 1-1 and Method 1-2. In Method 1-3, the control information can be transmitted with high reliability compared to Method 1-2 while reducing a total delay time required for control information and PDSCH repetitive transmission compared to Method 1-1.

In order to decode and soft combine the repeatedly transmitted control information, Method 1-3 uses the soft combine of method 1-1 and the individual decoding of Method 1-2. For example, the first transmitted control information, among repetitive transmissions for multiple pieces of control information, each of which may have a different DCI format and/or payload, may be decoded according to Method 1-2, and repetitive transmissions of the decoded control information may be soft combined according to Method 1-1.

Meanwhile, the base station may select one of Method 1-1, Method 1-2, or Method 1-3 to configure control information repetitive transmission. The control information repetitive transmission method may be explicitly indicated by the base station to the UE through higher layer signaling. Alternatively, the control information repetitive transmission method may be indicated in combination with other configuration information. For example, the higher layer configuration indicating the PDSCH repetitive transmission method may be combined with an indication for control information repetitive transmission. When the PDSCH is indicated to be repeatedly transmitted using a FDM scheme, it may be understood that the control information is repeatedly transmitted only using Method 1-1. This is because, according to the PDSCH repetitive transmission of the FDM scheme, there is no delay time reduction effect by Method 1-2. For a similar reason, when the PDSCH is indicated to be repeatedly transmitted using an intra-slot TDM scheme, it may be understood that the control information is repeatedly transmitted using Method 1-1. On the other hand, when the PDSCH is indicated to be repeatedly transmitted using inter-slot TDM scheme, the above-described Method 1-1, Method 1-2, or Method 1-3 for control information repetitive transmission may be selected through higher layer signaling or L1 signaling.

On the other hand, the base station may explicitly indicate units of control information repetitive transmission to the UE through a higher layer configuration or the like. Alternatively, the units of control information repetitive transmission may be indicated in combination with other configuration information. For example, a higher layer configuration indicating a PDSCH repetitive transmission method may be combined with the units of control information repetitive transmission. When the PDSCH is indicated to be repeatedly transmitted using the FDM scheme, it may be interpreted that the control information is repeatedly transmitted through FDM or space division multiplexing (SDM). The reason is that if control information is repeatedly transmitted through the inter-slot TDM scheme and the like, there is no delay time reducing effect due to the PDSCH repetitive transmission using the FDM scheme. For a similar reason, when the PDSCH is indicated to be repeatedly transmitted in an intra-slot TDM scheme, it may be interpreted that the control information is repeatedly transmitted through TDM, FDM, or SDM in a slot. On the other hand, when the PDSCH is indicated to be repeatedly transmitted using the inter-slot TDM scheme, inter-slot TDM, intra-slot TDM, FDM, or SDM may be selected, through higher layer signaling and the like, so as to repeatedly transmit control information.

Method 1-4: PDCCH Transmission Method in which Respective TCI States are Applied to Different CCEs in the Same PDCCH Candidate According to Method 1-4, in order to improve reception performance of the PDCCH without PDCCH repetitive transmission, different TCI states referring to transmission from multi-TRP may be applied to different CCEs in a PDCCH candidate and transmitted. Although Method 1-4 is not the PDCCH repetitive transmission, different CCEs in the PDCCH candidates are transmitted by applying different TCI states in each TRP, and thus Method 1-4 can acquire spatial diversity in the PDCCH candidates. Different CCEs to which different TCI states are applied may be separated in a time or frequency dimension, and the UE needs to know in advance the location of resources to which different TCI states are applied. The UE may receive different CCEs to which different TCI states are applied in the same PDCCH candidate and decode the received CCEs independently or simultaneously.

Method 1-5: PDCCH Transmission Method in which Multiple TCI States are Applied to all CCEs in the Same PDCCH Candidate (SFN Scheme)

According to Method 1-5, in order to improve reception performance of the PDCCH without PDCCH repetitive transmission, multiple TCI states may be applied to different CCEs in a PDCCH candidate and transmitted. Although Method 1-5 is not the PDCCH repetitive transmission, this may be a method of acquiring spatial diversity through SFN transmission at the same CCE position in a PDCCH candidate group. The UE may receive CCEs of the same position to which different TCI states are applied in the same PDCCH candidate group, and may decode the received CCEs independently or simultaneously using some or all of the plurality of TCI states.

Second Embodiment: Soft Combining-Related UE Capability Report During PDCCH Repetitive Transmission A UE may report soft combining-related UE capability during PDCCH repetitive transmission to a base station, and in this regard, several methods may exist, examples of which are described herein, without limiting the disclosure thereto.

UE Capability Reporting Method 1

The UE may report, to the base station, a UE capability in the form of possible or impossible relating to only soft combining during PDCCH repetitive transmission.

As an example, if the UE reports, as a UE capability, information indicating that soft combining is possible during PDCCH repetitive transmission to the base station, the base station may determine whether soft combining of the UE is possible, in the most flexible degree (for example, the UE determines that soft combining is possible at the level of log likelihood ratio (LLR)), and may notify the UE of the PDCCH repetitive transmission-related configuration as flexible as possible during PDCCH transmission-related configuration. Here, as an example related to PDCCH repetition configuration, the base station assumes that, with regard to the UE, soft combining between control resource sets or search spaces having different configurations, soft combining between PDCCH candidates having the same aggregation level, or soft combining between PDCCH candidates having different aggregation levels are possible, and may notify the UE of the corresponding configuration.

As another example, if the UE reports information indicating that soft combining is possible during PDCCH repetitive transmission to the base station as a UE capability, the base station may determine the level of soft combining possible for the UE most conservatively (for example, determine that soft combining by the UE is possible at the OFDM symbol level), and may notify the UE of the PDCCH repetitive transmission-related configuration in the most restrictive manner during PDCCH transmission-related configuration. Here, as an example related to PDCCH repetition configuration, the base station may assume that, with regard to the UE, soft combining between a plurality of control resource sets having the same configuration or soft combining between PDCCH candidates having the same aggregation level is possible, and may notify the UE of the corresponding configuration.

UE Capability Reporting Method 2

In order to express the operation of soft combining possible in the UE, as a UE capability, in more detail compared to the above-described UE capability reporting Method 1, the UE may divide the possibility of soft combining during PDCCH repetitive transmission into levels and report the same as UE capability to the base station. That is, the UE may identify a signal level, to which soft combining can be applied for PDCCH repetitive transmission, among signal levels generated from the reception operation processes of the UE, and may report such information to the base station as a UE capability. The UE may notify that soft combining is possible at the OFDM symbol level as a signal level to which soft combining can be applied, may notify that soft combining is possible at the modulation symbol level, and may notify that soft combining is possible at the LLR level. According to each signal level reported by the UE, the base station may provide notification of the appropriate configuration so that the UE can perform soft combining according to the reported UE capability.

UE Capability Reporting Method 3

The UE may transmit limitations required to enable soft combining on the UE side during PDCCH repetitive transmission to the base station as a UE capability. As an example, the UE may report to the base station that the configuration of each of control resource sets including two repeated PDCCHs should be the same. As another example, the UE may report to the base station that the two repeated PDCCH candidates need to have at least the same aggregation level.

UE Capability Reporting Method 4

When receiving PDCCH repetitive transmission from a base station, a UE may report information relating to a supported PDCCH repetitive transmission method through a UE capability. As an example, the UE may report, to the base station, information about supporting Method 1-5 (SFN transmission scheme). As another example, the UE may report, to the base station, information about supporting of the intra-slot TDM, inter-slot TDM, or FDM scheme among Method 1-1 (a method of repeatedly transmitting multiple PDCCHs having the same payload). In particular, in a case of TDM, the UE may report the maximum value of the time interval between two repeated PDCCHs to the base station. As an example, if the UE reports the maximum value of the time interval between two repeated PDCCHs as 4 OFDM symbols, the base station should adjust the time interval between two repeated PDCCHs to 4 OFDM symbols or less when performing TDM-based PDCCH repetitive transmission to the UE based on the corresponding information.

UE Capability Reporting Method 5

A UE may report, as a UE capability, to a base station, a number of blind decodings consumed when receiving PDCCH repetitive transmission from the base station. As one example, the UE reports the number of blind decodings consumed when receiving PDCCH repetitive transmission to the base station as "1", "2", or "3" regardless of the reception method of the UE (e.g., individual decoding, soft combining, or other reception methods, or a combination thereof). The base station may assume that the UE may consume the reported number of blind decodings when receiving PDCCH repetitive transmission, and may transfer to the UE the configuration related to a search space and a control resource set so as not to exceed the maximum number of blind decodings that the UE can use within a slot or span.

The above-described UE capability reporting methods can be configured in a combination of two or more UE capability reporting methods in actual application. As an example, the UE may report that soft combining is possible at the LLR level by UE capability reporting Method 2, and at the same time, the UE may report that two repeated PDCCH candidates should have at least the same aggregation level by UE capability reporting Method 3, and may report the maximum value of the time interval between two repeated PDCCHs as 4 OFDM symbols while supporting PDCCH repetitive transmission TDMed by UE capability reporting Method 4. In addition, applications based on a combination of various UE capability reporting methods are possible, but a detailed description thereof will be omitted.

Third Embodiment: Configuration Method Related to PDCCH Repetitive Transmission and Explicit Linkage A method for configuring PDCCH repetitive transmission for enabling soft combining during PDCCH repetitive transmission will be described. When a base station performs PDCCH repetitive transmission to a UE based on Method 1-1 (method of repeatedly transmitting a plurality of PDCCHs having the same payload) among various PDCCH repetitive transmission methods, in order to reduce the number of blind decoding by considering whether soft combining by the UE is possible, the base station may configure information indicating that there is an explicit linkage or association between repeated PDCCH candidates via higher layer signaling, may indicate the same by L1 signaling, or may be configured and indicated with the same through a combination of layer signaling or L1 signaling. Further detail is provided below. Also, various configuration methods relating to PDCCH repetitive transmission and explicit linkage via higher layer signaling are described below.

PDCCH Repetition Configuration Method 1

PDCCH Repetition Configuration Method 1: When Configuration Information Exists in Higher Layer Signaling PDCCH-Configuration.

A base station may configure PDCCH-repetition-config in PDCCH-config, which is higher layer signaling, in order to perform PDCCH repetitive transmission and explicit linkage-related configuration to the UE, and the PDCCH-repetition-config may include at least one of the following pieces of information. The information listed below is not necessarily included, and some pieces of information may be omitted and additional information may be included.

PDCCH repetitive transmission method—one of TDM, FDM, and SFN.
Combination(s) of control resource set-search space to be used during PDCCH repetitive transmission.
Control resource set index(es)—OPTIONAL.
Search space index(es)—OPTIONAL.
Aggregation level(s) for explicit linkage—OPTIONAL.
PDCCH candidate index(s) for explicit linkage—OPTIONAL.
Frequency resources for explicit linkage—OPTIONAL.

Based on the above pieces of information, the base station may configure, for the UE, the PDCCH repetitive transmission by higher layer signaling. For example, if the PDCCH repetitive transmission method is configured through an SFN, the control resource set index is configured to be "1"

as a combination of control resource set-search space to be used in the PDCCH repetitive transmission, and if the search space index is not configured, the UE may expect that the PDCCH is repeatedly transmitted through Method 1-5 (SFN transmission scheme) in the control resource set having index 1. Here, the configured control resource set may be configured with one or multiple different TCI states via higher layer signaling, may be indicated with the same via L1 signaling or MAC-CE signaling, or may be configured or indicated with the same in a combination of higher layer signaling and L1 signaling or MAC-CE signaling. In addition, if the PDCCH repetitive transmission method is configured through an SFN, the UE may not expect a search space index to be configured in a combination of the control resource set-search space to be used for PDCCH repetitive transmission. As another example, the PDCCH repetitive transmission method is configured through TDM or FDM, a total of two combinations of control resource set-search space to be used in PDCCH repetitive transmission are configured, control resource set index 1 and search space index 1 are configured for the first combination of control resource set-search space, and control resource set index 2 and search space index 2 are configured for the second combination of control resource set-search space, the UE may expect that the PDCCH is repeatedly transmitted using two combinations of control resource set-search space using the TDM or FDM scheme through Method 1-1. Here, each configured control resource may be configured with one or multiple different TCI states via higher layer signaling, may be indicated with the same via L1 signaling or MAC-CE signaling, or may be configured or indicated with the same in a combination of higher layer signaling and L1 signaling or MAC-CE signaling. In addition, if the PDCCH repetitive transmission method is configured through TDM or FDM, the UE may expect that up to two combinations of control resource set-search space to be used during PDCCH repetitive transmission are configured, and may expect that both control resource set and search space indexes are configured in each combination thereof.

In addition, the above five pieces of information may have updated values based on MAC-CE without RRC reconfiguration. If the base station does not configure the PDCCH-repetition-config for the UE, the UE does not expect the PDCCH to be repeatedly transmitted, and may expect PDCCH single transmission only. All of the above-described aggregation level, PDCCH candidate index, and frequency resources for explicit linkage may not be configured or at least one thereof may be configured according to an explicit linkage method to be described later.

PDCCH Repetition Configuration Method 2

PDCCH Repetition Configuration Method 2: When Configuration Information Exists in Higher Layer Signaling for Search Space.

The base station may add higher layer signaling in searchSpace, which is higher layer signaling for the search space, in order to perform PDCCH repetitive transmission, and provide notification of the same to the UE. For example, a parameter called repetition, which is an additional higher layer signaling, is configured to be on or off in searchSpace, and thus the corresponding search space is used for repetitive transmission. One or two search space in which repetition is configured to be on may exist for each bandwidth part. For example, when searchSpaceId is configured to be 1, controlResourceSetId is configured to be 1, and repetition is configured to be on in searchSpace, which is higher layer signaling for search space index 1, the UE may expect that PDCCH repetitive transmission is performed according to Method 1-5 (SFN transmission method) in the control resource set 1 connected to the search space 1. As another example, searchSpaceId is configured to be 1, controlResourceSetId is configured to be 1, and repetition is configured to be on in searchSpace, which is higher layer signaling for search space index 1, and searchSpaceId is configured to be 2, controlResourceSetId is configured to be 2, and repetition is configured to be on in searchSpace, which is higher layer signaling for search space index 2, the UE may recognize that PDCCH repetitive transmission is performed through TDM or FDM by using the method 1-1 between a combination of control resource set 1+search space 1 and a combination of resource set 2+search space 2. TDM and FDM may be distinguished according to time and frequency configurations through higher layer signaling of control resource sets 1 and 2 and search spaces 1 and 2. In addition, in higher layer signaling for the search space in which repetition is configured to be on, the aggregation level or PDCCH candidate indexes for explicit linkage specified in PDCCH repetition configuration Method 1 may be configured, and according to an explicit linkage method to be described later, neither thereof may be configured, either one may be configured, or both may be configured.

Fourth Embodiment: Multi-TRP-Based SFN PDSCH Transmission Method

A, a method for indication and configuration of multi-TRP-based SFN PDSCH transmission in a base station through a combination of L1 signaling and higher layer signaling, and a reception method in a UE will be described. When the base station schedules the multi-TRP-based SFN PDSCH transmission method to the UE through DCI, condition of a DCI field and conditions of higher layer signaling may be as follows.

TCI state field in DCI: may indicate a codepoint of a TCI state field including two TCI states.

Antenna port field in DCI: The number of CDM groups may be fixed to one, or may be one or more.

Time domain resource allocation field in DCI: There may be no restrictions on the corresponding field (e.g., one of condition 1, 2, or 3 for the time domain resource allocation field described in Table 31 above may be possible), only the above-described condition 3 (e.g., when all TDRA entries are not configured with repetitionNumber, which is higher layer signaling), may be possible.

Higher layer signaling repetitionScheme: may be configured or not.

New higher layer signaling for the multi-TRP-based SFN PDSCH scheme may be additionally configured. On the other hand, in order to support the above-described multi-TRP-based PDSCH scheme (e.g., multi-TRP SDM, FDM scheme A, FDM scheme B, TDM scheme A, and TDM scheme B), the UE may expect that new higher layer signaling for multi-TRP-based SFN PDSCH scheme is not configured.

Figure 23:
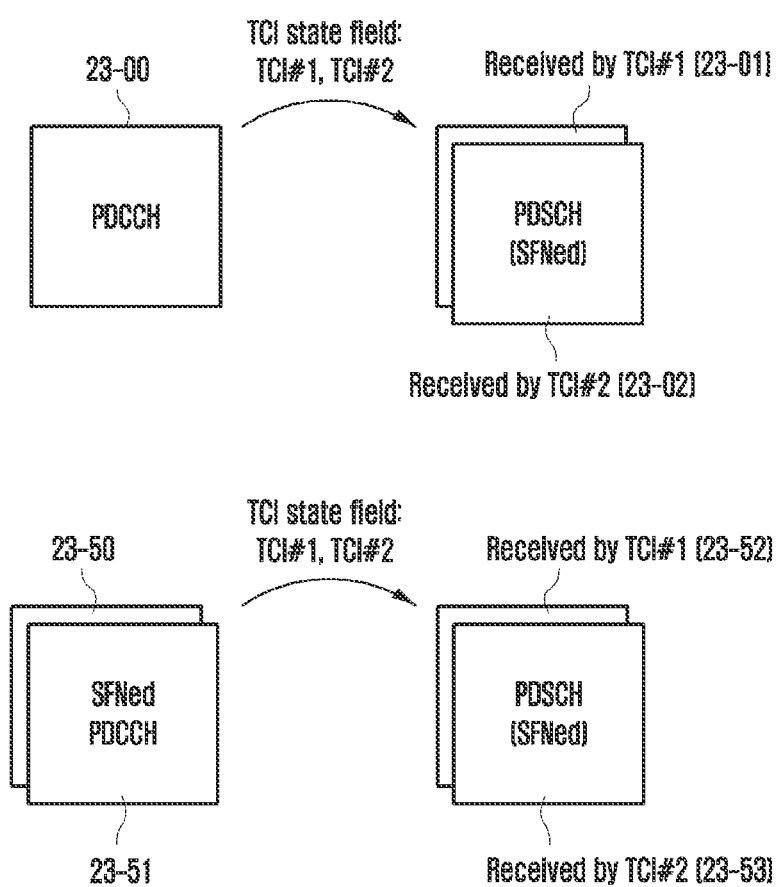
FIG. 23 illustrates a multi-TRP-based SFN PDSCH transmission method according to an embodiment.

FIG. 23 illustrates a multi-TRP-based SFN PDSCH transmission method according to an embodiment.

Referring to FIG. 23, a base station indicates and configures the above-described DCI field value and higher layer signaling to the UE, and then transmits a PDCCH to the UE (23-00). TCI states #1 and #2 may be indicated through the TCI state field in the corresponding PDCCH, and time and frequency resource allocation information may be indicated through one time domain resource allocation field and one frequency domain resource allocation field, respectively.

The UE may receive an SFN-transmitted PDSCH by using two different TCI states (TCI states #1 and #2) at a resource location based on the corresponding time and frequency resource allocation information (23-01 and 23-02). This is equally applicable to the SFN-based PDCCH repetitive transmission. The UE may receive the SFN-transmitted PDCCH by applying two different TCI states within one control resource set (23-50 and 23-51). Based on pieces of information of a DCI field included in the corresponding SFN-transmitted PDCCH, the UE may receive the SFN-transmitted PDCCH by using two different TCI states (TCI state #1 and #2) at a resource location based on the corresponding time and frequency resource allocation information (23-52 and 23-53).

Fifth Embodiment: Multi-TRP-Based SFN PDSCH Repetitive Transmission Method

In an embodiment, multi-TRP-based SFN PDSCH repetitive transmission will be described. For each detailed embodiment, when multi-TRP-based SFN PDSCH transmission and other schemes are combined, operations of the base station and the UE will be described. The (5-1)th embodiment describes a method for combining multi-TRP-based SFN PDSCH transmission and slot aggregation transmission, the (5-2)th embodiment describes a method for combining multi-TRP-based SFN PDSCH transmission and multi-TRP-based TDM scheme A, the (5-3)rd embodiment describes a method for combining multi-TRP-based SFN PDSCH transmission and multi-TRP-based TDM scheme B, and the (5-4)th embodiment describes a method for applying three or more transmission beams during multi-TRP-based SFN PDSCH transmission. In the (5-5)th embodiment, the UE capability report regarding whether to support techniques to be described in the (5-1)th to (5-4)th embodiments, which will be described later, will be described.

(5-1)Th Embodiment: Method for Combining Multi-TRP-Based SFN PDSCH Transmission and Slot Aggregation Transmission Operations of a base station and a UE when multi-TRP-based SFN PDSCH transmission and slot aggregation transmission are combined will be described. When the base station schedules a combination Method for multi-TRP-based SFN PDSCH transmission and slot aggregation transmission to the UE through DCI, conditions of a DCI field and conditions of higher layer signaling may be as follows. Meanwhile, the following conditions correspond only to examples, and the disclosure is not limited thereto.

Condition 5-1-1) TCI state field in DCI: A codepoint of the TCI state field including two TCI states may be indicated.

Condition 5-1-2) Antenna port field in DCI: The number of CDM groups may be fixed to one, or may be one or more.

Condition 5-1-3) Time domain resource allocation field in DCI: Only the above-described condition 3 (e.g., when all TDRA entries are not configured with repetition-Number, which is higher layer signaling), may be possible.

Condition 5-1-4) Higher layer signaling repetition-Scheme: may not be configured.

Condition 5-1-5) New higher layer signaling for the multi-TRP-based SFN PDSCH technique may be additionally configured.

Condition 5-1-6) Additionally, pdsch-AggregationFactor, which is higher layer signaling, may be configured.

Condition 5-1-7) Additionally, the base station may configure for the UE whether to support a method for combining multi-TRP-based SFN PDSCH transmission and slot aggregation transmission via new higher layer signaling.

On the other hand, in a case of single TRP-based PDSCH transmission rather than multi-TRP-based SFN PDSCH transmission, the following conditions among the above-described conditions may be different from those of the multi-TRP-based SFN PDSCH transmission.

(Modified condition 5-1-1) In condition 5-1-1, the number of TCI states indicated through the TCI state field may be one.

(Modified condition 5-1-5) In condition 5-1-5, new higher layer signaling for the multi-TRP-based SFN PDSCH technique may be additionally configured or not.

(Modified condition 5-1-7) In condition 5-1-7, the base station may configure for the UE whether to support a method for combining multi-TRP-based SFN PDSCH transmission and slot aggregation transmission via new higher layer signaling, or may not.

Figure 24:
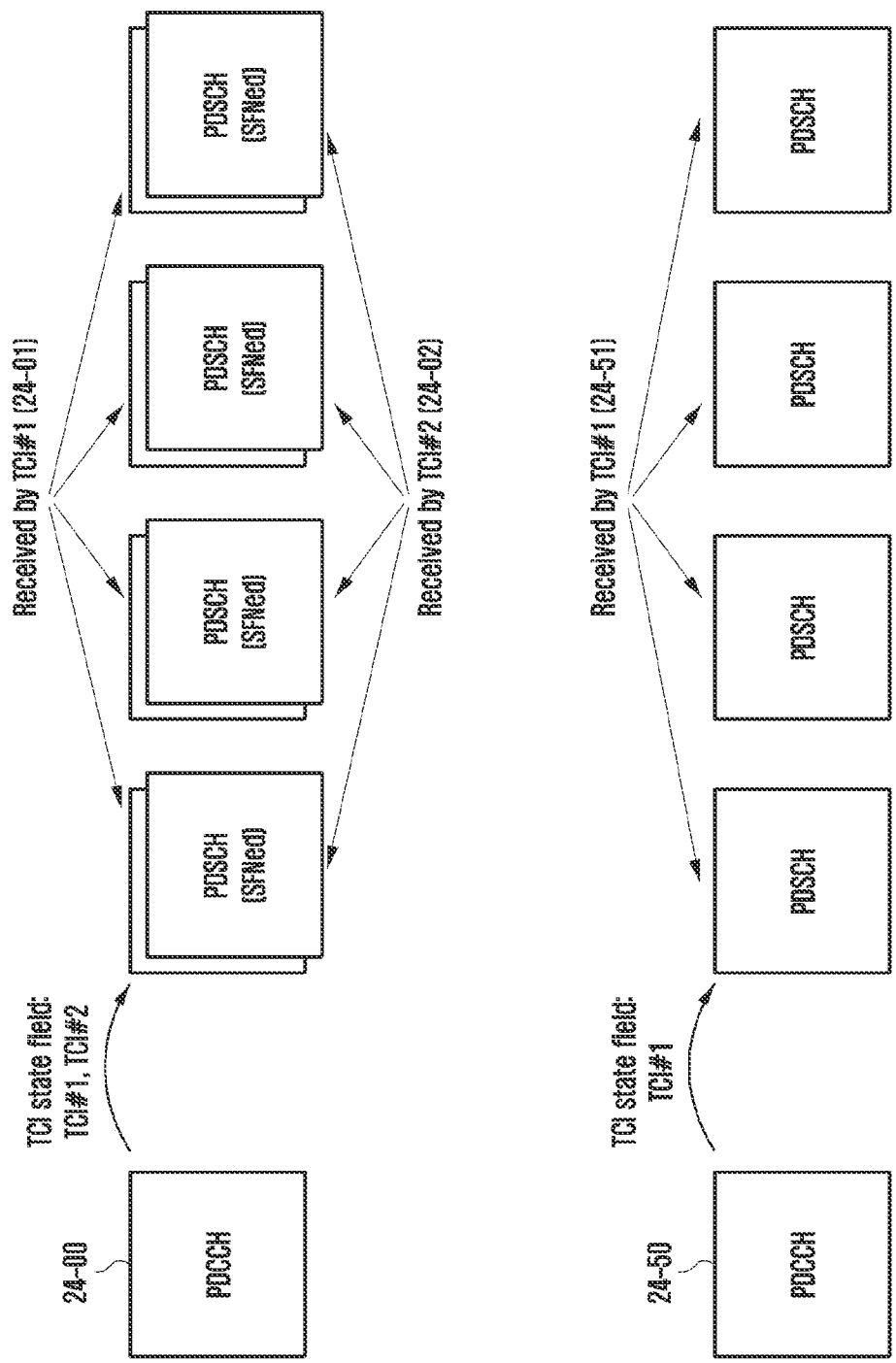
FIG. 24 illustrates a method for combining multi-TRP-based SFN PDSCH transmission and slot aggregation transmission according to an embodiment.

FIG. 24 illustrates a method for combining multi-TRP-based SFN PDSCH transmission and slot aggregation transmission according to an embodiment.

Referring to FIG. 24, a base station provides, to a UE, the indication and configuration of the above-described DCI field value and higher layer signaling (e.g., conditions 5-1-1 to 5-1-7), and then transmits a PDCCH to the UE (24-00). TCI states #1 and #2 may be indicated through the TCI state field in the corresponding PDCCH, and time and frequency resource allocation information may be indicated through one time domain resource allocation field and one frequency domain resource allocation field, respectively. Further, when pdsch-AggregationFactor, which is higher layer signaling, is configured to 4, the UE may repeatedly receive the corresponding SFN PDSCH transmission during 4 slots. During the four slots, the PDSCH transmission occasion in each slot may be determined by equally applying time and frequency resource allocation information indicated by DCI. The UE may receive the SFN-transmitted PDSCH by using two different TCI states (TCI states #1 and #2) at a resource location based on the corresponding time and frequency resource allocation information (24-01 and 24-02).

On the other hand, in a case of single TRP-based PDSCH transmission rather than multi-TRP-based SFN PDSCH transmission, the base station indicates and configures, for the UE, the above-described DCI field value and higher layer signaling (e.g., conditions 5-1-2, 5-1-3, 5-1-4, 5-1-6 and modified condition 5-1-1, modified condition 5-1-5, and modified condition 5-1-7) to the UE, and then transmits a PDCCH to the UE (24-50). TCI state #1 may be indicated through the TCI state field in the corresponding PDCCH, and time and frequency resource allocation information may be indicated through one time domain resource allocation field and one frequency domain resource allocation field, respectively. Further, when pdsch-AggregationFactor, which is higher layer signaling, is configured to 4, the UE may repeatedly receive the corresponding SFN PDSCH transmission during 4 slots. During the four slots, the PDSCH transmission occasion in each slot may be determined by equally applying time and frequency resource allocation information indicated by DCI. The UE may receive a single transmitted PDSCH by using TCI state #1 at a resource location based on the corresponding time and frequency resource allocation information (24-51).

(5-2)Th Embodiment: Method for Combining Multi-TRP-Based SFN PDSCH Transmission and Multi-TRP-Based TDM Scheme A When multi-TRP-based SFN PDSCH transmission and multi-TRP-based TDM scheme A transmission are combined, the operation of a base station and a UE will be described. When the base station schedules a combination method for multi-TRP-based SFN PDSCH transmission and multi-TRP-based TDM scheme A to the UE through DCI, conditions of a DCI field and conditions of higher layer signaling may be as follows. Meanwhile, the following conditions correspond only to examples, and the disclosure is not limited thereto.

- Condition 5-2-1) TCI state field in DCI: A codepoint of the TCI state field including two TCI states may be indicated.
- Condition 5-2-2) Antenna port field in DCI: The number of CDM groups may be one or more than one.
- Condition 5-2-3) Time domain resource allocation field in DCI: Only the above-described condition 3 (e.g., when all TDRA entries are not configured with repetition-Number, which is higher layer signaling) may be possible.
- Condition 5-2-4) Higher layer signaling repetition-Scheme: may be configured with TDM scheme A.
- Condition 5-2-5) Higher layer signalingStartingSymbolOffsetK may be configured or not. In addition, it may be expected that the corresponding higher layer signaling is unconditionally configured based on the UE capability.
- Condition 5-2-6) New higher layer signaling for the multi-TRP-based SFN PDSCH technique may be additionally configured.
- Condition 5-2-7) Additionally, the base station may configure for the UE whether to support a method for combining multi-TRP-based SFN PDSCH transmission and multi-TRP-based TDM scheme A transmission via new higher layer signaling.

On the other hand, in a case of multi-TRP-based TDM scheme A which is not combined with multi-TRP-based SFN PDSCH transmission, the following conditions among the above-described conditions may be different from those of the multi-TRP-based TDM scheme A combined with multi-TRP-based SFN PDSCH transmission.

- (Modified condition 5-2-2) In condition 5-2-2, the number of CDM groups may be one.
- (Modified condition 5-2-5) In condition 5-2-5, higher layer signaling StartingSymbolOffsetK may be configured or not.
- (Modified condition 5-2-6) In condition 5-2-6, new higher layer signaling for the multi-TRP-based SFN PDSCH technique may be additionally configured or not.
- (Modified condition 5-2-7) In condition 5-2-7, the base station may configure for the UE whether to support a method for combining multi-TRP-based SFN PDSCH transmission and multi-TRP-based TDM scheme A transmission via new higher layer signaling, or may not.

FIG. 25 illustrates a method for combining multi-TRP-based SFN PDSCH transmission and multi-TRP-based TDM scheme A transmission according to an embodiment.

Referring to FIG. 25, a base station provides the indication and configuration of the above-described DCI field value and higher layer signaling (e.g., conditions 5-2-1 to 5-2-6) to the UE, and then transmits a PDCCH to the UE (25-00). TCI states #1 and #2 may be indicated through the TCI state field in the corresponding PDCCH, and time and frequency resource allocation information may be indicated through one time domain resource allocation field and one frequency domain resource allocation field, respectively. As described above, the UE may determine the first reception occasion of a PDSCH based on the start symbol and the symbol length of the PDSCH indicated through the time domain resource allocation field in DCI. The start symbol of a second reception occasion of the PDSCH may correspond to an occasion to which a symbol offset equal to StartingSymbolOffsetK, which is higher layer signaling, is applied from the last symbol of the first transmission occasion, and a transmission occasion may be determined by the indicated symbol length therefrom. If the higher layer signaling, StartingSymbolOffsetK, is not configured, the symbol offset may be regarded as 0. The UE may receive the SFN PDSCH using both TCI states #1 and #2 at each PDSCH transmission occasion (25-01 and 25-02).

On the other hand, in a case of the multi-TRP-based TDM scheme A which is not combined with the multi-TRP-based SFN PDSCH transmission, the base station provides, to the UE, the indication and configuration of the above-described DCI field value and higher layer signaling (e.g., conditions 5-2-1, 5-2-3, and 5-2-4, the modified condition 5-2-2, the modified condition 5-2-5, the modified condition 5-2-6, and the modified condition 5-2-7), and then transmits a PDCCH to the UE (25-50). TCI states #1 and #2 may be indicated through the TCI state field in the corresponding PDCCH, and time and frequency resource allocation information may be indicated through one time domain resource allocation field and one frequency domain resource allocation field, respectively. As described above, the UE may determine the first reception occasion of the PDSCH based on the start symbol and the symbol length of the PDSCH indicated through the time domain resource allocation field in DCI. The start symbol of a second reception occasion of the PDSCH may be an occasion to which a symbol offset equal to StartingSymbolOffsetK, which is higher layer signaling, is applied from the last symbol of the first transmission occasion, and the transmission occasion may be determined by the indicated symbol length therefrom. If StartingSymbolOffsetK which is the higher layer signaling is not configured, the symbol offset may be regarded as 0. The UE may receive repeated PDSCH by applying TCI state #1 to the first PDSCH transmission occasion and applying TCI state #2 to the second PDSCH transmission occasion (25-51 and 25-52).

(5-3)Rd Embodiment: Method for Combining Multi-TRP-Based SFN PDSCH Transmission and Multi-TRP-Based TDM Scheme B W, when multi-TRP-based SFN PDSCH transmission and multi-TRP-based TDM scheme B transmission are combined, an operation of a base station and a UE will be described. When the base station schedules a combination Method for multi-TRP-based SFN PDSCH transmission and multi-TRP-based TDM scheme B to a UE through DCI, the conditions of the DCI field and the conditions of higher layer signaling may be as follows. Meanwhile, the following conditions correspond only to examples, and the disclosure is not limited thereto.

- Condition 5-3-1) TCI state field in DCI: A codepoint of the TCI state field including two TCI states may be indicated.
- Condition 5-3-2) Antenna port field in DCI: The number of CDM groups may be one or more.

Condition 5-3-3) Time domain resource allocation field in DCI: Only the above-described condition 1 (e.g., when at least one TDRA entry has been configured with repetitionNumber which is higher layer signaling, and the TDRA entry configured with repetitionNumber is indicated through the time domain resource allocation field in DCI) may be possible.

Condition 5-3-4) Even when repetitionNumber is greater than 2 in condition 5-3-3, tciMapping, which is higher layer signaling, may be configured or not.

Condition 5-3-5) Higher layer signaling repetitionScheme: may be configured or not.

Condition 5-3-6) New higher layer signaling for the multi-TRP-based SFN PDSCH technique may be additionally configured.

Condition 5-3-7) Additionally, the base station may configure, for the UE, whether to support a method for combining multi-TRP-based SFN PDSCH transmission and multi-TRP-based TDM scheme B transmission via new higher layer signaling.

On the other hand, in a case of multi-TRP-based TDM scheme B which is not combined with multi-TRP-based SFN PDSCH transmission, the following conditions among the above-described conditions may be different from the case of multi-TRP-based TDM scheme B combined with multi-TRP-based SFN PDSCH transmission.

(Modified condition 5-3-2) In condition 5-3-2, the number of CDM groups may be one.

(Modified condition 5-3-4) In condition 5-3-4, tciMapping, which is higher layer signaling, may be configured as one of cyclicalMapping and sequentialMapping.

(Modified condition 5-3-5) In condition 5-3-5, repetitionScheme may not be configured.

(Modified condition 5-3-6) In condition 5-3-6, new higher layer signaling for the multi-TRP-based SFN PDSCH technique may be additionally configured or not.

(Modified condition 5-3-7) In condition 5-3-7, the base station may configure for the UE whether to support a method for combining multi-TRP-based SFN PDSCH transmission and TDM scheme B transmission via new higher layer signaling, or may not.

Figure 26:
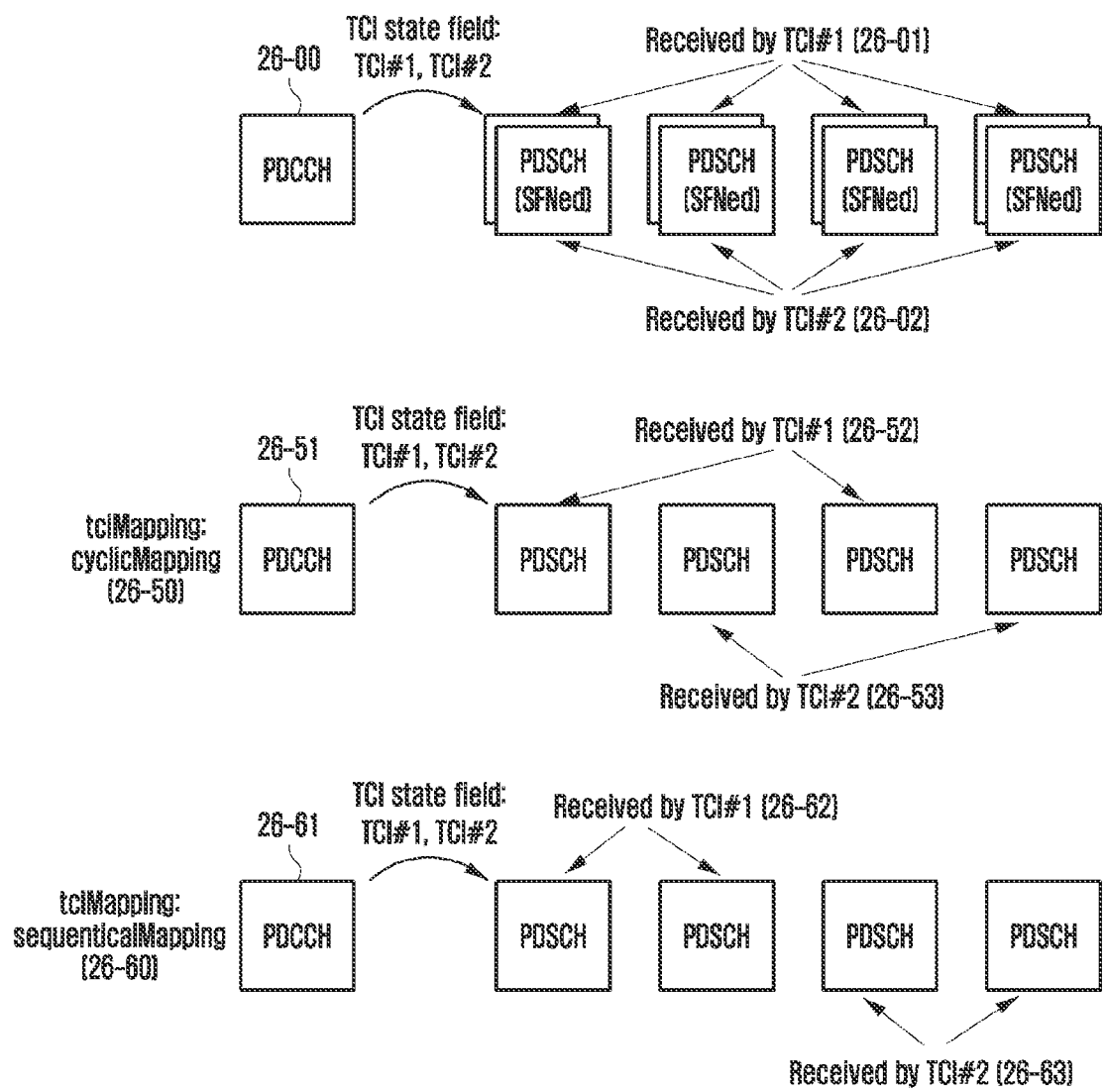
FIG. 26 illustrates a method for combining multi-TRP-based SFN PDSCH transmission and multi-TRP-based TDM scheme B transmission according to an embodiment.

FIG. 26 illustrates a method for combining multi-TRP-based SFN PDSCH transmission and multi-TRP-based TDM scheme B transmission according to an embodiment. A base station provides the indication and configuration of the above-described DCI field value and higher layer signaling (e.g., conditions 5-3-1 to 5-3-7) to the UE, and then transmits a PDCCH to the UE (26-00). TCI states #1 and #2 may be indicated through the TCI state field in the corresponding PDCCH, and time and frequency resource allocation information may be indicated through one time domain resource allocation field and one frequency domain resource allocation field, respectively. As described above, the UE includes one PDSCH transmission occasion in one slot, and may receive repetitive transmission based on the start symbol and symbol length of the same PDSCH during a slot equal to the number of repetitionNumber indicated through the time domain resource allocation field in DCI. FIG. 26 illustrates a case in which the UE receives an indication of a TDRA entry configured with the repetitionNumber of 4. The UE may receive the SFNed PDSCH by using both TCI states #1 and #2 at each PDSCH transmission occasion regardless of whether higher layer signaling tciMapping is not configured or whether one of cyclicMapping and sequentialMapping is configured (26-01 and 26-02).

On the other hand, in a case of the multi-TRP-based TDM scheme B which is not combined with the multi-TRP-based SFN PDSCH transmission, the base station provides, to the UE, the indication and configuration of the above-described DCI field value and higher layer signaling (e.g., conditions 5-3-1 and 5-3-3, the modified condition 5-3-4, the modified condition 5-3-5, the modified condition 5-3-6, and the modified condition 5-3-7), and then transmits a PDCCH to the UE (26-51). TCI states #1 and #2 may be indicated through the TCI state field in the corresponding PDCCH, and time and frequency resource allocation information may be indicated through one time domain resource allocation field and one frequency domain resource allocation field, respectively. As described above, the UE includes one PDSCH transmission occasion in one slot, and may receive repetitive transmission based on the start symbol and symbol length of the same PDSCH during a slot equal to the number of repetitionNumber indicated through the time domain resource allocation field in DCI. FIG. 26 illustrates a case in which the UE receives an indication of a TDRA entry configured with the repetitionNumber of 4. When the higher layer signaling tciMapping is configured as cyclicMapping (26-50), the UE may apply TCI states #1 and #2 to the first and second PDSCH transmission occasions, respectively, and may apply this TCI state application method to the remaining PDSCH transmission occasions in the same manner, so as to receive PDSCH repetitive transmission (26-52 and 26-53, respectively). When the higher layer signaling tciMapping is configured as sequentialMapping (26-60), a PDCCH is transmitted to the UE (26-51) and the UE may apply TCI state #1 to the first and second PDSCH transmission occasions, may apply TCI state #2 to the third and fourth PDSCH transmission occasions, and may apply this TCI state application method to the remaining PDSCH transmission occasions in the same manner, so as to receive PDSCH repetitive transmission (26-62 and 26-63, respectively).

(5-4)Th Embodiment: Method for Applying Three or More Transmission Beams During Multi-TRP-Based SFN PDSCH Transmission A method for applying three or more transmission beams during transmission of a multi-TRP-based SFN PDSCH will be described. When receiving PDSCH transmission performed from three or more TRPs, the UE may consider the SFN transmission and repetitive transmission based on a time resource division method in order to increase the reliability. Here, when only reception of up to two transmission beams at each reception time is possible due to UE implementation (limitation on the number of panels in the UE) or signal processing-related limitations (limitations on the number of simultaneous reception beams or the number of simultaneously processable QCL information), one the methods listed below or a combination of some of the methods listed below may be considered.

Method 5-4-1 Method for Intra-Slot Repetitive Transmission Using Three or More Transmission Beams During Multi-TRP-Based SFN PDSCH Transmission Using Two TCI State Fields A method for intra-slot repetitive transmission using three or more transmission beams during multi-TRP-based SFN PDSCH transmission using two TCI state fields will be described. A UE may receive a PDCCH from a base station and may expect that there are two TCI state fields for the corresponding PDCCH. In this case, each codepoint indicated by each TCI state field may include up to two TCI states. In a case of scheduling a technique of using three or more transmission beams during multi-TRP-based SFN PDSCH transmission using two TCI state fields to the UE, the conditions of the DCI field and the conditions of higher layer signaling may be as follows. Meanwhile, the following conditions correspond only to an example, and the disclosure is not limited thereto.

- Condition 5-4-1-1) Two TCI state fields in DCI: The UE may receive DCI including two TCI state fields from the base station, and each codepoint indicated by each TCI state field may include up to two TCIs state, and at least one of the two TCI state fields may include two TCI states.
- Condition 5-4-1-2) Antenna port field in DCI: The number of CDM groups may be one or more.
- Condition 5-4-1-3) Time domain resource allocation field in DCI: The above-mentioned condition 3 (e.g., when all TDRA entries are not configured with repetitionNumber, which is higher layer signaling) may be possible.
- Condition 5-4-1-4) Higher layer signaling StartingSymbolOffsetK may be configured or not. In addition, it may be expected that the corresponding higher layer signaling is unconditionally configured based on the UE capability.
- Condition 5-4-1-5) Higher layer signaling repetitionScheme: may be configured with TDM scheme A.
- Condition 5-4-1-6) New higher layer signaling for the multi-TRP-based SFN PDSCH technique may be additionally configured.
- Condition 5-4-1-7) Additionally, the base station may additionally configure, for the UE, new higher layer signaling for indicating DCI in which two TCI state fields exist.

FIG. 27 illustrates an intra-slot repetitive transmission method using three or more transmission beams during multi-TRP-based SFN PDSCH transmission using two TCI state fields according to an embodiment.

Referring to FIG. 27, a base station provides the indication and configuration of the above-described DCI field value and higher layer signaling (e.g., conditions 5-4-1-1 to 5-4-1-7) to the UE, and then transmits a PDCCH to the UE (27-00). TCI states #1 and #2 may be indicated through the first TCI state field in the corresponding PDCCH, and TCI state #3 may be indicated through the second TCI state field (27-01). In addition, time and frequency resource allocation information may be indicated through one time domain resource allocation field and one frequency domain resource allocation field, respectively. As described above, the UE may determine the first reception occasion of a PDSCH based on the start symbol and the symbol length of the PDSCH indicated through the time domain resource allocation field in DCI. The start symbol of a second reception occasion of the PDSCH may correspond to an occasion to which a symbol offset equal to StartingSymbolOffsetK, which is higher layer signaling, is applied from the last symbol of the first transmission occasion, and a transmission occasion may be determined by the indicated symbol length therefrom. If the higher layer signaling, StartingSymbolOffsetK, is not configured, the symbol offset may be regarded as 0. The UE may receive an SFN-transmitted PDSCH by using both TCI states #1 and #2 at the first PDSCH transmission occasion (27-02 and 27-03), and may receive a single transmitted PDSCH by using TCI state #3 at the second PDSCH transmission occasion (27-04).

As another example, the base station provides, to the UE, the indication and configuration of the above-described DCI field value and higher layer signaling (e.g., conditions 5-4-1-1 to 5-4-1-7), and then transmits a PDCCH to the UE (27-50). TCI states #1 and #2 may be indicated through the first TCI state field in the corresponding PDCCH, and TCI states #3 and #4 may be indicated through the second TCI state field (27-51). In addition, time and frequency resource allocation information may be indicated through one time domain resource allocation field and one frequency domain resource allocation field, respectively. As described above, the UE may determine the first reception occasion of a PDSCH based on the start symbol and the symbol length of the PDSCH indicated through the time domain resource allocation field in DCI. The start symbol of a second reception occasion of the PDSCH may correspond to an occasion to which a symbol offset equal to StartingSymbolOffsetK, which is higher layer signaling, is applied from the last symbol of the first transmission occasion, and a transmission occasion may be determined by the indicated symbol length therefrom. If the higher layer signaling, StartingSymbolOffsetK, is not configured, the symbol offset may be regarded as 0. The UE may receive an SFN-transmitted PDSCH by using both TCI states #1 and #2 at the first PDSCH transmission occasion (27-52 and 27-53), and may receive the SFN-transmitted PDSCH by using both TCI states #3 and #4 at the second PDSCH transmission occasion (27-54 and 27-55).

Method 5-4-2 Method for Inter-Slot Repetitive Transmission Using Three or More Transmission Beams During Multi-TRP-Based SFN PDSCH Transmission Using Two TCI State Fields A method for inter-slot repetitive transmission using three or more transmission beams during multi-TRP-based SFN PDSCH transmission using two TCI state fields will be described. A UE may receive a PDCCH from a base station and may expect that there are two TCI state fields for the corresponding PDCCH. In this case, each codepoint indicated by each TCI state field may include up to two TCI states. In a case of scheduling a technique of using three or more transmission beams during multi-TRP-based SFN PDSCH transmission using two TCI state fields to the UE, the conditions of the DCI field and the conditions of higher layer signaling may be as follows. Meanwhile, the following conditions correspond only to an example, and the disclosure is not limited thereto.

- Condition 5-4-2-1) Two TCI state fields in DCI: The UE may receive DCI including two TCI state fields from the base station, and each codepoint indicated by each TCI state field may include up to two TCIs state, and at least one of the two TCI state fields may include two TCI states.
- Condition 5-4-2-2) Antenna port field in DCI: The number of CDM groups may be one or more.
- Condition 5-4-2-3) Time domain resource allocation field in DCI: the above-described condition 1 (e.g., when at least one TDRA entry has been configured with repetitionNumber which is higher layer signaling, and the TDRA entry configured with repetitionNumber is indicated through the time domain resource allocation field in DCI) may be possible.
- Condition 5-4-3-4) with regard to a case in which repetitionNumber is greater than 2 in condition 5-4-3-3, tciMapping, which is higher layer signaling, may be configured as one of cyclicMapping and sequentialMapping.
- Condition 5-4-3-5) Higher layer signaling repetitionScheme: may not be configured.

Condition 5-4-3-6) New higher layer signaling for the multi-TRP-based SFN PDSCH technique may be additionally configured.

Condition 5-4-3-7) Additionally, the base station may additionally configure, for the UE, new higher layer signaling for indicating DCI in which two TCI state fields exist.

Figure 28A:
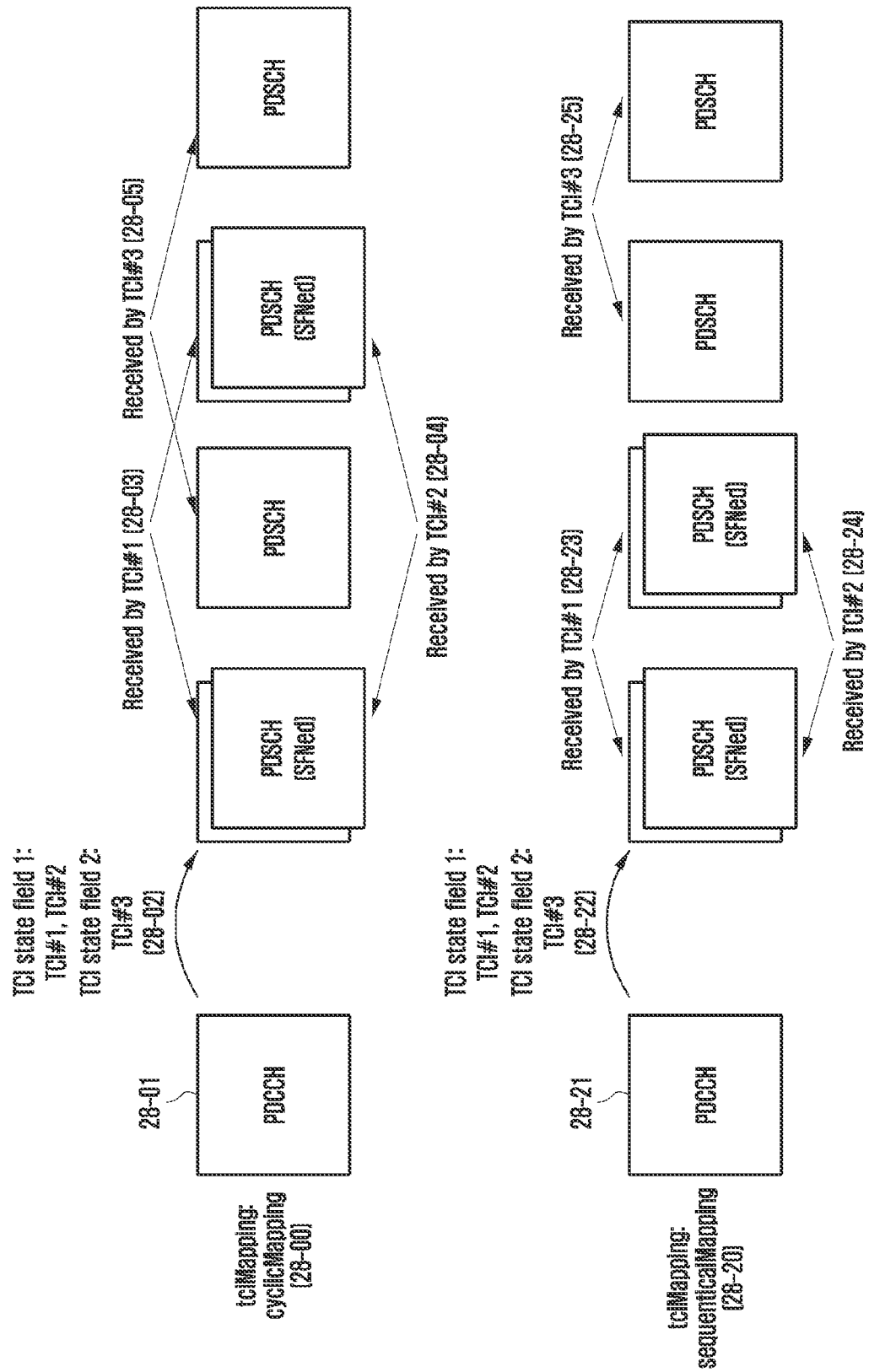
FIG. 28A illustrates an inter-slot repetitive transmission method using three or more transmission beams during multi-TRP-based SFN PDSCH transmission using two TCI state fields according to an embodiment.
Figure 28B:
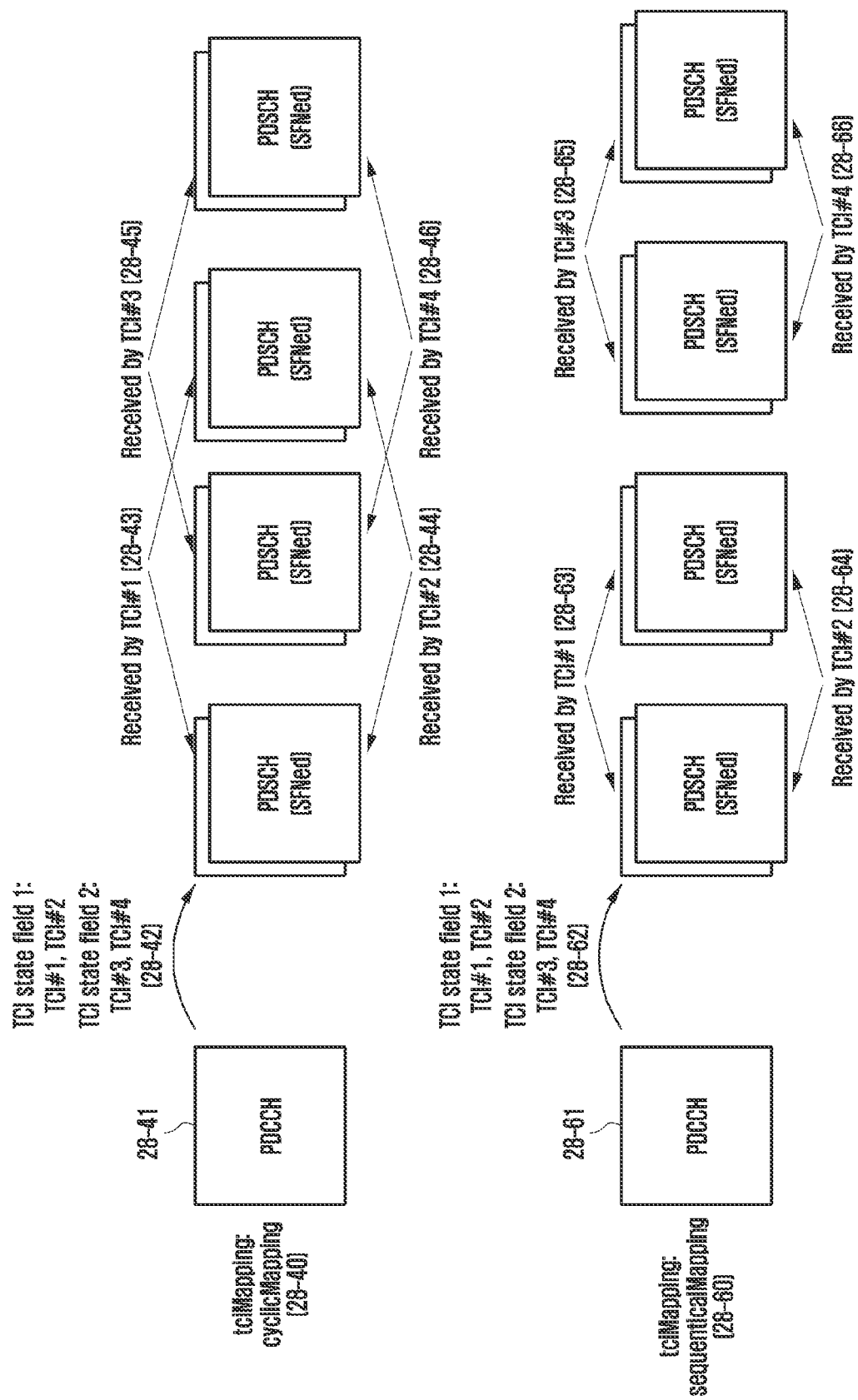
FIG. 28B illustrates an inter-slot repetitive transmission method using three or more transmission beams during multi-TRP-based SFN PDSCH transmission using two TCI state fields according to an embodiment.

FIG. 28A illustrates an inter-slot repetitive transmission method using three or more transmission beams during multi-TRP-based SFN PDSCH transmission using two TCI state fields according to an embodiment, and FIG. 28B illustrates an inter-slot repetitive transmission method using three or more transmission beams during multi-TRP-based SFN PDSCH transmission using two TCI state fields according to an embodiment.

Referring to FIG. 28, a base station provides the indication and configuration of the above-described DCI field value and higher layer signaling (e.g., conditions 5-4-3-1 to 5-4-3-7) to the UE, and then transmits a PDCCH to the UE (28-00, 28-01, 28-20 and 28-21). TCI states #1 and #2 may be indicated through the first TCI state field in the corresponding PDCCH, and TCI state #3 may be indicated through the second TCI state field (28-02 and 28-22). In addition, time and frequency resource allocation information may be indicated through one time domain resource allocation field and one frequency domain resource allocation field, respectively. As described above, the UE includes one PDSCH transmission occasion in one slot, and may receive repetitive transmission based on the start symbol and symbol length of the same PDSCH during a slot equal to the number of repetitionNumber indicated through the time domain resource allocation field in DCI. FIG. 28A illustrates a case in which the UE receives an indication of a TDRA entry configured with the repetitionNumber of 4. When the higher layer signaling tciMapping is configured as cyclicMapping (28-00), the UE may apply TCI states #1 and #2 to the first PDSCH transmission occasion, may apply TCI state #3 to the second PDSCH transmission occasion, and may apply this TCI state application method to the remaining PDSCH transmission occasions in the same manner, so as to receive PDSCH repetitive transmission (28-03, 28-04, and 28-05). When the higher layer signaling tciMapping is configured as sequentialMapping (28-20), the UE may apply TCI states #1 and #2 to the first and second PDSCH transmission occasions, may apply TCI state #3 to the third and fourth PDSCH transmission occasions, and may apply this TCI state application method to the remaining PDSCH transmission occasions in the same manner, so as to receive PDSCH repetitive transmission (28-23, 28-24, and 28-25).

As another example, referring to FIG. 28B, a base station provides the indication and configuration of the above-described DCI field value and higher layer signaling (e.g., conditions 5-4-3-1 to 5-4-3-7) to the UE, and then transmits a PDCCH to the UE (28-41 and 28-61). TCI states #1 and #2 may be indicated through the first TCI state field in the corresponding PDCCH, and TCI states #3 and #4 may be indicated through the second TCI state field (28-42 and 28-62). In addition, time and frequency resource allocation information may be indicated through one time domain resource allocation field and one frequency domain resource allocation field, respectively. As described above, the UE includes one PDSCH transmission occasion in one slot, and may receive repetitive transmission based on the start symbol and symbol length of the same PDSCH during a slot equal to the number of repetitionNumber indicated through the time domain resource allocation field in DCI. FIG. 28B illustrates a case in which the UE receives an indication of a TDRA entry configured with the repetitionNumber of 4. When the higher layer signaling tciMapping is configured as cyclicMapping (28-40), the UE may apply TCI states #1 and #2 to the first PDSCH transmission occasion, may apply TCI states #3 and #4 to the second PDSCH transmission occasion, and may apply this TCI state application method to the remaining PDSCH transmission occasions in the same manner, so as to receive PDSCH repetitive transmission (28-43, 28-44, 28-45, and 28-46). When the higher layer signaling tciMapping is configured as sequentialMapping (28-60), the UE may apply TCI states #1 and #2 to the first and second PDSCH transmission occasions, may apply TCI states #3 and #4 to the third and fourth PDSCH transmission occasions, and may apply this TCI state application method to the remaining PDSCH transmission occasions in the same manner, so as to receive PDSCH repetitive transmission (28-63, 28-64, 28-65, and 28-66).

Method 5-4-3 Method for Intra-Slot Repetitive Transmission Using Three or More Transmission Beams During Multi-TRP-Based SFN PDSCH Transmission Using One TCI State Field and a TCI State of a Control Resource Set A method for intra-slot repetitive transmission using three or more transmission beams during multi-TRP-based SFN PDSCH transmission using one TCI state field in DCI and a TCI state of a control resource set will be described. A UE may receive a PDCCH from a base station and may expect that one TCI state field exists for the corresponding PDCCH. In this case, each codepoint indicated by the TCI state field may include up to two TCI states. In a case of scheduling a technique of using three or more transmission beams during multi-TRP-based SFN PDSCH transmission using one TCI state field to the UE, the conditions of the DCI field and the conditions of higher layer signaling may be as follows. Meanwhile, the following conditions correspond only to an example, and the disclosure is not limited thereto.

Condition 5-4-3-1) One TCI state fields in DCI: The UE may receive DCI including one TCI state field from the base station, and each codepoint indicated by each TCI state field may include up to two TCIs states.

Condition 5-4-3-2) Antenna port field in DCI: The number of CDM groups may be one or more.

Condition 5-4-3-3) Time domain resource allocation field in DCI: The above-mentioned condition 3 (e.g., when all TDRA entries are not configured with repetitionNumber, which is higher layer signaling) may be possible.

Condition 5-4-3-4) Higher layer signaling StartingSymbolOffsetK may be configured or not. In addition, it may be expected that the corresponding higher layer signaling is unconditionally configured based on the UE capability.

Condition 5-4-3-5) Higher layer signaling repetitionScheme: may be configured with TDM scheme A.

Condition 5-4-3-6) New higher layer signaling for the multi-TRP-based SFN PDSCH technique may be additionally configured.

Condition 5-4-3-7) Additionally, the base station may additionally configure, for the UE, new higher layer signaling with regard to a method for intra-slot repetitive transmission using three or more transmission beams during multi-TRP-based SFN PDSCH transmission using one TCI state field in DCI and a TCI state of a control resource set.

FIG. 29 illustrates an intra-slot repetitive transmission method using three or more transmission beams during multi-TRP-based SFN PDSCH transmission using one TCI state and a TCI state of a control resource set according to an embodiment.

Referring to FIG. 29, a base station provides the indication and configuration of the above-described DCI field value and higher layer signaling (e.g., conditions 5-4-3-1 to 5-4-1-7) to the UE, and then transmits a PDCCH to the UE (29-00). Here, the control resource set may be received using TCI state #3 (29-01). TCI states #1 and #2 may be indicated through the TCI state field in the corresponding PDCCH (29-02), and time and frequency resource allocation information may be indicated through one time domain resource allocation field and one frequency domain resource allocation field, respectively. As described above, the UE may determine the first reception occasion of a PDSCH based on the start symbol and the symbol length of the PDSCH indicated through the time domain resource allocation field in DCI. The start symbol of a second reception occasion of the PDSCH may correspond to an occasion to which a symbol offset equal to StartingSymbolOffsetK, which is higher layer signaling, is applied from the last symbol of the first transmission occasion, and a transmission occasion may be determined by the indicated symbol length therefrom. If the higher layer signaling, StartingSymbolOffsetK, is not configured, the symbol offset may be regarded as 0. The UE may receive an SFN-transmitted PDSCH by using both TCI states #1 and #2 indicated through the DCI at the first PDSCH transmission occasion (29-03 and 29-04), and may receive a single transmitted PDSCH by using TCI state #3 of the control resource set at the second PDSCH transmission occasion (29-05).

As another example, the base station provides, to the UE, the indication and configuration of the above-described DCI field value and higher layer signaling (e.g., conditions 5-4-3-1 to 5-4-3-7), and then transmits a PDCCH to the UE (29-50). Here, the control resource set may be received by assuming SFN transmission using TCI states #3 and #4 (29-51 and 29-52). TCI states #1 and #2 may be indicated through the TCI state field in the corresponding PDCCH (29-53), and time and frequency resource allocation information may be indicated through one time domain resource allocation field and one frequency domain resource allocation field, respectively. As described above, the UE may determine the first reception occasion of a PDSCH based on the start symbol and the symbol length of the PDSCH indicated through the time domain resource allocation field in DCI. The start symbol of a second reception occasion of the PDSCH may correspond to an occasion to which a symbol offset equal to StartingSymbolOffsetK, which is higher layer signaling, is applied from the last symbol of the first transmission occasion, and a transmission occasion may be determined by the indicated symbol length therefrom. If the higher layer signaling, StartingSymbolOffsetK, is not configured, the symbol offset may be regarded as 0. The UE may receive an SFN-transmitted PDSCH by using both TCI states #1 and #2 indicated through the DCI at the first PDSCH transmission occasion (29-54 and 29-55), and may receive the SFN-transmitted PDSCH by using both TCI states #3 and #4 of the control resource set at the second PDSCH transmission occasion (29-56 and 29-57).

Method 5-4-4 Method for Inter-Slot Repetitive Transmission Using Three or More Transmission Beams During Multi-TRP-Based SFN PDSCH Transmission Using One TCI State Field and a TCI State of a Control Resource Set A method for intra-slot repetitive transmission using three or more transmission beams during multi-TRP-based SFN PDSCH transmission using one TCI state field in DCI and a TCI state of a control resource set will be described. A UE may receive a PDCCH from a base station and may expect that one TCI state field exists for the corresponding PDCCH. In this case, each codepoint indicated by the TCI state field may include up to two TCI states. In a case of scheduling a technique of using three or more transmission beams during multi-TRP-based SFN PDSCH transmission using one TCI state field and a TCI state of a control resource set to the UE, the conditions of the DCI field and the conditions of higher layer signaling may be as follows. Meanwhile, the following conditions correspond only to an example, and the disclosure is not limited thereto.

Condition 5-4-4-1) One TCI state fields in DCI: The UE may receive DCI including one TCI state field from the base station, and each codepoint indicated by each TCI state field may include up to two TCIs states.

Condition 5-4-4-2) Antenna port field in DCI: The number of CDM groups may be one or more.

Condition 5-4-4-3) Time domain resource allocation field in DCI: The above-mentioned condition 1 (e.g., when at least one TDRA entry has been configured with repetitionNumber, which is higher layer signaling, and the TDRA entry configured with repetitionNumber is indicated through the time domain resource allocation field in DCI) may be possible.

Condition 5-4-4-4) Even when repetitionNumber is greater than 2 in condition 5-4-4-3, tciMapping, which is higher layer signaling, may be configured as one of cyclicMapping and sequentialMapping.

Condition 5-4-4-5) Higher layer signaling repetitionScheme: may not be configured.

Condition 5-4-4-6) New higher layer signaling for the multi-TRP-based SFN PDSCH technique may be additionally configured.

Condition 5-4-4-7) Additionally, the base station may additionally configure, for the UE, new higher layer signaling with regard to a method for inter-slot repetitive transmission using three or more transmission beams during multi-TRP-based SFN PDSCH transmission using one TCI state field in DCI and a TCI state of a control resource set.

Figure 30A:
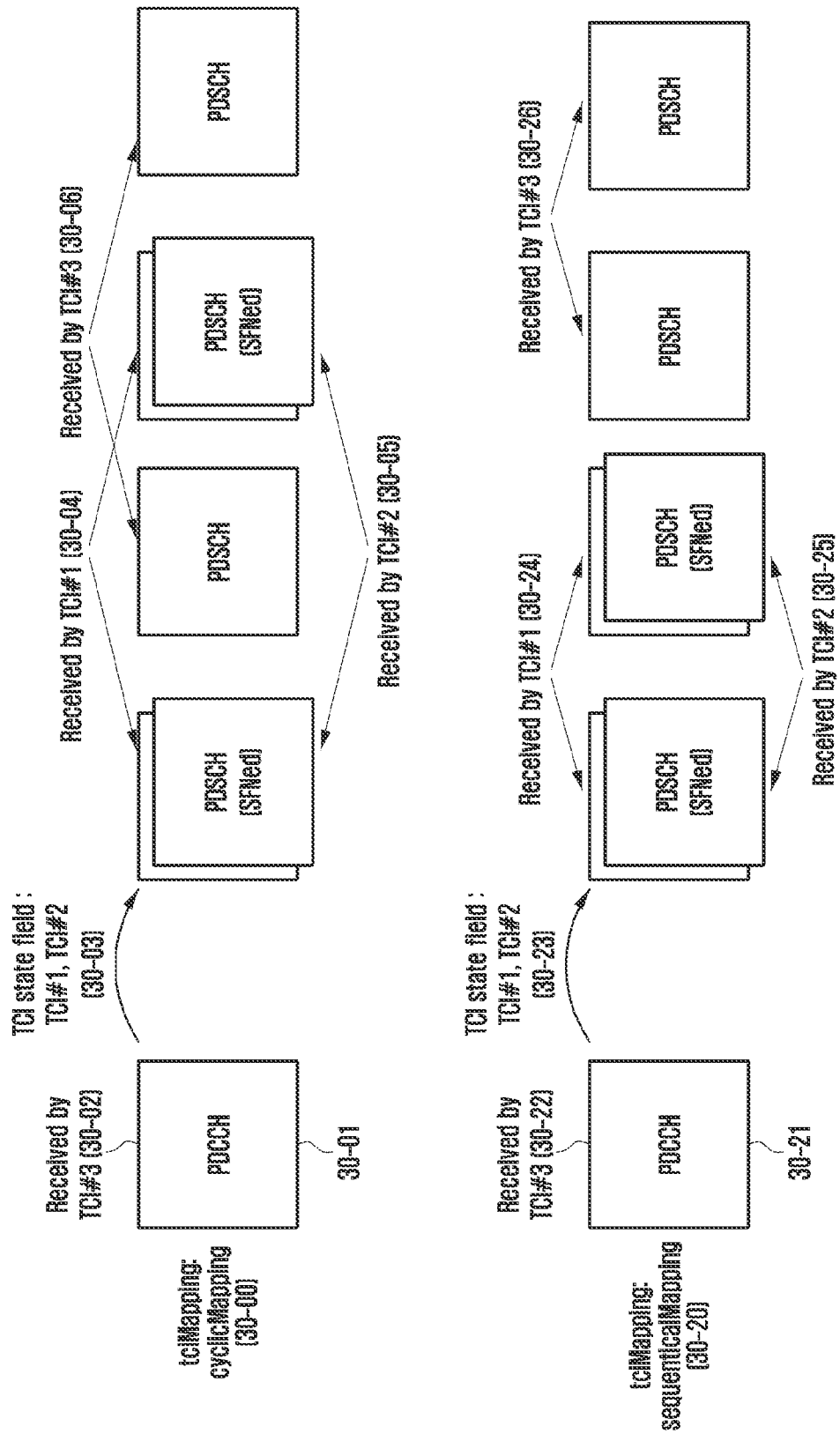
FIG. 30A illustrates an inter-slot repetitive transmission method using three or more transmission beams during multi-TRP-based SFN PDSCH transmission using one TCI state and a TCI state of a control resource set according to an embodiment.
Figure 30B:
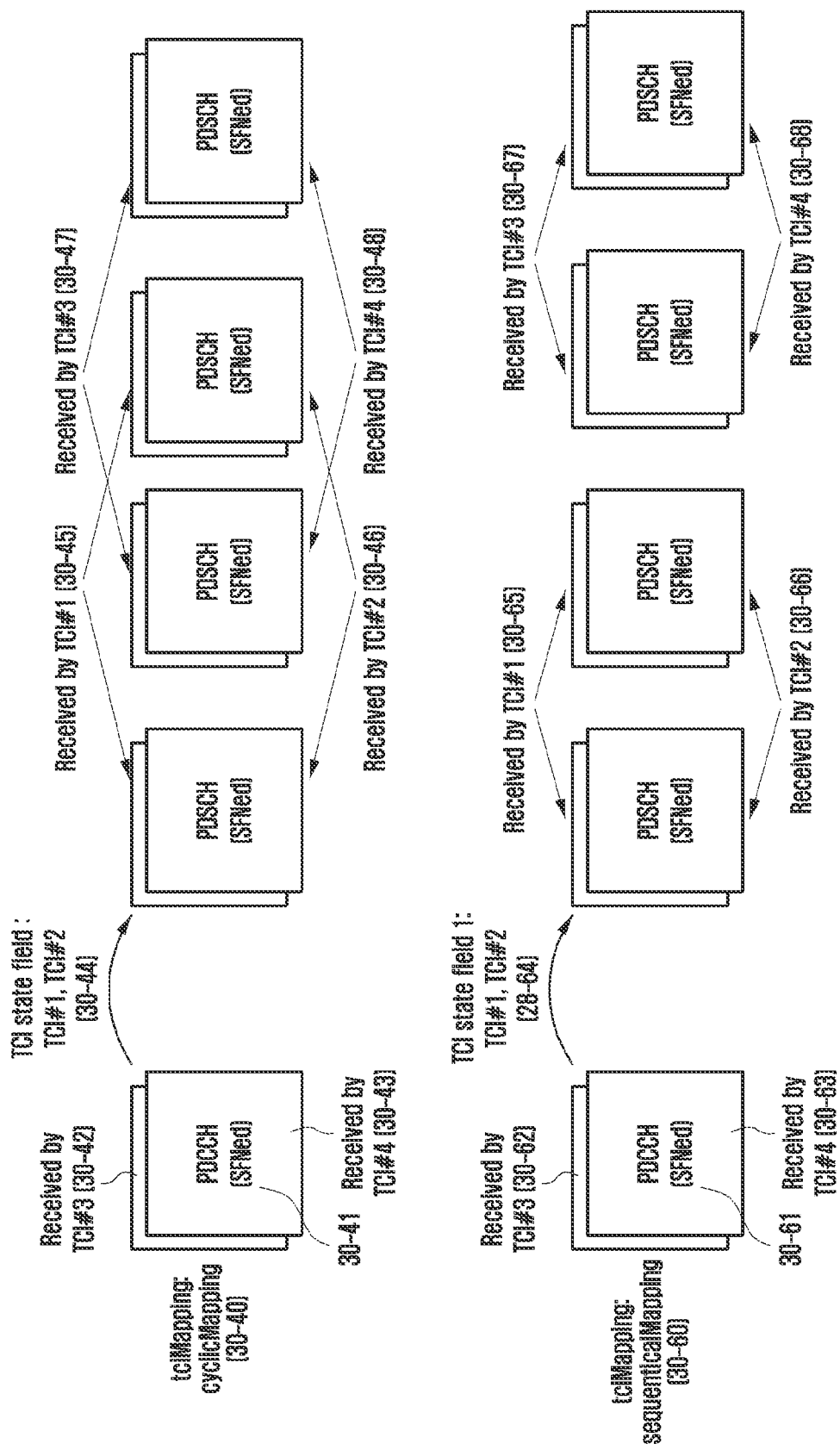
FIG. 30B illustrates another inter-slot repetitive transmission method using three or more transmission beams during multi-TRP-based SFN PDSCH transmission using one TCI state and a TCI state of a control resource set according to an embodiment.

FIG. 30A illustrates an inter-slot repetitive transmission method using three or more transmission beams during multi-TRP-based SFN PDSCH transmission using one TCI state and a TCI state of a control resource set according to an embodiment, and FIG. 30B illustrates another inter-slot repetitive transmission method using three or more transmission beams during multi-TRP-based SFN PDSCH transmission using one TCI state and a TCI state of a control resource set according to an embodiment.

Referring to FIG. 30A, a base station provides the indication and configuration of the above-described DCI field value and higher layer signaling (e.g., conditions 5-4-4-1 to 5-4-4-7) to the UE, and then transmits a PDCCH to the UE (30-01 and 30-21). Here, the control resource set may be received using TCI state #3 (30-02 and 30-22). TCI states #1 and #2 may be indicated through the TCI state field in the corresponding PDCCH (30-03 and 30-23). In addition, time and frequency resource allocation information may be indicated through one time domain resource allocation field and one frequency domain resource allocation field, respectively. As described above, the UE may include one PDSCH transmission occasion in one slot, and may receive repetitive transmission based on the start symbol and symbol length of the same PDSCH during a slot equal to the number of repetitionNumber indicated through the time domain resource allocation field in DCI. FIG. 30A illustrates a case in which the UE receives an indication of a TDRA entry configured with the repetitionNumber of 4. When the higher layer signaling tciMapping is configured as cyclicMapping (30-00), the UE may apply both TCI states #1 and #2 indicated through DCI to the first PDSCH transmission occasion by assuming SFN transmission, may apply the TCI state #3 configured in the control resource set to the second PDSCH transmission occasion by assuming single PDSCH transmission, and may apply this TCI state application method to the remaining PDSCH transmission occasions in the same manner, so as to receive PDSCH repetitive transmission (30-04, 30-05, and 30-06). When the higher layer signaling tciMapping is configured as sequentialMapping (30-20), the UE may apply both TCI states #1 and #2 indicated through DCI to the first and second PDSCH transmission occasions by assuming SFN transmission, may apply the TCI state #3 configured in the control resource set to the third and fourth PDSCH transmission occasions by assuming single PDSCH transmission, and may apply this TCI state application method to the remaining PDSCH transmission occasions in the same manner, so as to receive PDSCH repetitive transmission (30-24, 30-25, and 30-26).

As another example, referring to FIG. 30B, the base station provides, to the UE, the indication and configuration of the above-described DCI field value and higher layer signaling (e.g., conditions 5-4-4-1 to 54-4-7), and then transmits a PDCCH to the UE (30-41 and 30-61). Here, the control resource set may be received using TCI states #3 and #4 (3042, 3043, 30-62, and 30-63). TCI states #1 and #2 may be indicated through the TCI state field in the corresponding PDCCH (3044 and 30-64). In addition, time and frequency resource allocation information may be indicated through one time domain resource allocation field and one frequency domain resource allocation field, respectively. As described above, the UE includes one PDSCH transmission occasion in one slot, and may receive repetitive transmission based on the start symbol and symbol length of the same PDSCH during a slot equal to the number of repetitionNumber indicated through the time domain resource allocation field in DCI. FIG. 30B illustrates a case in which the UE receives an indication of a TDRA entry configured with the repetitionNumber of 4. When the higher layer signaling tciMapping is configured as cyclicMapping (30-40), the UE may apply both TCI states #1 and #2 indicated through DCI to the first PDSCH transmission occasion by assuming SFN transmission, may apply the TCI states #3 and #4 configured in the control resource set to the second PDSCH transmission occasion by assuming single PDSCH transmission, and may apply this TCI state application method to the remaining PDSCH transmission occasions in the same manner, so as to receive PDSCH repetitive transmission (30-45, 30-46, 30-47, and 30-48). When the higher layer signaling tciMapping is configured as sequentialMapping (30-60), the UE may apply both TCI states #1 and #2 indicated through DCI to the first and second PDSCH transmission occasions by assuming SFN transmission, may apply the TCI states #3 and #4 configured in the control resource set to the third and fourth PDSCH transmission occasions by assuming SFN transmission, and may apply this TCI state application method to the remaining PDSCH transmission occasions in the same manner, so as to receive PDSCH repetitive transmission (30-65, 30-66, 30-67, and 30-68).

In the above-mentioned Method 5-4-1 and Method 5-4-2, the UE may apply a transmission beam mapping method to each PDSCH transmission occasion even with regard to a case in which each codepoint of one TCI state field indicates three or more TCI states in the similar manner as described above, in addition to the method based on two TCI state fields in DCI. Here, after reporting of UE capability capable of receiving an indication of three or more TCI states through one TCI state field and base station configuration corresponding thereto (e.g., tci-PresentInDCImMoreThan2 which is higher layer signaling), the UE may be indicated with three or more TCI states based on the one TCI state field.

For example, with regard to an inter-slot repetitive transmission using three or more transmission beams during multi-TRP-based SFN PDSCH transmission, when TCI states #1, #2, #3 are indicated by one TCI state field, the TDRA entry configured with the repetitionNumber of 4 is indicated by the time domain resource allocation field, and the higher layer signaling tciMapping is configured as cyclicMapping, the UE may apply both TCI states #1 and #2 to the first PDSCH transmission occasion by assuming SFN transmission, may apply the TCI state #3 to the second PDSCH transmission occasion, and may apply this TCI state application method to the remaining PDSCH transmission occasions in the same manner, so as to receive PDSCH repetitive transmission. As another example, with regard to an inter-slot repetitive transmission using three or more transmission beams during multi-TRP-based SFN PDSCH transmission, when TCI states I #1, #2, #3 are indicated by one TCI state field, the TDRA entry configured with the repetitionNumber of 4 is indicated by the time domain resource allocation field, and the higher layer signaling tciMapping is configured as sequentialMapping, the UE may apply both TCI states #1 and #2 to the first and second PDSCH transmission occasions by assuming SFN transmission, may apply the TCI state #3 to the third and fourth PDSCH transmission occasions, and may apply this TCI state application method to the remaining PDSCH transmission occasions in the same manner, so as to receive PDSCH repetitive transmission.

(5-5)Th Embodiment: UE Capability Reporting Method

A UE may report, to a base station, at least one of the following UE capabilities, as information related to whether to support the above-described multi-TRP-based SFN PDSCH technique, a combination with other techniques (e.g., slot aggregation, multi-TRP-based TDM schemes A and B), and methods for applying three or more transmission beams. Meanwhile, the UE capabilities listed below are only examples, and the disclosure is not limited thereto.

1) Whether to support multi-TRP-based SFN PDSCH technique.

2) Whether to support a combination of multi-TRP-based SFN PDSCH technique and slot aggregation technique.

3) Whether to support a combination of multi-TRP-based SFN PDSCH technique and multi-TRP-based TDM scheme A technique.

4) Whether to support a combination of multi-TRP-based SFN PDSCH technique and multi-TRP-based TDM scheme B technique.

5) Whether each of the above Method 5-4-1 to Method 5-4-4 is possible.

6) A possible transmission beam mapping method (e.g., cyclicMapping or sequentialMapping) when the above Method 5-4-2 and Method 5-4-4 are supported.

7) The maximum number of TCI states that can be indicated for scheduled PDSCH transmission or repetitive transmission (e.g., 2, 3, or 4) when the above Method 5-4-1 and Method 5-4-2 are supported.

8) Whether indication of a plurality of TCI state fields (e.g., two TCI state fields) is possible when the above Method 5-4-1 and Method 5-4-2 are supported.

9) When the indication of a plurality of TCI state field is supported, a supportable MAC-CE based activation/deactivation method for a plurality of TCI state fields.

10) Whether indication of three or more TCI states is possible through one TCI state field.

11) Supportable MAC-CE based activation/deactivation method for TCI state field that may indicate three or more TCI states.

The base station having received at least one of the above-described UE capabilities may configure higher layer signaling in the UE. As an example, if the UE supports a combination of the multi-TRP-based SFN PDSCH technique and the multi-TRP-based TDM scheme A, the base station may configure the repetitionScheme, which is a higher layer signaling, as tdmSchemeA in the UE, and at the same time may configure higher layer signaling for determining whether multi-TRP-based SFN PDSCH transmission technique can be transmitted. As another example, when the UE has reported to the base station whether to support the above Method 5-4-2 as a UE capability, the base station may configure, as a transmission beam mapping method, tciMapping which is higher layer signaling to be either cyclical or sequential, to support Method 5-4-2.

Figure 31A:
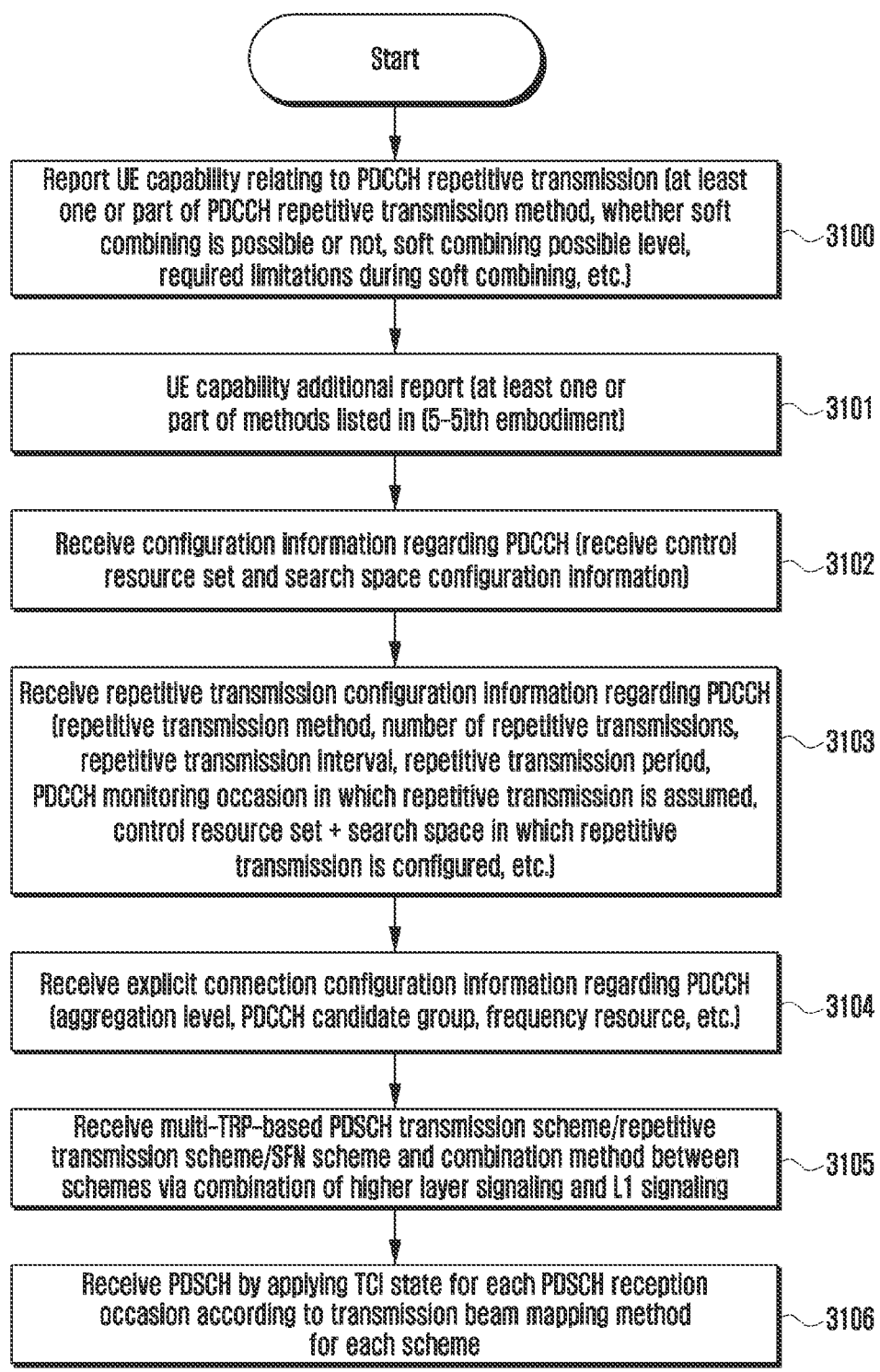
FIG. 31A illustrates an operation of a UE with regard to multi-TRP-based SFN PDSCH transmission according to an embodiment.

FIG. 31A illustrates an operation of a UE for multi-TRP-based SFN PDSCH transmission according to an embodiment.

Referring to FIG. 31A, the UE may report, as UE capability, information related to PDCCH repetitive transmission (at least one or part of PDCCH repetitive transmission method, whether soft combining is possible or not, soft combining possible level, and required limitations during soft combining) to a base station (operation 3100). In addition, the UE may additionally report UE capability relating to multi-TRP-based SFN PDSCH transmission (e.g., at least one or part of the UE capabilities listed in the (5-5)th embodiment) to the base station (operation 3101). Thereafter, the UE may receive configuration information relating to a PDCCH (e.g., configuration information relating to a control resource set and a search space) from the base station (operation 3102), and the UE may additionally receive configuration information relating to PDCCH repetitive transmission (e.g., a repetitive transmission method, the number of repetitive transmissions, a repetitive transmission interval, a repetitive transmission period, a PDCCH monitoring occasion in which the repetitive transmission is assumed, and a control resource set and a search space in which the repetitive transmission is configured) from the base station (operation 3103). In addition, the UE may additionally receive, from the base station, explicit connection configuration-related information (e.g., aggregation level, PDCCH candidate group, frequency resource, etc.) during PDCCH repetitive transmission (operation 3104). In addition, the UE may receive, from the base station, indication and configuration of a multi-TRP-based PDSCH transmission scheme/repetitive transmission scheme/SFN scheme and a combination method between schemes through indication via L1 signaling, configuration via higher layer signaling, or a combination of L1 signaling and higher layer signaling (operation 3105). This operation may be based on at least one of various schemes prepared in the above-described fourth to (5-4)th embodiments. If the UE has received the configuration and indication of a specific scheme through higher layer signaling and L1 signaling from the base station, the UE may receive a PDSCH by applying the TCI state for each PDSCH reception location according to a transmission beam mapping method for the corresponding scheme (operation 3106).

Meanwhile, although operations 3100 to 3106 are sequentially illustrated in FIG. 31A, the disclosure is not limited thereto. That is, one or both of operations 3100 to 3106 may be omitted and may be performed simultaneously. For example, pieces of information of operations 3100 to 3105 may be simultaneously received from the base station.

Figure 31B:
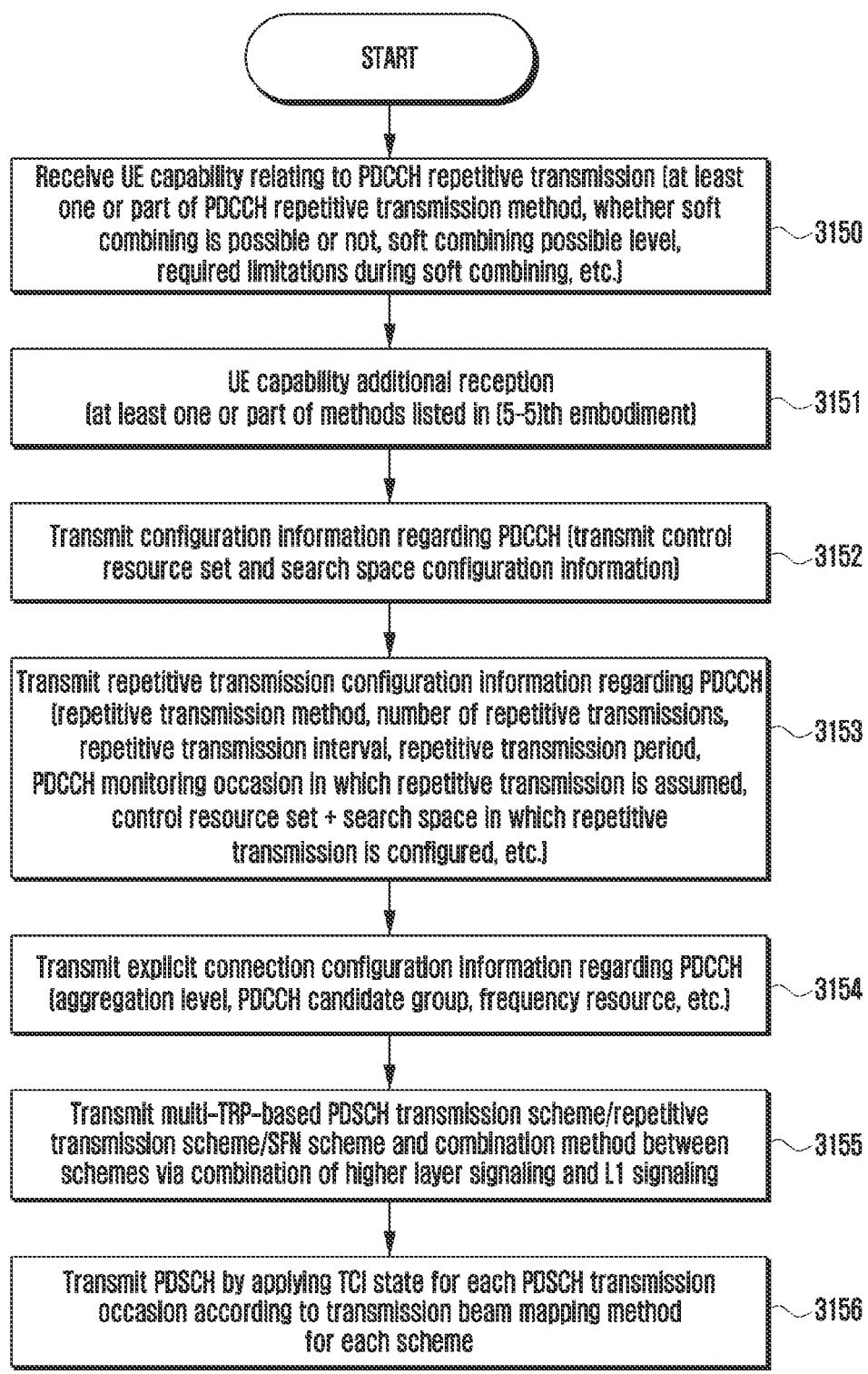
FIG. 31B illustrates an operation of a base station with regard to multi-TRP-based SFN PDSCH transmission according to an embodiment.

FIG. 31B illustrates an operation of a base station for multi-TRP-based SFN PDSCH transmission according to an embodiment.

Referring to FIG. 31B, the base station may receive UE capability including information relating to PDCCH repetitive transmission (at least one or part of PDCCH repetitive transmission method, whether soft combining is possible or not, soft combining possible level, required limitations during soft combining, etc.) (operation 3150). In addition, the base station may additionally receive UE capability relating to multi-TRP-based SFN PDSCH transmission (e.g., at least one or part of the UE capabilities listed in the (5-5)th embodiment) from the UE (operation 3151). Thereafter, the base station may transmit configuration information relating to a PDCCH (e.g., configuration information relating to a control resource set and a search space) to the UE (operation 3152), and the base station may additionally transmit configuration information relating to PDCCH repetitive transmission (e.g., a repetitive transmission method, the number of repetitive transmissions, a repetitive transmission interval, a repetitive transmission period, a PDCCH monitoring occasion in which the repetitive transmission is assumed, and a control resource set and a search space in which the repetitive transmission is configured) to the UE (operation 3153). In addition, the base station may additionally transmit, to the UE, explicit connection configuration-related information (e.g., aggregation level, PDCCH candidate group, frequency resource, etc.) during PDCCH repetitive transmission (operation 3154). In addition, the base station may provide, to the UE, indication and configuration of a multi-TRP-based PDSCH transmission scheme/repetitive transmission scheme/SFN scheme and a combination method between schemes through indication via L1 signaling, configuration via higher layer signaling, or a combination of L1 signaling and higher layer signaling (operation 3155). This operation may be based on at least one of various schemes prepared in the above-described fourth to (5-4)th embodiments. If the base station provides, to the UE, the configuration and indication of a specific scheme through higher layer signaling and L1 signaling, the base station may transmit a PDSCH by applying the TCI state for each PDSCH reception location according to a transmission beam mapping method for the corresponding scheme (operation 3156).

Meanwhile, although operations 3150 to 3156 are sequentially illustrated in FIG. 31B, the disclosure is not limited thereto. That is, one or both of operations 3150 to 3156 may be omitted and may be performed simultaneously. For example, pieces of information of operations 3150 to 3155 may be simultaneously transmitted from the base station to the UE.

Sixth Embodiment: MAC-CE Based Activation/Deactivation Method for Enhanced TCI State Field In an embodiment, when the plurality of TCI state fields are used or three or more TCI states are indicated by one TCI state field, a MAC-CE based activation/deactivation method will be described for each method.

(6-1)Th Embodiment: MAC-CE Based Activation/Deactivation Method in Case of Using and Indicating a Plurality of TCI State Fields A MAC-CE based activation/deactivation method will be described when a plurality of TCI state fields are used and indicated.

Figure 32A:
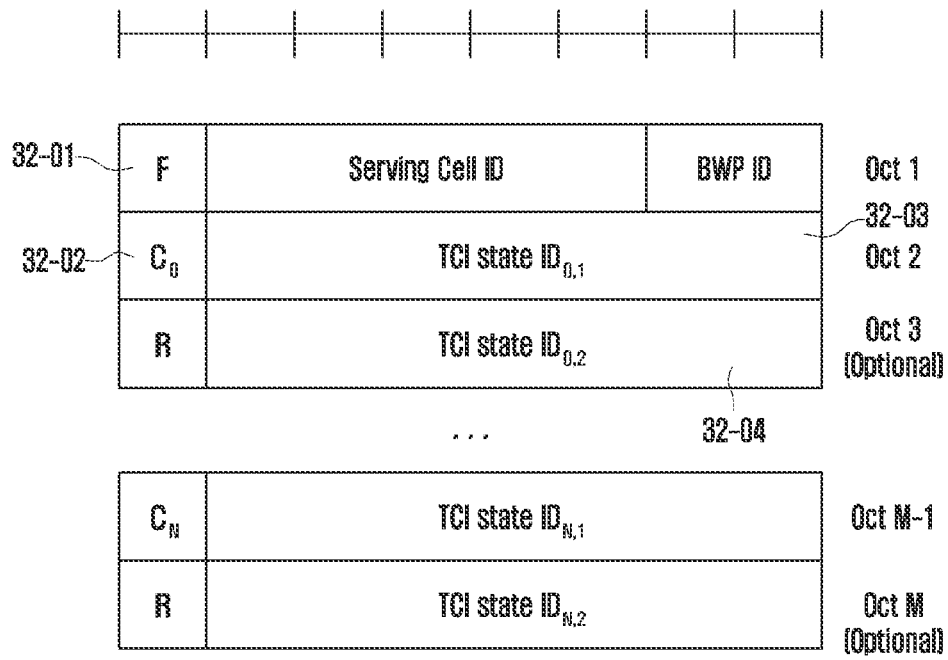
FIG. 32A illustrates a structure of a MAC-CE indicating activation/deactivation with regard to each TCI state field when a plurality of TCI state fields are used and indicated according to an embodiment.

FIG. 32A illustrates a structure of a MAC-CE indicating activation/deactivation with regard to each TCI state field when a plurality of TCI state fields are used and indicated, FIG. 32B illustrates another structure of a MAC-CE indicating activation/deactivation with regard to each TCI state field when a plurality of TCI state fields are used and indicated according to an embodiment, and FIG. 32C illustrates yet another structure of a MAC-CE indicating activation/deactivation with regard to each TCI state field when a plurality of TCI state fields are used and indicated according to an embodiment.

FIG. 32A illustrates the structure of a MAC-CE according to case 1. Case 1 32-00 is a method using one reserved field 32-01 existing in oct 1. If the reserved bit 32-01 in oct 1 has the value of 0, the corresponding MAC-CE may be regarded as a MAC-CE that activates the TCI state for the first TCI state field. All fields other than the corresponding field 32-01 (e.g., serving cell ID, BWP ID, $C_0$ 32-02, TCI state $ID_{0,1}$ 32-03, TCI state $ID_{0,2}$ 32-04, ...) have the same meaning as fields of the existing enhanced PDSCH TCI state activation MAC-CE, as described in FIG. 21. Based on the MAC-CE of case 1, activation/deactivation is possible for only one TCI state field of two TCI state fields.

FIG. 32B illustrates the structure of a MAC-CE according to case 2. Case 2 32-10 is a method for activation/deactivation of both TCI states through one MAC-CE. In case 2, the reserved field of oct 1 may be regarded as reserved. $C_{1,0}$ 32-02 existing in oct 2 is an indicator indicating whether the 0th TCI state codepoint of the first TCI state field has two TCI states. TCI state $ID_{1,0,1}$ may indicate a TCI state ID to be activated as the first TCI state of the 0th TCI state codepoint of the first TCI state field (32-03). If $C_{1,0}$ has the value of 1, it may denote that the 0th TCI state codepoint of the first TCI state field has two TCI states, and TCI state $ID_{1,0,2}$ may indicate a TCI state ID to be activated as the second TCI state of the 0th TCI state codepoint of the first TCI state field in the next octet of octet where $C_{1,0}$ exists (32-04). In case 2, as described above, information regarding TCI states used to perform activation/deactivation of each TCI state codepoint for the first TCI state field is loaded first and thereafter all pieces of information relating to the first TCI state field are expressed, and then information relating to the second TCI MAC-CE is expressed, so as to configure the MAC-CE.

FIG. 32C illustrates the structure of a MAC-CE according to case 3. Case 3 32-20 is similar to case 2, but the order of information expression may be different from that of the case 2. Case 3 may configure the MAC-CE in a manner of expressing information regarding TCI states used to perform activation/deactivation of the first and second TCI state fields for each TCI state codepoint of each field. For example, after $C_{1,0}$ in octet 2, $C_{2,0}$ exists in octet 3 or octet 4 according to the value of $C_{1,0}$. Here, $C_{1,0}$ and $C_{2,0}$ may indicate whether the first and second TCI state fields may indicate activation of two TCI state IDs with regard to each 0th TCI state codepoint thereof.

(6-2)Th Embodiment: MAC-CE Based Activation/Deactivation Method when Three or More TCI States are Indicated by One TCI State Field W, when three or more TCI states are indicated by one TCI state field, a MAC-CE based activation/deactivation method will be described.

Figure 33:
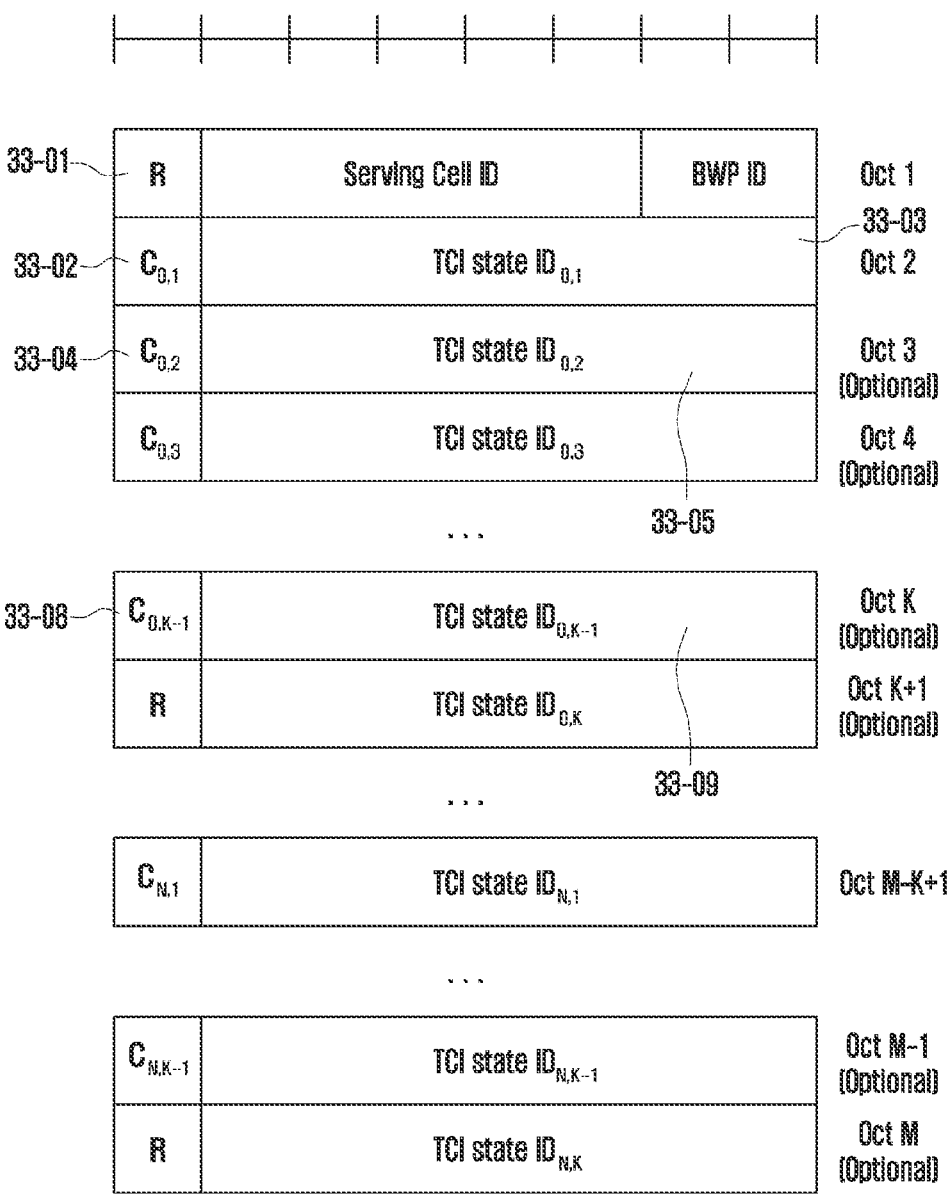
FIG. 33 illustrates the structure of a MAC-CE indicating activation/deactivation with regard to a TCI state field when three or more TCI states are indicated by one TCI state field according to an embodiment.

FIG. 33 illustrates the structure of a MAC-CE indicating activation/deactivation for a TCI state field when three or more TCI states are indicated by one TCI state field according to an embodiment.

It may be assumed that up to K TCI states may be indicated per one TCI state codepoint by using the corresponding MAC-CE structure. A reserved field 33-01 of octet 1 may be regarded as reserved. TCI state $ID_{0,1}$ 33-03 of octet 2 may denote the ID of TCI state to be activated as the first TCI state of the 0th TCI state codepoint. A $C_{0,1}$ field 33-02 of octet 2 is an indicator indicating whether the 0th TCI codepoint may activate/deactivate two or more TCI states, and if $C_{0,1}$ has the value of 1, the next octet 3 may exist. A TCI state $ID_{0,2}$ 33-05 of octet 3 may denote the ID of TCI state to be activated as the second TCI state of the 0th TCI state codepoint. A $C_{0,2}$ field 33-04 of octet 3 is an indicator indicating whether the 0th TCI codepoint may activate/deactivate three or more TCI states, and if $C_{0,2}$ has the value of 1, the next octet 4 may exist. Similarly, TCI state $ID_{0,K-1}$ 33-09 of octet K may denote the ID of TCI state to be activated as the (K−1)th TCI state of the 0th TCI state codepoint. A $C_{0,K-1}$ field 33-08 of octet K is an indicator indicating whether the 0th TCI state codepoint may activate/deactivate K TCI states or more. If the $C_{0,K-1}$ field has the value of 1, the next octet K+1 may exist. In this manner, it may be identified that up to K TCI states may be activated for a specific TCI state codepoint.

Figure 34:
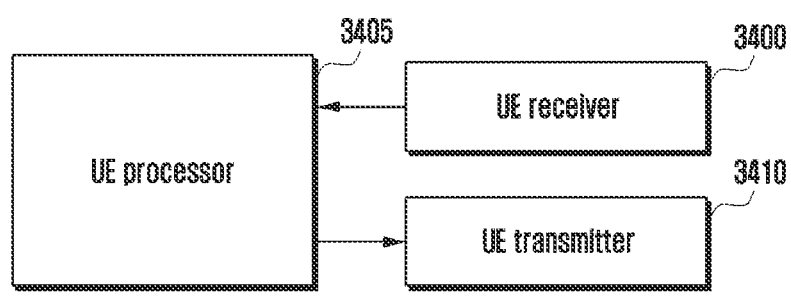
FIG. 34 illustrates the structure of a UE in a wireless communication system according to an embodiment.

FIG. 34 illustrates the structure of a UE in a wireless communication system according to an embodiment.

Referring to FIG. 34, the UE may include a transceiver referring to a receiver 3400 and a transmitter 3410, a memory, and a processor 3405 (or a controller or processor). According to the communication method of the UE described above, the transceiver 3400 or 3410, the memory, and the processor 3405 may operate. However, the elements of the UE are not limited to the above-described example. For example, the UE may include more or fewer elements than the aforementioned elements. In addition, the transceiver, the memory, and the processor may be implemented in the form of a single chip.

The transceiver may transmit/receive a signal to/from a base station. Here, the signal may include control information and data. To this end, the transceiver may include an RF transmitter for up-converting and amplifying a frequency of a transmitted signal, and an RF receiver for low-noise amplifying a received signal and down-converting a frequency of the received signal. However, this is only an embodiment of the transceiver, and elements of the transceiver are not limited to the RF transmitter and the RF receiver.

In addition, the transceiver may receive a signal through a wireless channel and output the received signal to the processor, and may transmit a signal output from the processor through the wireless channel.

The memory may store programs and data required for the operation of the UE. In addition, the memory may store control information or data included in a signal transmitted and received by the UE. The memory may include a storage medium such as a ROM, a RAM, a hard disk, a CD-ROM, and a DVD, or a combination of storage media. In addition, multiple memories may exist.

In addition, the processor may control a series of processes so that the UE may operate according to the above-described embodiment. For example, the processor may control elements of the UE so as to receive DCI configured by two layers and simultaneously receive multiple PDSCHs. Multiple processors may exist, and the processor may perform an operation of controlling the elements of the UE by executing programs stored in the memory.

Figure 35:
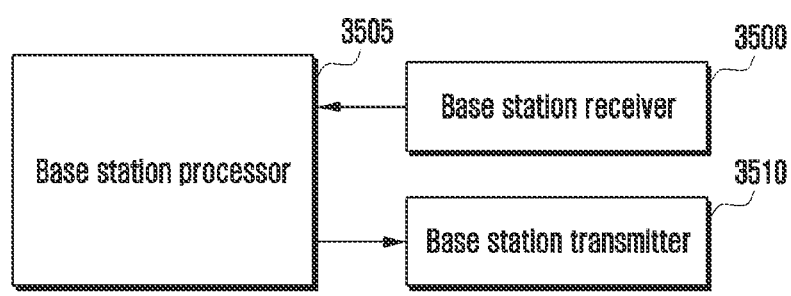
FIG. 35 illustrates the structure of a base station in a wireless communication system according to an embodiment.

FIG. 35 illustrates the structure of a base station in a wireless communication system according to an embodiment.

Referring to FIG. 35, the base station may include a transceiver referring to a receiver 3500 and a transmitter 3510, a memory, and a processor 3505 (or a base station controller or processor). According to the communication method of the base station described above, the transceiver 3500 or 3510, the memory, and the processor 3505 may operate. However, the elements of the base station are not limited to the above-described example. For example, the base station may include more or fewer elements than the aforementioned elements. In addition, the transceiver, the memory, and the processor may be implemented in the form of a single chip.

The transceiver may transmit/receive a signal to/from a UE. Here, the signal may include control information and data. To this end, the transceiver may include an RF transmitter for up-converting and amplifying a frequency of a transmitted signal, and an RF receiver for low-noise amplifying a received signal and down-converting a frequency of the received signal. However, this is only an embodiment of the transceiver, and elements of the transceiver are not limited to the RF transmitter and the RF receiver.

In addition, the transceiver may receive a signal through a wireless channel and output the signal to the processor, and may transmit the signal output from the processor through the wireless channel.

The memory may store programs and data necessary for the operation of the base station. In addition, the memory may store control information or data included in a signal transmitted and received by the base station. The memory may include a storage medium such as a ROM, a RAM, a hard disk, a CD-ROM, and a DVD, or a combination of storage media. In addition, multiple memories may exist.

The processor may control a series of processes so that the base station may operate according to the above-described embodiment. For example, the processor may control elements of the base station so as to configure DCI of two layers including allocation information regarding multiple PDSCHs and transmit the configured DCI. Multiple processors may exist, and the processor may perform an operation of controlling the elements of the base station by executing programs stored in the memory.

According to an embodiment, an apparatus and a method for effectively providing a service in a mobile communication system are provided.

According to an embodiment, provided is a method and apparatus for supporting duplicate and repetitive transmission of downlink data in network cooperative communication. Accordingly, the disclosure can secure wider coverage, and reduce performance degradation during data transmission.

Advantageous effects obtainable from the disclosure may not be limited to the above-mentioned effects, and other effects which are not mentioned may be clearly understood, through the following descriptions, by those skilled in the art to which the disclosure pertains.

The methods according to embodiments described herein may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments described herein are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, one embodiment of the disclosure may be partially combined with another embodiment to operate a base station and a terminal. As an example, embodiments 1 and 2 of the disclosure may be partially combined to operate a base station and a terminal. Further, although the above embodiments have been described by way of the FDD LTE system, other variants based on the technical idea of the embodiments may be implemented in other systems such as TDD LTE and 5G or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be implemented in combination without departing from the essential spirit and scope of the disclosure.

Various embodiments of the disclosure have been described. The above description of the disclosure is merely for the purpose of illustration, and is not intended to limit embodiments of the disclosure to the embodiments set forth herein. Those skilled in the art will appreciate that other specific modifications and changes may be easily made thereto without changing the technical idea or essential features of the disclosure. The scope of the disclosure should be determined not by the above description but by the appended claims, and all changes and modifications derived from the meaning and scope of the claims and equivalent concepts thereof shall be construed as falling within the scope of the disclosure.

What is claimed is:

1. A method performed by a terminal in a communication system, the method comprising:
   receiving, via higher layer signaling, single frequency network (SFN) scheme configuration information, information on a set of transmission configuration indication (TCI) states, and TCI mapping information indicating cyclic mapping or sequential mapping;
   receiving a medium access control-control element (MAC-CE) to activate TCI states among the set of TCI states, wherein the MAC-CE maps the activated TCI states to codepoints of a TCI field in downlink control information (DCI);
   receiving the DCI including scheduling information for a physical downlink shared channel (PDSCH), wherein the DCI further includes the TCI field, and wherein a codepoint of the TCI field is mapped to a first TCI state and a second TCI state among the activated TCI states;
   identifying PDSCH reception occasions based on the scheduling information; and
   receiving PDSCH repetitions on the PDSCH reception occasions,
   wherein a PDSCH repetition is received on a PDSCH reception occasion by using the first TCI state and the second TCI state based on the SFN scheme configuration information,
   wherein, in case that the DCI is received on a physical downlink control channel (PDCCH) using a third TCI state and a fourth TCI state or the DCI further includes another TCI field mapped to the third TCI state and the fourth TCI state among the activated TCI states:
      another PDSCH repetition is received on another PDSCH reception occasion by using the third TCI state and the fourth TCI state based on the SFN scheme configuration information,
      in case that the TCI mapping information indicates the cyclic mapping, a combination of the first TCI state and the second TCI state and a combination of the third TCI state and the fourth TCI state are cyclically used, and
      in case that the TCI mapping information indicates the sequential mapping, the combination of the first TCI state and the second TCI state and the combination of the third TCI state and the fourth TCI state are sequentially used.

2. The method of claim 1,
   wherein, in case that a slot aggregation factor indicating a number of aggregated slots is received via the higher layer signaling, the PDSCH reception occasions are respectively included in the aggregated slots and a time domain resource assignment (TDRA) field in the DCI is respectively applied to the aggregated slots,
   wherein, in case that repetition scheme configuration information indicating a time division multiplexing (TDM) scheme A is received via the higher layer signaling, the PDSCH repetitions are received according to the TDM scheme A, and
   wherein, in case that the repetition scheme configuration information is not received via the higher layer signaling, the PDSCH reception occasions are respectively included in a number of slots corresponding to a repetition number associated with the TDRA field in the DCI and the TDRA field is respectively applied to the number of slots corresponding to the repetition number.

3. The method of claim 1,
   wherein the PDSCH repetition is received on the PDSCH reception occasion by using the first TCI state and the second TCI state based on the SFN scheme configuration information regardless of the cyclic mapping or the sequential mapping indicated by the TCI mapping information.

4. The method of claim 1, further comprising:
   transmitting capability information on whether the UE supports a combination of an SFN scheme and a repetition scheme for the PDSCH repetitions, and
   wherein the SFN scheme configuration information and the PDSCH repetitions are received in case that the capability information indicates the UE supporting the combination.

5. A method performed by a base station in a communication system, the method comprising:
   transmitting, to a user equipment (UE) via higher layer signaling, single frequency network (SFN) scheme configuration information, information on a set of transmission configuration indication (TCI) states, and TCI mapping information indicating cyclic mapping or sequential mapping;
   transmitting a medium access control-control element (MAC-CE) to activate TCI states among the set of TCI states, wherein the MAC-CE maps the activated TCI states to codepoints of a TCI field in downlink control information (DCI);
   transmitting, to the UE, the DCI including scheduling information for a physical downlink shared channel (PDSCH), wherein the DCI further includes the TCI field, and wherein a codepoint of the TCI field is mapped to a first TCI state and a second TCI state among the activated TCI states; and
   transmitting, to the UE, PDSCH repetitions on PDSCH transmission occasions associated with the scheduling information,
   wherein a PDSCH repetition is transmitted on a PDSCH transmission occasion by using the first TCI state and the second TCI state,
   wherein, in case that the DCI is transmitted on a physical downlink control channel (PDCCH) using a third TCI state and a fourth TCI state, or the DCI further includes another TCI codepoint mapped to the third TCI state and the fourth TCI state:
  another PDSCH repetition is transmitted on another PDSCH reception occasion by using the third TCI state and the fourth TCI state based on the SFN scheme configuration information,
  in case that the TCI mapping information indicates the cyclic mapping, a combination of the first TCI state and the second TCI state and a combination of the third TCI state and the fourth TCI state are cyclically used, and
  in case that the TCI mapping information indicates the sequential mapping, the combination of the first TCI state and the second TCI state and the combination of the third TCI state and the fourth TCI state are sequentially used.

6. The method of claim 5,
wherein, in case that a slot aggregation factor indicating a number of aggregated slots is transmitted via the higher layer signaling, the PDSCH transmission occasions are respectively included in the aggregated slots and a time domain resource assignment (TDRA) field in the DCI is respectively applied to the aggregated slots,
wherein, in case that repetition scheme configuration information indicating a time division multiplexing (TDM) scheme A is transmitted via the higher layer signaling, the PDSCH repetitions are transmitted according to the TDM scheme A, and
wherein, in case that the repetition scheme configuration information is not transmitted via the higher layer signaling, the PDSCH transmission occasions are respectively included in a number of slots corresponding to a repetition number associated with the TDRA field in the DCI and the TDRA field is respectively applied to the number of slots corresponding to the repetition number.

7. The method of claim 5,
wherein the PDSCH repetition is transmitted on the PDSCH transmission occasion by using the first TCI state and the second TCI state regardless of the cyclic mapping or the sequential mapping indicated by the TCI mapping information.

8. The method of claim 5, further comprising:
receiving, from the UE, capability information on whether the UE supports a combination of an SFN scheme and a repetition scheme for the PDSCH repetitions, and
wherein the SFN scheme configuration information and the PDSCH repetitions are transmitted in case that the capability information indicates the UE supporting the combination.

9. A terminal in a communication system, the terminal comprising:
  a transceiver; and
  a processor coupled with the transceiver and configured to:
    receive, via higher layer signaling, single frequency network (SFN) scheme configuration information, information on a set of transmission configuration indication (TCI) states, and TCI mapping information indicating cyclic mapping or sequential mapping,
    receive a medium access control-control element (MAC-CE) to activate TCI states among the set of TCI states, wherein the MAC-CE maps the activated TCI states to codepoints of a TCI field in downlink control information (DCI),
    receive the DCI including scheduling information for a physical downlink shared channel (PDSCH), wherein the DCI further includes the TCI field, and wherein a codepoint of the TCI field is mapped to a first TCI state and a second TCI state among the activated TCI states,
    identify PDSCH reception occasions based on the scheduling information, and
    receive PDSCH repetitions on the PDSCH reception occasions,
  wherein a PDSCH repetition is received on a PDSCH reception occasion by using the first TCI state and the second TCI state based on the SFN scheme configuration information,
  wherein, in case that the DCI is received on a physical downlink control channel (PDCCH) using a third TCI state and a fourth TCI state or the DCI further includes another TCI field mapped to the third TCI state and the fourth TCI state among the activated TCI states:
    another PDSCH repetition is received on another PDSCH reception occasion by using the third TCI state and the fourth TCI state based on the SFN scheme configuration information,
    in case that the TCI mapping information indicates the cyclic mapping, a combination of the first TCI state and the second TCI state and a combination of the third TCI state and the fourth TCI state are cyclically used, and
    in case that the TCI mapping information indicates the sequential mapping, the combination of the first TCI state and the second TCI state and the combination of the third TCI state and the fourth TCI state are sequentially used.

10. The terminal of claim 9,
wherein, in case that a slot aggregation factor indicating a number of aggregated slots is received via the higher layer signaling, the PDSCH reception occasions are respectively included in the aggregated slots and a time domain resource assignment (TDRA) field in the DCI is respectively applied to the aggregated slots,
wherein, in case that repetition scheme configuration information indicating a time division multiplexing (TDM) scheme A is received via the higher layer signaling, the PDSCH repetitions are received according to the TDM scheme A, and
wherein, in case that the repetition scheme configuration information is not received via the higher layer signaling, the PDSCH reception occasions are respectively included in a number of slots corresponding to a repetition number associated with the TDRA field in the DCI and the TDRA field is respectively applied to the number of slots corresponding to the repetition number.

11. The terminal of claim 9,
wherein the PDSCH repetition is received on the PDSCH reception occasion by using the first TCI state and the second TCI state based on the SFN scheme configuration information regardless of the cyclic mapping or the sequential mapping indicated by the TCI mapping information.

12. The terminal of claim 9,
wherein the processor is further configured to transmit capability information on whether the UE supports a combination of an SFN scheme and a repetition scheme for the PDSCH repetitions, and wherein the SFN scheme configuration information and the PDSCH repetitions are received in case that the capability information indicates the UE supporting the combination.

13. A base station in a communication system, the base station comprising:

a transceiver; and a processor coupled with the transceiver and configured to:

transmit, to a user equipment (UE) via higher layer signaling, single frequency network (SFN) scheme configuration information, information on a set of transmission configuration indication (TCI) states, and TCI mapping information indicating cyclic mapping or sequential mapping, transmit a medium access control-control element (MAC-CE) to activate TCI states among the set of TCI states, wherein the MAC-CE maps the activated TCI states to codepoints of a TCI field in downlink control information (DCI);

transmit, to the UE, the DCI including scheduling information for a physical downlink shared channel (PDSCH), wherein the DCI further includes the TCI field, and wherein a codepoint of the TCI field is mapped to a first TCI state and a second TCI state among the activated TCI states, and transmit, to the UE, PDSCH repetitions on PDSCH transmission occasions associated with the scheduling information, wherein a PDSCH repetition is transmitted on a PDSCH transmission occasion by using the first TCI state and the second TCI state, wherein, in case that the DCI is transmitted on a physical downlink control channel (PDCCH) using a third TCI state and a fourth TCI state, or the DCI further includes another TCI codepoint mapped to the third TCI state and the fourth TCI state:

another PDSCH repetition is transmitted on another PDSCH reception occasion by using the third TCI state and the fourth TCI state based on the SFN scheme configuration information, in case that the TCI mapping information indicates the cyclic mapping, a combination of the first TCI state and the second TCI state and a combination of the third TCI state and the fourth TCI state are cyclically used, and in case that the TCI mapping information indicates the sequential mapping, the combination of the first TCI state and the second TCI state and the combination of the third TCI state and the fourth TCI state are sequentially used.

14. The base station of claim 13, wherein, in case that a slot aggregation factor indicating a number of aggregated slots is transmitted via the higher layer signaling, the PDSCH transmission occasions are respectively included in the aggregated slots and a time domain resource assignment (TDRA) field in the DCI is respectively applied to the aggregated slots, wherein, in case that repetition scheme configuration information indicating a time division multiplexing (TDM) scheme A is transmitted via the higher layer signaling, the PDSCH repetitions are transmitted according to the TDM scheme A, and wherein, in case that the repetition scheme configuration information is not transmitted via the higher layer signaling, the PDSCH transmission occasions are respectively included in a number of slots corresponding to a repetition number associated with the TDRA field in the DCI and the TDRA field is respectively applied to the number of slots corresponding to the repetition number.

15. The base station of claim 13, wherein the PDSCH repetition is transmitted on the PDSCH transmission occasion by using the first TCI state and the second TCI state regardless of the cyclic mapping or the sequential mapping indicated by the TCI mapping information.

16. The base station of claim 13, wherein the processor is further configured to receive, from the UE, capability information on whether the UE supports a combination of an SFN scheme and a repetition scheme for the PDSCH repetitions, and wherein the SFN scheme configuration information and the PDSCH repetitions are transmitted in case that the capability information indicates the UE supporting the combination.

* * * * *